(12) United States Patent
Park et al.

(10) Patent No.: US 11,456,790 B2
(45) Date of Patent: Sep. 27, 2022

(54) MULTI-BEAM SELECTION FOR BEAMFORMED MULTIPLE INPUT MULTIPLE OUTPUT WIRELESS COMMUNICATIONS

(71) Applicant: QUALCOMM Incorporated, San Diego, CA (US)

(72) Inventors: Sungwoo Park, San Diego, CA (US); Kiran Venugopal, Raritan, NJ (US); Tianyang Bai, Somerville, NJ (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 16/991,808

(22) Filed: Aug. 12, 2020

(65) Prior Publication Data

US 2021/0050893 A1 Feb. 18, 2021

Related U.S. Application Data

(60) Provisional application No. 62/888,391, filed on Aug. 16, 2019.

(51) Int. Cl.
*H04B 7/02* (2018.01)
*H04B 7/06* (2006.01)
(Continued)

(52) U.S. Cl.
CPC ......... *H04B 7/0617* (2013.01); *H04B 7/0417* (2013.01); *H04B 7/0626* (2013.01);
(Continued)

(58) Field of Classification Search
CPC .. H04B 7/0617; H04B 7/0417; H04B 7/0626; H04B 7/0639; H04B 7/0695; H04L 5/0048
(Continued)

(56) References Cited

U.S. PATENT DOCUMENTS

2013/0301454 A1 11/2013 Seol et al.
2017/0331528 A1* 11/2017 Gamand ................. H04B 1/44
2018/0198511 A1 7/2018 Maamari et al.

FOREIGN PATENT DOCUMENTS

EP 3068060 A1 9/2016

OTHER PUBLICATIONS

Partial International Search Report—PCT/US2020/046144—ISA/EPO—dated Oct. 22, 2020.
(Continued)

*Primary Examiner* — Zewdu A Kassa
(74) *Attorney, Agent, or Firm* — Holland & Hart LLP

(57) ABSTRACT

Methods, systems, and devices for wireless communications are described for multiple-input multiple-output (MIMO) millimeter wave (mmW) communications of two or more MIMO streams via two or more beams. A sequential technique may be used for configuring MIMO communications, in which analog RF beamforming parameters are determined based on reference signal measurements during a beam sweeping procedure. Then, digital baseband beamforming parameters may be determined and used for baseband processing of two or more MIMO streams. The digital baseband beamforming parameters may include baseband precoding parameters used for transmitting the two or more MIMO streams on the two or more beams, and baseband combiner parameters used for receiving the two or more MIMO streams on the two or more beams.

30 Claims, 25 Drawing Sheets

(51) Int. Cl.
*H04B 7/0417* (2017.01)
*H04L 5/00* (2006.01)
(52) U.S. Cl.
CPC ......... *H04B 7/0639* (2013.01); *H04B 7/0695* (2013.01); *H04L 5/0048* (2013.01)
(58) Field of Classification Search
USPC ........................................................ 375/267
See application file for complete search history.

(56) References Cited

OTHER PUBLICATIONS

International Search Report and Written Opinion—PCT/US2020/046144—ISA/EPO—dated Jan. 25, 2021.

\* cited by examiner

MULTI-BEAM SELECTION FOR BEAMFORMED MULTIPLE INPUT MULTIPLE OUTPUT WIRELESS COMMUNICATIONS

CROSS REFERENCE

The present application for patent claims the benefit of U.S. Provisional Patent Application No. 62/888,391 by PARK et al., entitled "MULTI-BEAM SELECTION FOR BEAMFORMED MULTIPLE INPUT MULTIPLE OUTPUT WIRELESS COMMUNICATIONS," filed Aug. 16, 2019, assigned to the assignee hereof, and expressly incorporated by reference herein.

FIELD OF TECHNOLOGY

The following relates generally to wireless communications and more specifically to multi-beam selection for beamformed multiple input multiple output wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, each of which may be otherwise known as a user equipment (UE). Some wireless communications systems may support beamforming operations for directional communications. Beamforming, which may also be referred to as spatial filtering, directional transmission, or directional reception, may be a signal processing technique that may be used at a transmitting device or a receiving device to select, shape, or steer an antenna beam (for example, a transmit directional beam, a receive directional beam) along a spatial path between the transmitting device and the receiving device. Some wireless communications systems may support beamforming operations to mitigate pathloss and blockages with respect to the spatial path. As demand for communication efficiency increases, it may be desirable for a wireless communications system to target low latencies and improve reliability for beamforming operations.

SUMMARY

The described techniques may relate to configuring a communication device, which may be a user equipment (UE), a base station, or both, to support multiple-input multiple-output (MIMO) millimeter wave (mmW) communications (also referred to as directional communications). In some examples, the described techniques may be used to configure the communication device for MIMO communications with one or more other devices using two or more beams. In some cases, a sequential technique may be used for configuring MIMO communications, in which analog RF beamforming parameters (e.g., analog beamforming parameters for a number of frequency sub-bands) are determined based on reference signal measurements during a beam sweeping procedure in which a number of combinations of analog RF beamforming parameters for two or more beams are transmitted. Then, digital baseband beamforming parameters (e.g., digital beamforming parameters for baseband signals that are not modulated on a carrier frequency) may be determined and used for baseband processing of two or more MIMO streams. The digital baseband beamforming parameters may include baseband precoding parameters used for transmitting the two or more MIMO streams on the two or more beams, and baseband combiner parameters used for receiving the two or more MIMO streams on the two or more beams.

The described techniques may be used to configure communication devices to perform a beamforming operation, such as a beam selection operation, a beam training operation, or the like, and may configure the communication device with a codebook to improve beamforming reliability and data rate for MIMO mmW communications.

A method of wireless communication is described. The method may include transmitting, from a first wireless device, a set of reference signals to a second wireless device using a set of combinations of analog beamforming parameters associated with two or more beams that are configured to carry two or more multiple-input multiple-output streams, where the set of reference signals are transmitted for different combinations of one or more sets of transmit beamforming parameters and one or more sets of receive beamforming parameters, receiving, from the second wireless device, a report that indicates a first combination of analog beamforming parameters is selected for the analog beamforming parameters at the second wireless device, and communicating with the second wireless device via the two or more beams based on the first combination of analog beamforming parameters.

An apparatus for wireless communication is described. The apparatus may include a processor, memory coupled with the processor, and instructions stored in the memory. The instructions may be executable by the processor to cause the apparatus to transmit, from a first wireless device, a set of reference signals to a second wireless device using a set of combinations of analog beamforming parameters associated with two or more beams that are configured to carry two or more multiple-input multiple-output streams, where the set of reference signals are transmitted for different combinations of one or more sets of transmit beamforming parameters and one or more sets of receive beamforming parameters, receive, from the second wireless device, a report that indicates a first combination of analog beamforming parameters is selected for the analog beamforming parameters at the second wireless device, and communicate with the second wireless device via the two or more beams based on the first combination of analog beamforming parameters.

Another apparatus for wireless communication is described. The apparatus may include means for transmitting, from a first wireless device, a set of reference signals to a second wireless device using a set of combinations of analog beamforming parameters associated with two or more beams that are configured to carry two or more multiple-input multiple-output streams, where the set of reference signals are transmitted for different combinations of one or more sets of transmit beamforming parameters and one or more sets of receive beamforming parameters, receiving, from the second wireless device, a report that indicates a first combination of analog beamforming parameters is selected for the analog beamforming parameters at the second wireless device, and communicating with the second wireless device via the two or more beams based on the first combination of analog beamforming parameters.

A non-transitory computer-readable medium storing code for wireless communication is described. The code may include instructions executable by a processor to transmit, from a first wireless device, a set of reference signals to a second wireless device using a set of combinations of analog beamforming parameters associated with two or more beams that are configured to carry two or more multiple-input multiple-output streams, where the set of reference signals are transmitted for different combinations of one or more sets of transmit beamforming parameters and one or more sets of receive beamforming parameters, receive, from the second wireless device, a report that indicates a first combination of analog beamforming parameters is selected for the analog beamforming parameters at the second wireless device, and communicate with the second wireless device via the two or more beams based on the first combination of analog beamforming parameters.

Some examples of the method, apparatuses, and non-transitory computer-readable medium described herein may further include operations, features, means, or instructions for receiving, from the second wireless device, a second reference signal that may be transmitted using the first combination of analog beamforming parameters, estimating an effective channel between the first wireless device and the second wireless device based on one or more measurements of the second reference signal, and determining a set of transmission baseband precoder parameters to be applied to baseband signals of the two or more beams based on the estimating the effective channel.

In some examples of the method, apparatuses, and non-transitory computer-readable medium described herein, the communicating with the second wireless device includes data communications via the two or more multiple-input multiple-output streams on the two or more beams, where the two or more beams use the first combination of analog beamforming parameters and the set of transmission baseband precoder parameters. In some examples of the method, apparatuses, and non-transitory computer-readable medium described herein, the data communications include a third reference signal for measurement at the second wireless device and determination of a set of receive baseband combiner parameters to be applied to baseband signals of the two or more beams at the second wireless device.

In some examples of the method, apparatuses, and non-transitory computer-readable medium described herein, the report that indicates the first combination of analog beamforming parameters provides a codebook index value for a codebook of beamforming parameters, and where the codebook of beamforming parameters maps codebook index values to the different combinations of the one or more sets of transmit beamforming parameters and the one or more sets of receive beamforming parameters.

In some examples of the method, apparatuses, and non-transitory computer-readable medium described herein, the first combination of analog beamforming parameters may be associated with a first reference signal transmission that may have a highest mutual information (MI) value of the set of reference signals.

In some examples of the method, apparatuses, and non-transitory computer-readable medium described herein, the first wireless device may be a base station and the second wireless device may be a UE, and where the set of reference signals may be downlink reference signals transmitted to the UE in a beam sweeping procedure. In some examples of the method, apparatuses, and non-transitory computer-readable medium described herein, the downlink reference signals include one or more of a channel state information reference signal (CSI-RS), one or more reference signals transmitted in a synchronization signal block (SSB), or any combinations thereof.

In some examples of the method, apparatuses, and non-transitory computer-readable medium described herein, the first wireless device may be a UE and the second wireless device may be a base station, and where the set of reference signals may be uplink reference signals transmitted to the base station in a beam sweeping procedure. In some examples of the method, apparatuses, and non-transitory computer-readable medium described herein, the uplink reference signals include sounding reference signals (SRS).

In some examples of the method, apparatuses, and non-transitory computer-readable medium described herein, the set of reference signals include reference signals that are specific to transmissions from the first wireless device to the second wireless device, and where the first wireless device determines a second combination of analog beamforming parameters for use at the first wireless device based on one or more different reference signals that may be specific to transmissions from the second wireless device to the first wireless device.

In some examples of the method, apparatuses, and non-transitory computer-readable medium described herein, the first wireless device determines a set of transmission baseband precoder parameters to be applied to baseband signals for transmissions using the two or more beams based on a second reference signal received from the second wireless device, where the baseband precoder parameters may be used to transform input from the two or more multiple-input multiple-output streams into baseband streams of a set of radio frequency transmit chains, and where the first combination of analog beamforming parameters are used to transform the baseband streams of the set of radio frequency transmit chains into wideband waveforms that are provided to a set of antennas.

In some examples of the method, apparatuses, and non-transitory computer-readable medium described herein, the second wireless device determines a set of transmission baseband precoder parameters to be applied to baseband signals for transmissions from the second wireless device using the two or more beams based on the set of reference signals transmitted by the first wireless device.

Some examples of the method, apparatuses, and non-transitory computer-readable medium described herein may further include operations, features, means, or instructions for receiving an indication from the second wireless device of a set of transmission baseband precoder parameters to be applied to baseband signals for transmissions from the first wireless device using the two or more beams. In some examples of the method, apparatuses, and non-transitory computer-readable medium described herein, the indication from the second wireless device may be a precoding matrix indicator (PMI) that is mapped to a codebook of sets of transmission baseband precoder parameters.

Some examples of the method, apparatuses, and non-transitory computer-readable medium described herein may further include operations, features, means, or instructions for transmitting a data transmission and a third reference signal to the second wireless device via the two or more multiple-input multiple-output streams on the two or more beams, and where the second wireless device determines a set of receive baseband combiner parameters to be applied to baseband signals of received transmissions using the two or more beams based on the third reference signal. In some examples of the method, apparatuses, and non-transitory computer-readable medium described herein, the third reference signal may be a demodulation reference signal (DMRS).

A method of wireless communication is described. The method may include measuring, at a second wireless device, a channel quality of a set of reference signals that are transmitted by a first wireless device using a set of combinations of analog beamforming parameters for two or more beams that carry two or more multiple-input multiple-output streams, where the set of reference signals are transmitted for different combinations of one or more sets of transmit beamforming parameters and one or more sets of receive beamforming parameters, selecting a first combination of analog beamforming parameters based on the measured channel quality of the set of reference signals, and communicating with the first wireless device via the two or more beams based on the first combination of analog beamforming parameters.

An apparatus for wireless communication is described. The apparatus may include a processor, memory coupled with the processor, and instructions stored in the memory. The instructions may be executable by the processor to cause the apparatus to measure, at a second wireless device, a channel quality of a set of reference signals that are transmitted by a first wireless device using a set of combinations of analog beamforming parameters for two or more beams that carry two or more multiple-input multiple-output streams, where the set of reference signals are transmitted for different combinations of one or more sets of transmit beamforming parameters and one or more sets of receive beamforming parameters, select a first combination of analog beamforming parameters based on the measured channel quality of the set of reference signals, and communicate with the first wireless device via the two or more beams based on the first combination of analog beamforming parameters.

Another apparatus for wireless communication is described. The apparatus may include means for measuring, at a second wireless device, a channel quality of a set of reference signals that are transmitted by a first wireless device using a set of combinations of analog beamforming parameters for two or more beams that carry two or more multiple-input multiple-output streams, where the set of reference signals are transmitted for different combinations of one or more sets of transmit beamforming parameters and one or more sets of receive beamforming parameters, selecting a first combination of analog beamforming parameters based on the measured channel quality of the set of reference signals, and communicating with the first wireless device via the two or more beams based on the first combination of analog beamforming parameters.

A non-transitory computer-readable medium storing code for wireless communication is described. The code may include instructions executable by a processor to measure, at a second wireless device, a channel quality of a set of reference signals that are transmitted by a first wireless device using a set of combinations of analog beamforming parameters for two or more beams that carry two or more multiple-input multiple-output streams, where the set of reference signals are transmitted for different combinations of one or more sets of transmit beamforming parameters and one or more sets of receive beamforming parameters, select a first combination of analog beamforming parameters based on the measured channel quality of the set of reference signals, and communicate with the first wireless device via the two or more beams based on the first combination of analog beamforming parameters.

Some examples of the method, apparatuses, and non-transitory computer-readable medium described herein may further include operations, features, means, or instructions for estimating an effective channel between the second wireless device and the first wireless device for each of the different combinations of the one or more sets of transmit beamforming parameters and the one or more sets of receive beamforming parameters, and where the first combination of analog beamforming parameters may be selected based on a magnitude of the effective channel estimates.

Some examples of the method, apparatuses, and non-transitory computer-readable medium described herein may further include operations, features, means, or instructions for transmitting a second reference signal to the first wireless device using the first combination of analog beamforming parameters for determination of a set of transmission baseband precoder parameters at the first wireless device. In some examples of the method, apparatuses, and non-transitory computer-readable medium described herein, the communicating with the first wireless device includes data communications via the two or more multiple-input multiple-output streams on the two or more beams, where the two or more beams use the first combination of analog beamforming parameters and the set of transmission baseband precoder parameters.

In some examples of the method, apparatuses, and non-transitory computer-readable medium described herein, the data communications include a third reference signal for determination of a set of receive baseband combiner parameters to be applied to baseband signals of the two or more beams at the second wireless device.

Some examples of the method, apparatuses, and non-transitory computer-readable medium described herein may further include operations, features, means, or instructions for transmitting a report that indicates the first combination of analog beamforming parameters are selected for the analog beamforming parameters, and where the report indicates a codebook index value for a codebook of beamforming parameters, and where the codebook of beamforming parameters maps codebook index values to the different combinations of the one or more sets of transmit beamforming parameters and the one or more sets of receive beamforming parameters.

In some examples of the method, apparatuses, and non-transitory computer-readable medium described herein, the first combination of analog beamforming parameters may be associated with a first reference signal transmission that may have a highest mutual information (MI) value of the set of reference signals.

In some examples of the method, apparatuses, and non-transitory computer-readable medium described herein, the first wireless device may be a base station and the second wireless device may be a UE, and where the set of reference signals may be downlink reference signals transmitted to the UE in a beam sweeping procedure. In some examples of the method, apparatuses, and non-transitory computer-readable medium described herein, the downlink reference signals include one or more of a channel state information reference signal (CSI-RS), one or more reference signals transmitted in a synchronization signal block (SSB), or any combinations thereof.

In some examples of the method, apparatuses, and non-transitory computer-readable medium described herein, the first wireless device may be a UE and the second wireless device may be a base station, and where the set of reference signals may be uplink reference signals transmitted to the base station in a beam sweeping procedure. In some examples of the method, apparatuses, and non-transitory computer-readable medium described herein, the uplink reference signals include sounding reference signals (SRS).

In some examples of the method, apparatuses, and non-transitory computer-readable medium described herein, the set of reference signals include reference signals that are specific to transmissions from the second wireless device to the first wireless device, and where the second wireless device determines a second combination of analog beamforming parameters for use at the second wireless device based on one or more different reference signals that are specific to transmissions from the second wireless device to the first wireless device.

Some examples of the method, apparatuses, and non-transitory computer-readable medium described herein may further include operations, features, means, or instructions for determining a set of transmission baseband precoder parameters to be applied to baseband signals for transmissions from the second wireless device using the two or more beams based on the set of reference signals transmitted by the first wireless device.

Some examples of the method, apparatuses, and non-transitory computer-readable medium described herein may further include operations, features, means, or instructions for transmitting a second reference signal to the first wireless device using the first combination of analog beamforming parameters for determination of a set of transmission baseband precoder parameters to be applied to baseband signals for transmissions from the first wireless device using the two or more beams.

Some examples of the method, apparatuses, and non-transitory computer-readable medium described herein may further include operations, features, means, or instructions for transmitting an indication to the first wireless device of a set of transmission baseband precoder parameters to be applied to baseband signals for transmissions from the first wireless device using the two or more beams. In some examples of the method, apparatuses, and non-transitory computer-readable medium described herein, the indication to the first wireless device may be a precoding matrix indicator (PMI) that is mapped to a codebook of sets of transmission baseband precoder parameters.

Some examples of the method, apparatuses, and non-transitory computer-readable medium described herein may further include operations, features, means, or instructions for receiving a data transmission and a third reference signal from the first wireless device via the two or more multiple-input multiple-output streams on the two or more beams, and determining, based on measurements of the third reference signal, a set of receive baseband combiner parameters to be applied to baseband signals of received transmissions using the two or more beams. In some examples of the method, apparatuses, and non-transitory computer-readable medium described herein, the third reference signal may be a demodulation reference signal (DMRS).

In some examples of the method, apparatuses, and non-transitory computer-readable medium described herein, the determining the set of received baseband combiner parameters may include operations, features, means, or instructions for estimating an effective channel between the second wireless device and the first wireless device based on measurements of the third reference signal, and determining the set of receive baseband combiner parameters based on the estimating. Some examples of the method, apparatuses, and non-transitory computer-readable medium described herein may further include operations, features, means, or instructions for decoding the data transmission using the receive baseband combiner parameters.

A method of wireless communication is described. The method may include receiving, at a first wireless device, a set of reference signals that are transmitted by a second wireless device using a set of combinations of analog beamforming parameters for two or more beams that carry two or more multiple-input multiple-output streams, determining a set of analog beamforming parameters for the two or more beams based on measurements of the set of reference signals, determining a set of transmission baseband precoder parameters to be applied to baseband signals of the two or more beams based on a channel estimation of a channel between the first wireless device and the second wireless device, determining a set of receive baseband combiner parameters to be applied to baseband signals of the two or more beams based on the channel estimation, and communicating with the second wireless device using the two or more beams based on the set of analog beamforming parameters, the set of transmission baseband precoder parameters, and the set of receive baseband combiner parameters.

An apparatus for wireless communication is described. The apparatus may include a processor, memory coupled with the processor, and instructions stored in the memory. The instructions may be executable by the processor to cause the apparatus to receive, at a first wireless device, a set of reference signals that are transmitted by a second wireless device using a set of combinations of analog beamforming parameters for two or more beams that carry two or more multiple-input multiple-output streams, determine a set of analog beamforming parameters for the two or more beams based on measurements of the set of reference signals, determine a set of transmission baseband precoder parameters to be applied to baseband signals of the two or more beams based on a channel estimation of a channel between the first wireless device and the second wireless device, determine a set of receive baseband combiner parameters to be applied to baseband signals of the two or more beams based on the channel estimation, and communicate with the second wireless device using the two or more beams based on the set of analog beamforming parameters, the set of transmission baseband precoder parameters, and the set of receive baseband combiner parameters.

Another apparatus for wireless communication is described. The apparatus may include means for receiving, at a first wireless device, a set of reference signals that are transmitted by a second wireless device using a set of combinations of analog beamforming parameters for two or more beams that carry two or more multiple-input multiple-output streams, determining a set of analog beamforming parameters for the two or more beams based on measurements of the set of reference signals, determining a set of transmission baseband precoder parameters to be applied to baseband signals of the two or more beams based on a channel estimation of a channel between the first wireless device and the second wireless device, determining a set of receive baseband combiner parameters to be applied to baseband signals of the two or more beams based on the channel estimation, and communicating with the second wireless device using the two or more beams based on the set of analog beamforming parameters, the set of transmission baseband precoder parameters, and the set of receive baseband combiner parameters.

A non-transitory computer-readable medium storing code for wireless communication is described. The code may include instructions executable by a processor to receive, at a first wireless device, a set of reference signals that are transmitted by a second wireless device using a set of combinations of analog beamforming parameters for two or more beams that carry two or more multiple-input multiple-output streams, determine a set of analog beamforming parameters for the two or more beams based on measurements of the set of reference signals, determine a set of transmission baseband precoder parameters to be applied to baseband signals of the two or more beams based on a channel estimation of a channel between the first wireless device and the second wireless device, determine a set of receive baseband combiner parameters to be applied to baseband signals of the two or more beams based on the channel estimation, and communicate with the second wireless device using the two or more beams based on the set of analog beamforming parameters, the set of transmission baseband precoder parameters, and the set of receive baseband combiner parameters.

In some examples of the method, apparatuses, and non-transitory computer-readable medium described herein, the analog beamforming parameters may be used to transform signals received at a set of antennas to baseband signals that may be provided to a set of radio frequency receive chains, and the baseband combiner parameters may be used to transform an output of the set of radio frequency receive chains into the two or more multiple-input multiple-output streams.

In some examples of the method, apparatuses, and non-transitory computer-readable medium described herein, the baseband precoder parameters may be used to transform the two or more multiple-input multiple-output streams into baseband signals that may be provided to a set of radio frequency transmit chains, and the analog beamforming parameters may be used to transform the baseband signals received at the radio frequency transmit chains into radio frequency signals for transmission from a set of antennas.

In some examples of the method, apparatuses, and non-transitory computer-readable medium described herein, the first wireless device may be a UE and the second wireless device may be a base station, and where the set of reference signals may be downlink reference signals transmitted to the UE in a beam sweeping procedure. In some examples of the method, apparatuses, and non-transitory computer-readable medium described herein, the downlink reference signals include one or more of a channel state information reference signal (CSI-RS), one or more reference signals transmitted in a synchronization signal block (SSB), or any combinations thereof.

In some examples of the method, apparatuses, and non-transitory computer-readable medium described herein, the first wireless device may be a base station and the second wireless device may be a UE, and where the set of reference signals may be uplink reference signals transmitted to the base station in a beam sweeping procedure. In some examples of the method, apparatuses, and non-transitory computer-readable medium described herein, the uplink reference signals include sounding reference signals (SRS).

DETAILED DESCRIPTION

Figure 1:
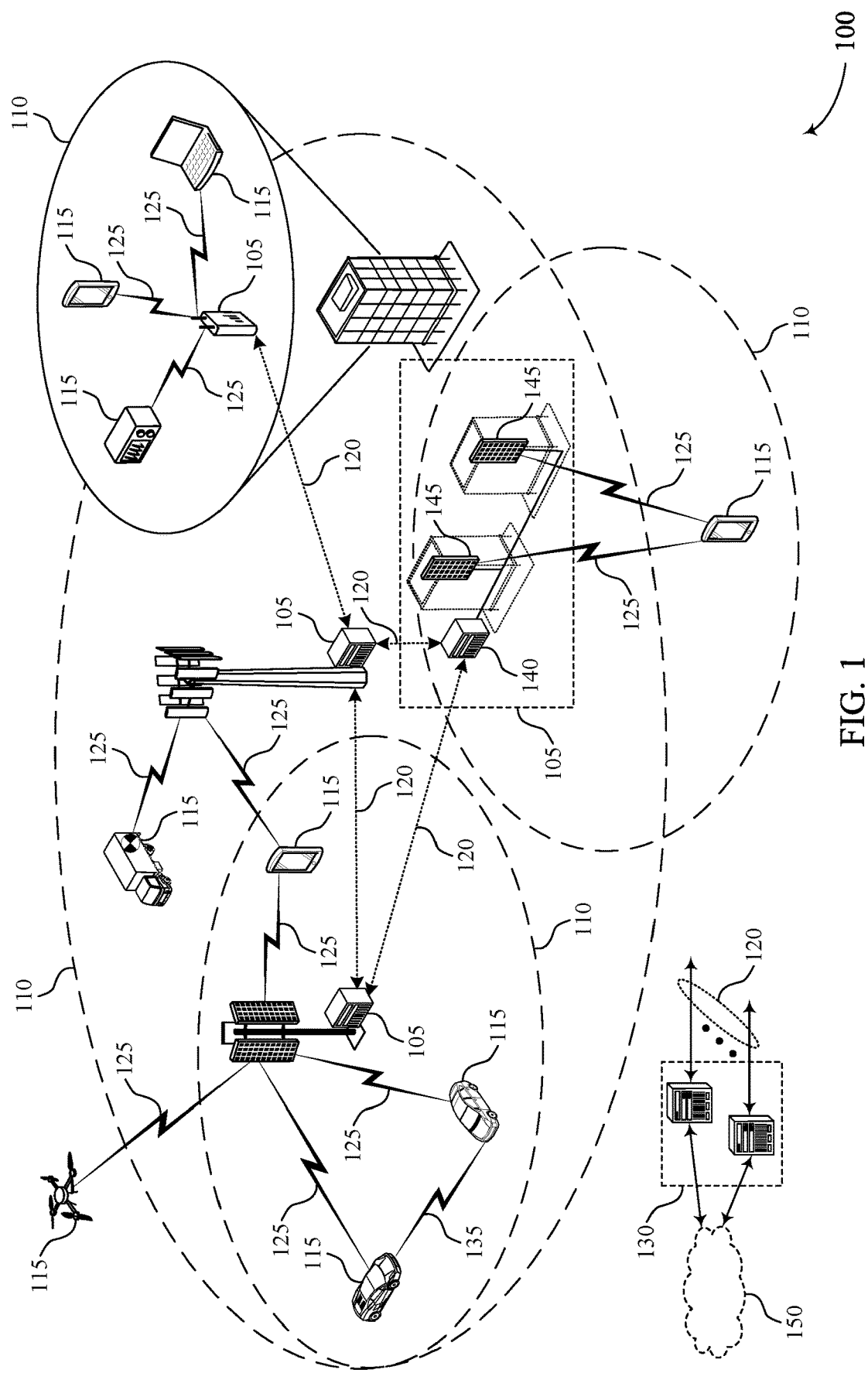
FIGS. 1 through 5 illustrate examples of wireless communications systems that support multi-beam selection for beamformed MIMO wireless communications in accordance with aspects of the present disclosure.

Some wireless communication systems may include communication devices, such as user equipment (UEs) and base stations, for example, next-generation NodeBs or giga-NodeBs (which may be referred to as gNBs), that may support multiple radio access technologies. Examples of radio access technologies include 4G systems such as Long Term Evolution (LTE) systems and fifth generation (5G) systems which may be referred to as New Radio (NR) systems. Some wireless communications systems, such as multiple-input multiple output (MIMO) systems, may configure the communication devices to support millimeter wave (mmW) communications (also referred to as directional communications). In some examples, the communication devices may experience one or more of a pathloss or a blockage with respect to a spatial path for the mmW communications. As a result, the communication devices may support beamforming operations to counter one or more of the pathloss or the blockage, among other examples.

According to various aspects of the present disclosure, techniques are provided for configuring a communication device (which may be referred to herein interchangeably as a wireless device), which may be a UE or a base station (or any other wireless communication device), to support MIMO mmW communications of two or more MIMO streams via two or more beams. In some cases, a sequential technique may be used for configuring MIMO communications, in which analog RF beamforming parameters (e.g., analog beamforming parameters for a number of frequency sub-bands) are determined based on reference signal measurements during a beam sweeping procedure in which a number of combinations of analog RF beamforming parameters for two or more beams are transmitted. Then, digital baseband beamforming parameters (e.g., digital beamforming parameters for baseband signals that are not modulated on a carrier frequency) may be determined and used for baseband processing of two or more MIMO streams. The digital baseband beamforming parameters may include baseband precoding parameters used for transmitting the two or more MIMO streams on the two or more beams, and baseband combiner parameters used for receiving the two or more MIMO streams on the two or more beams.

The communication devices may, for example, perform a beamforming operation in accordance with one or more codebooks to improve beamforming reliability and data rate for mmW communications. The codebooks may have a number N possible beamforming vectors. In some examples, N may be dependent on $N_T$ and $N_R$, where $N_T$ refers to a number of physical transmit antennas and $N_R$ refers to a number of physical receive antennas. In some examples, to enable multi-stream operation (e.g., in MIMO systems), the communications devices may determine and select multiple transmit directional beams and receive directional beams. The multiple transmit directional beams and receive directional beams may be used simultaneously at the communication devices (e.g., at a transmitting device, at a receiving device). Additionally, in some examples, the various directional beams may be from a same or different panel of the communication devices. For example, the communication devices may include multiple panels, each panel may include an array of same or different antennas (e.g., one or more of $N_T$ or $N_R$).

In some examples, the communication devices may perform a search over a number of possible pairs of beamforming vectors ($f_n$, $w_m$). As demand for communication efficiency increases, it may be desirable for the communications devices to target low latencies and improve reliability for beamforming operations, and more specifically to determine and select multiple beamforming pairs ($f_n$, $w_m$) to improve data rates in MIMO systems. In some examples, the communication devices may be configured with one or more signaling mechanisms to iteratively select beam weight for maximizing MIMO rate, in accordance with one or more analog codebook constraints at the communication devices.

Particular aspects of the subject matter described in this disclosure may be implemented to realize one or more of the following potential advantages. The techniques employed by the described communication devices may provide benefits and enhancements to the operation of the communication devices. For example, operations performed by the described communication devices may provide improvements to power consumption when performing beam operations. In some examples, configuring the described communication devices to perform sequential determination of beamforming parameters for multi-beam selection with uplink-downlink beam training may support improvements to spectral efficiency, higher data rates and, in some examples, may promote high reliability and low latency for beamforming operations, among other benefits.

Aspects of the disclosure are initially described in the context of several exemplary wireless communications systems. Aspects of the disclosure are further illustrated by and described with reference to process flows that relate to sequential determination of beamforming parameters with uplink-downlink beam training. Aspects of the disclosure are further illustrated by and described with reference to apparatus diagrams, system diagrams, and flowcharts that relate to multi-beam selection for beamformed MIMO wireless communications.

FIG. 1 illustrates an example of a wireless communications system 100 that supports multi-beam selection for beamformed MIMO wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications 135 may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications 135 may utilize a one-to-many (1:M) system in which each UE 115 transmits to every other UE 115 in the group. In some cases, a base station 105 facilitates the scheduling of resources for D2D communications 135. In other cases, D2D communications 135 are carried out between UEs 115 without the involvement of a base station 105.

Base stations 105 may communicate with the core network 130 and with one another. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service 150.

At least some of the network devices, such as a base station 105, may include subcomponents such as an access network entity 140, which may be an example of an access node controller (ANC). Each access network entity 140 may communicate with UEs 115 through a number of other access network transmission entities, which may be referred to as a radio head, a smart radio head, or a transmission/reception point (TRP) 145. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

As discussed herein, beamforming, which may also be referred to as spatial filtering, directional transmission, or directional reception, is a signal processing technique that may be used at a transmitting device or a receiving device (e.g., a base station 105 or a UE 115) to shape or steer one or more antenna beams (e.g., transmit beam(s) or receive beam(s)) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, communication devices, such as UEs 115 or base stations 105, may support MIMO mmW communications of two or more MIMO streams via two or more beams. In some cases, a sequential technique may be used for configuring MIMO communications, in which analog RF beamforming parameters (e.g., analog beamforming parameters for a number of frequency sub-bands) are determined based on reference signal measurements during a beam sweeping procedure in which a number of combinations of analog RF beamforming parameters for two or more beams are transmitted. Then, digital baseband beamforming parameters (e.g., digital beamforming parameters for baseband signals that are not modulated on a carrier frequency) may be determined and used for baseband processing of the two or more MIMO streams. The digital baseband beamforming parameters may include baseband precoding parameters used for transmitting the two or more MIMO streams on the two or more beams, and baseband combiner parameters used for receiving the two or more MIMO streams on the two or more beams.

Figure 2:
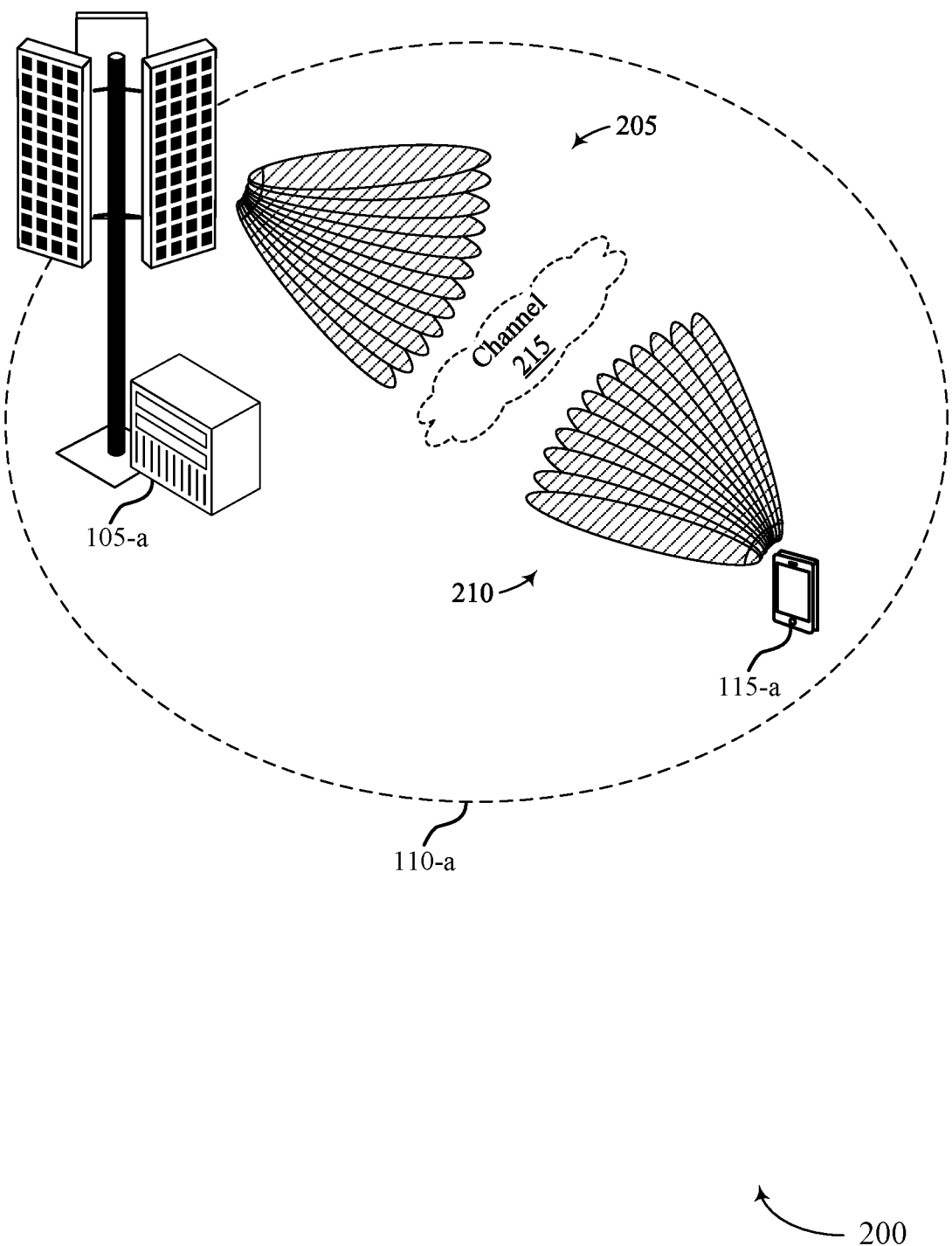

FIG. 2 illustrates an example of a wireless communications system 200 that supports multi-beam selection for beamformed MIMO wireless communications in accordance with aspects of the present disclosure. The wireless communications system 200 may include a base station 105-a and a UE 115-a within a geographic coverage area 110-a. The base station 105-a and the UE 115-a may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. In some examples, the wireless communications system 200 may implement aspects of the wireless communications system 100.

The wireless communications system 200 may, for example, be a MIMO mmW system. The base station 105-a and the UE 115-a may thus support directional communications. In some examples, directional communications may include one or more of the base station 105-a transmitting (or receiving on) one or more directional beams 205 or the UE 115-a transmitting (or receiving) one or more directional beams 210. In some examples, one or more directional beams 205 may have a beam correspondence with one or more directional beams 210. For example, a directional beam 205 and a directional beam 210 may be a beam pair. The wireless communications system 200 may therefore support improvements to power consumption, spectral efficiency, higher data rates and, in some examples, may promote high reliability and low latency for beamforming operations, among other benefits.

In the example of FIG. 2, the base station 105-a and the UE 115-a may perform a beamforming operation in accordance with one or more codebooks to improve beamforming reliability and data rate for directional communications. The codebooks may have a number N possible beamforming vectors, where N may refer to a number of antennas of the base station 105-a and the UE 115-a. In some examples, N may be dependent on $N_T$ and $N_R$, where $N_T$ refers to a number of transmit antennas (e.g., of the base station 105-a) and $N_R$ refers to a number of receive antennas (e.g., of the UE 115-a). In some examples, the beamforming operation may involve the base station 105-a identifying, in accordance with the codebooks, an $f_n$ that results in a metric satisfying a threshold, where $f_n$ is a beamforming vector. Similarly, the beamforming operation may involve the UE 115-a identifying, in accordance with the codebooks, a $w_m$ that results in a metric satisfying a threshold, where $w_m$ is a beamforming combining vector.

The metric may, in some examples, include a signal strength, and the signal strength may be dependent on $w^*_m H f_n$, where H is a channel 215 associated with the directional communications between the base station 105-a and the UE 115-a, and $w_m$ and $f_n$ are the best beamforming vectors for H. Therefore, $w^*_m H f_n$ may be defined as an effective channel. The base station 105-a and the UE 115-a may thus identify and select a directional beam pair (e.g., ($f_n$, $w_m$)) for directional communications (i.e., a single beam approach). In some examples, to enable multi-stream operation, one or more of the base station 105-a or the UE 115-a may determine and select multiple transmit directional beams and receive directional beams. For example, the base station 105-a may determine and select multiple directional beams 205, which may correspond to one or more of transmit directional beams or receive directional beams. In some other examples, the UE 115-a may determine and select multiple directional beams 210, which may correspond to one or more of transmit directional beams or receive directional beams. The multiple transmit directional beams and receive directional beams may be used simultaneously at one or more of the base station 105-a or the UE 115-a. Additionally, in some examples, the various directional beams may be from a same or different panel of one or more of the base station 105-a or the UE 115-a. For example, one or more of the base station 105-a or the UE 115-a may be configured with multiple panels, and each panel may include an array of same or different antennas (e.g., one or more of $N_T$ or $N_R$).

In some examples, one or more of the base station 105-a or the UE 115-a may perform a search over a number of possible beamforming pairs ($f_n$, $w_m$). As demand for communication efficiency increases, it may be desirable for one or more of the base station 105-a or the UE 115-a to target low latencies and improve reliability for beamforming operations, and more specifically to perform a sequential technique to determine wideband and baseband beamforming parameters (e.g., to select two or more beamforming pairs ($f_n$, $w_m$), or beam weights).

Figure 3:
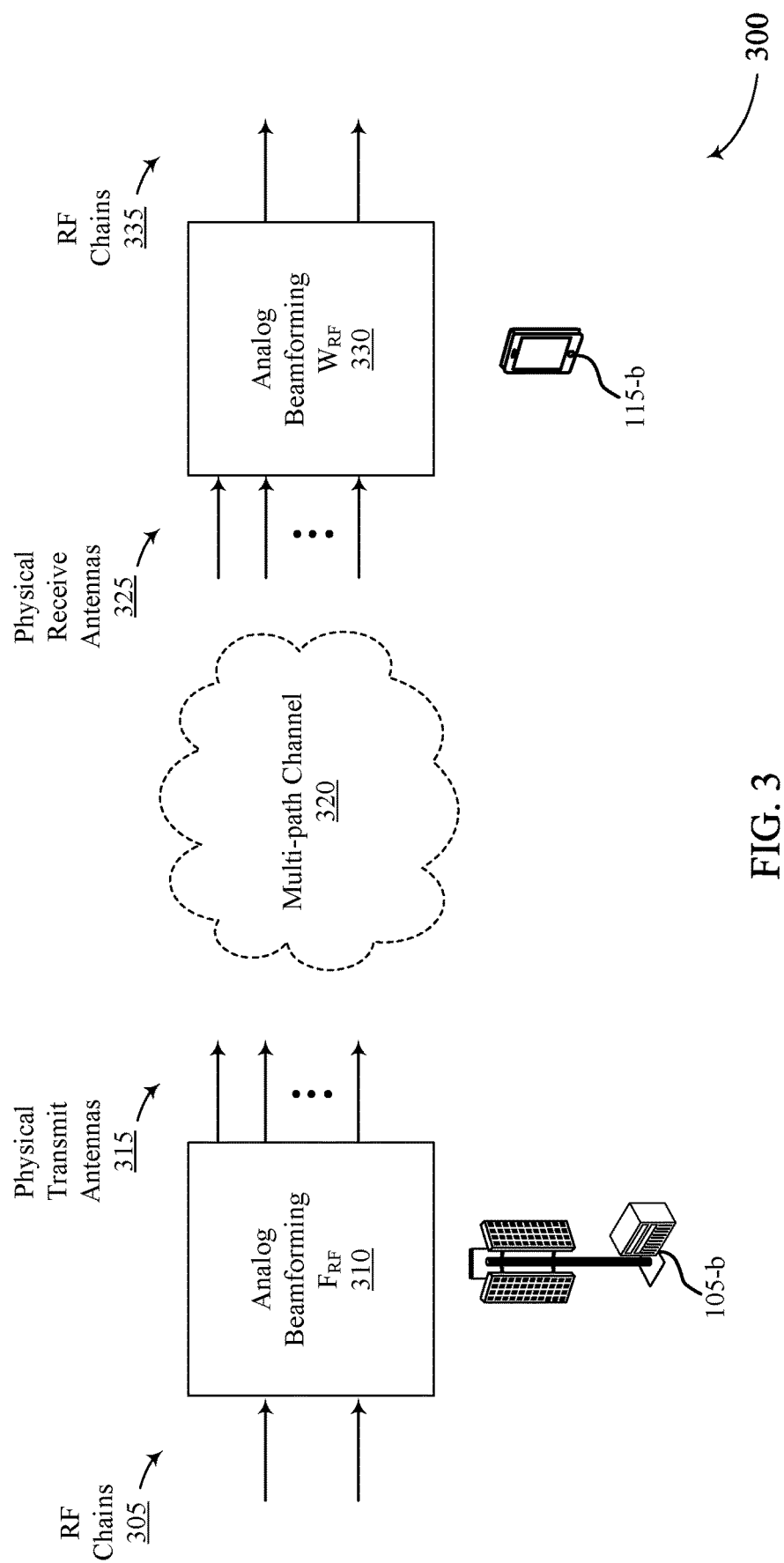

FIG. 3 illustrates an example of a wireless communications system 300 that supports multi-beam selection for beamformed MIMO wireless communications in accordance with aspects of the present disclosure. The wireless communications system 300 may include a base station 105-b and a UE 115-b, which may be examples of the corresponding devices described with reference to FIGS. 1 and 2. In some examples, the wireless communications system 300 may implement aspects of the wireless communications systems 100 and 200. For example, one or more of the base station 105-b or the UE 115-b may support improvements to power consumption, spectral efficiency, higher data rates and, in some examples, may promote high reliability and low latency for beamforming operations, among other benefits.

The base station 105-b may include components for directional communications including components for transmitting and receiving directional communications, including a radio frequency (RF) chain 305 ($N_{RF}^T$), an analog beamforming $F_{RF}$ component 310, and one or more physical transmit antennas 315. These components may be in electronic communication via one or more buses of the base station 105-b. Additionally, in some examples, these components can be implemented, at least in part, by one or both of a modem and a processor of the base station 105-b. The UE 115-b may, additionally, include components for directional communications including components for transmitting and receiving directional communications, including one or more physical receive antennas 325, an analog beamforming $W_{RF}$ component 330, and an RF chain 335 ($N_{RF}^R$). These components may be in electronic communication via one or more buses of the UE 115-b. Additionally, in some examples, these components can be implemented, at least in part, by one or both of a modem and a processor of the UE 115-b. While various examples provided herein may refer to a base station 105 as a transmitting device and a UE 115 as a receiving device, it is to be understood that a UE 115 may be a transmitting device and a base station 105 may be a receiving device and operate in accordance with various techniques discussed herein.

The base station 105-*b* and the UE 115-*b* may perform a beamforming operation in accordance with one or more codebooks to provide beams with suitable reliability and data rate for directional communications. The codebooks may have a number N possible beamforming vectors. In some examples, N may be dependent on $N_T$ and $N_R$, where $N_T$ refers to a number of physical transmit antennas 315 of the base station 105-*b* and $N_R$ refers to a number of physical receive antennas 325 of the UE 115-*b*.

In some examples, two or more beams may be selected for transmission of two or more MIMO streams based on a channel metric associated with different combinations of beams from which the two or more beams may be selected. The metric maybe a signal strength, and the signal strength may be dependent on a multi-path channel 320 (H) associated with the directional communications between the base station 105-*b* and the UE 115-*b*. In some examples, one or more of the base station 105-*b* or the UE 115-*b* may determine an effective channel of the multi-path channel 320 (H) with respect to one or more of the analog beamforming $F_{RF}$ component 310 or the analog beamforming $W_{RF}$ component 330. In other words, the full multi-path channel 320 (H) is unknown to one or more of the base station 105-*b* or the UE 115-*b*. One or more of the base station 105-*b* or the UE 115-*b* may determine and select a directional beam pair (e.g., $(f_n, w_m)$) for directional communications based on the effective channel, and in accordance with, the analog beamforming $F_{RF}$ component 310 or the analog beamforming $W_{RF}$ component 330. Thus, without the analog processing blocks (e.g., the analog beamforming $F_{RF}$ component 310 or the analog beamforming $W_{RF}$ component 330), a link between the base station 105-*b* and the UE 115-*b* cannot be established.

The analog beamforming $F_{RF}$ component 310 may correspond to a number of directional beams. For example, the analog beamforming $F_{RF}$ component 310 may be defined by the following matrix: $F_{RF}=[f_1\ f_2\ \ldots\ f_{N_{RF}^T}]$, where $f_1\ f_2\ \ldots\ f_{N_{RF}^T}$ are beamforming vectors of the beamforming matrix $F_{RF}$. In other words, each element f may correspond to a directional beam of a number of directional beams. The analog beamforming $W_{RF}$ component 330 may also correspond to a number of directional beams. For example, the analog beamforming $W_{RF}$ component 330 may be defined by the following matrix: $W_{RF}=[w_1\ w_2\ \ldots\ w_{N_{RF}^T}]$, where $w_1\ w_2\ \ldots\ w_{N_{RF}^T}$ are beamforming vectors of the beamforming matrix $W_{RF}$. In other words, each element w may correspond to a directional beam of a number of directional beams. In some examples, an improper determination and selection of $F_{RF}$ and $W_{RF}$, by the base station 105-*b* and/or the UE 115-*b*, may change one or more rank properties of the effective channel, and beamforming operations may as a result not be improved (e.g., data rate) relative to non-MIMO communications.

Figure 4:
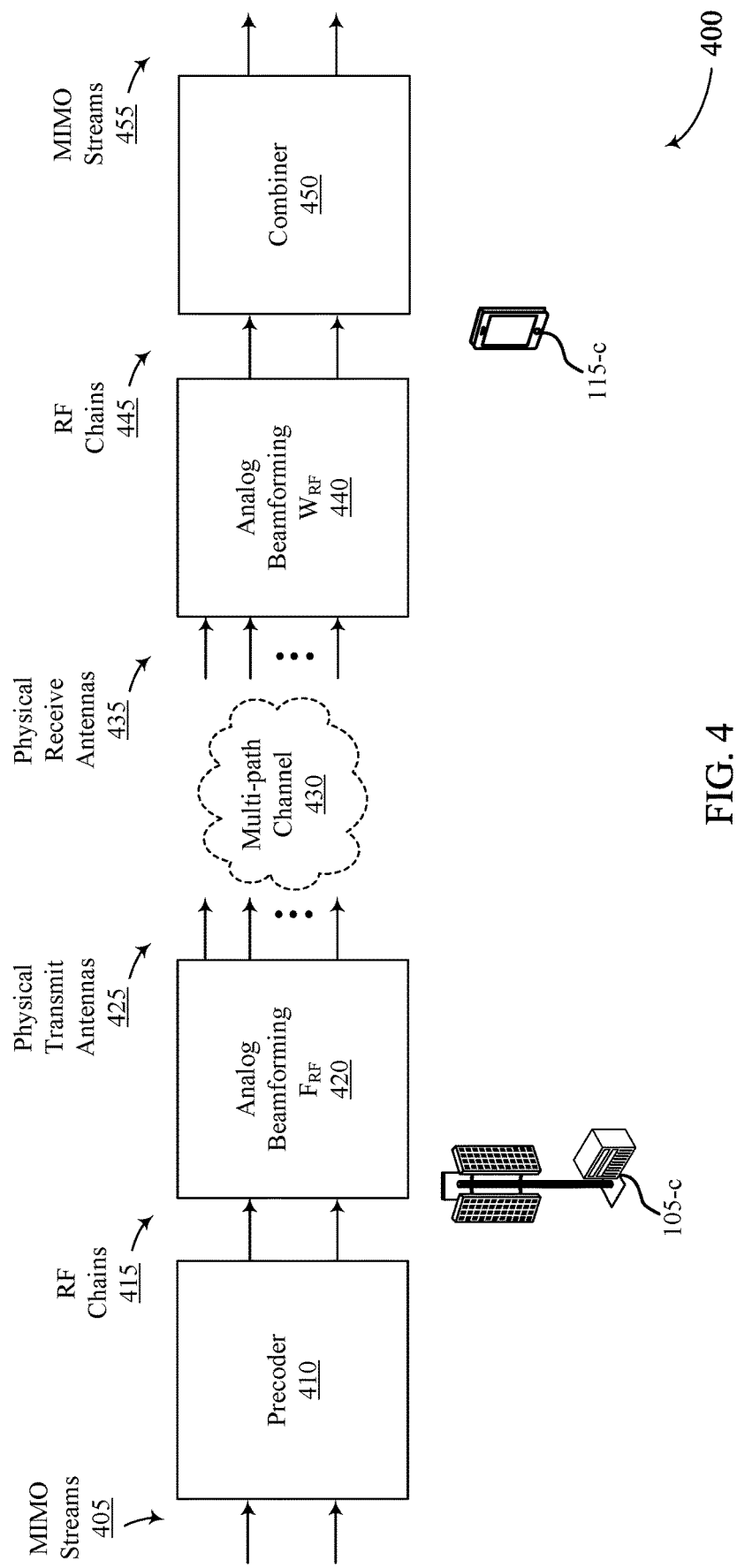

FIG. 4 illustrates an example of a wireless communications system 400 that supports multi-beam selection for beamformed MIMO wireless communications in accordance with aspects of the present disclosure. The wireless communications system 400 may include a base station 105-*c* and a UE 115-*c*, which may be examples of the corresponding devices described with reference to FIGS. 1 through 3. In some examples, the wireless communications system 400 may implement aspects of the wireless communications systems 100 through 300. For example, one or more of the base station 105-*c* or the UE 115-*c* may support improvements to power consumption, spectral efficiency, higher data rates and, in some examples, may promote high reliability and low latency for beamforming operations, among other benefits.

The base station 105-*c* may include components for directional communications including components for transmitting and receiving directional communications, including a precoder 410 (e.g., a baseband precoding component), an RF chain 415 ($N_{RF}^T$), a wideband or analog beamforming $F_{RF}$ component 420, and one or more physical transmit antennas 425 ($N_T$). These components may be in electronic communication via one or more buses of the base station 105-*c*. Additionally, in some examples, these components can be implemented, at least in part, by one or both of a modem and a processor of the base station 105-*c*. In some examples, the UE 115-*c* may, additionally or alternatively, be configured with one or more of the components, such as the precoder 410, the RF chain 415 ($N_{RF}^T$), the analog beamforming $F_{RF}$ component 420, and the one or more physical transmit antennas 425 ($N_T$), when the UE 115-*c* acts as the transmitting device.

The UE 115-*c* may, additionally, include components for directional communications including components for transmitting and receiving directional communications, including one or more physical receive antennas 435, an analog beamforming $W_{RF}$ component 440, an RF chain 445 ($N_{RF}^R$), and a combiner 450. These components may be in electronic communication via one or more buses of the UE 115-*c*. Additionally, in some examples, these components can be implemented, at least in part, by one or both of a modem and a processor of the UE 115-*c*. In some examples, the base station 105-*c* may, additionally or alternatively, be configured with one or more of the components, such as the one or more physical receive antennas 435, the analog beamforming $W_{RF}$ component 440, the RF chain 445 ($N_{RF}^R$), and the combiner 450, when the base station 105-*c* acts as the receiving device.

In some examples, one or more of the base station 105-*c* or the UE 115-*c* may communicate directional communications on a wideband (e.g., over an entire bandwidth) or one or more subbands. A number of RF chains available for MIMO operations for one or more of the base station 105-*c* or the UE 115-*c* may be defined by the following expression: $N_{RF} \leq \min(N_T, N_R)$. In some examples, a precoder (e.g., for downlink directional communications) or a combiner (e.g., for uplink directional communications) at the base station 105-*c* may determine a beamforming matrix $F_{RF}$ as $F_{RF} \in \mathbb{C}^{N_T \times N_{RF}}$, and each column $f_{RF} \in F_{RF}^v$ (i.e., the (analog) codebook at the base station 105-*c*). In some examples, a combiner (e.g., for downlink directional communications) or a precoder (e.g., for uplink directional communications) at the UE 115-*c* may determine a beamforming matrix $W_{RF}$ as $W_{RF} \in \mathbb{C}^{N_R \times N_{RF}}$, and each column $w_{RF} \in W_{RF}^v$ (i.e., the (analog) codebook at the UE 115-*c*). Thus, $(f_{RF} \in F_{RF}^v, w_{RF} \in W_{RF}^v)$ may an analog beamforming pair for single-input single-output (SISO) operation.

One or more of the base station 105-*c* or the UE 115-*c* may determine a beamforming pair for a transmit analog precoder (e.g., downlink: $F_{RF}$, uplink: $W_{RF}$) and beamforming pair for a receive combiner (e.g., downlink: $W_{RF}$, uplink: $F_{RF}$). In some examples, one or more of the base station 105-*c* or the UE 115-*c* may determine the beamforming pairs using one or more reference signals. For example, one or more of the base station 105-*c* or the UE 115-*c* may determine the beamforming pairs using one or more downlink reference signals or uplink reference signals. Examples of downlink reference signals include a channel state information (CSI) reference signal (CSI-RS), a synchronization signal block (SSB), and the like. Examples of uplink reference signals include a sounding reference signal (SRS), and the like. In some examples, downlink and uplink can use either the same reference signal or different reference signals. In some examples, if downlink reference signals are used, the UE 115-c may determine the best $F_{RF}$ and $W_{RF}$, and report the best $F_{RF}$ to the base station 105-c. Similarly, if uplink reference signals are used, the base station 105-c may determine the best $F_{RF}$ and $W_{RF}$, and report the best $W_{RF}$ to the UE 115-c.

In some examples, the base station 105-c may receive, at the precoder 410, one or more MIMO streams 405 ($N_S$). In some examples, one or more of the base station 105-c or the UE 115-c may be capable of supporting a number of MIMO streams ($N_S$) depending on a number of RF chains. In other words, one or more of the base station 105-c or the UE 115-c may be configured to support a number of MIMO streams ($N_S$) according to the following expression: $N_S \leq N_{RF}$. The precoder 410 may process the one or more MIMO streams 405 ($N_S$) by performing one or more baseband beamforming related operations, such as a digital beamforming operation, an inverse fast Fourier transform (IFFT) operation, or a digital-to-analog conversion (DAC) operation, among other examples. The precoder 410 may then forward, via the RF chain 415, the processed one or more MIMO streams 405 (e.g., in the form of packets) to the wideband (e.g., analog) beamforming $F_{RF}$ component 420. The analog beamforming $F_{RF}$ component 420 may determine and select one or more directional beams (e.g., based on one or more beamforming elements of a beamforming matrix $W_{RF}$ provided by the UE 115-c, or by referencing a codebook) and map them to the one or more physical transmit antennas 425 for transmitting to the UE 115-c over a multi-path channel 430.

The UE 115-c may receive one or more packets (e.g., associated with the processed one or more MIMO streams 405) on the one or more physical receive antennas 435. In some examples, the UE 115-c may receive and perform a de-mapping operation via the analog beamforming $W_{RF}$ component 440 (e.g., based on one or more beamforming elements of a beamforming matrix $F_{RF}$ provided by the base station 105-c, or by referencing a codebook). The analog beamforming $W_{RF}$ component 440 may forward the one or more packets to the RF chain 445, which may then forward the one or more packets to the combiner 450. The combiner 450 may process the one or more packets (e.g., in the form of packets) by performing one or more beamforming related operations, such as a digital baseband processing beamforming operation, a fast Fourier transform (FFT) operation, or an analog-to-digital conversion (ADC) operation, among other examples. The combiner 450 may then output the one or more packets in the form of one or more MIMO streams 455.

Additionally or alternatively, one or more of the base station 105-c or the UE 115-c may determine one or more beamforming pairs for a transmit baseband precoder (e.g., downlink: $F_{BBS}[k]$, uplink: $W_{BBS}[k]$) or a receive baseband combiner (e.g., downlink: $W_{BBS}[k]$, uplink: $F_{BBS}[k]$). A baseband precoder (for downlink) or a baseband combiner (for uplink) at the base station 105-c may thus be defined by the following expression: $F_{BB}[k] \in \mathbb{C}^{N_{RF} \times N_S}$. Similarly, a baseband combiner (for downlink) or a baseband precoder (for uplink) at the UE 115-c may be defined by the following expression: $W_{BB}[k] \in \mathbb{C}^{N_{RF} \times N_S}$. The effective precoder/combiner at the base station 105-c may thus be represented by the following expression: $F_T[k]=F_{RF}F_{BB}[k]$, and the effective combiner/precoder at the UE 115-c may be represented by the following expression: $W_R[k]=W_{RF}W_{BB}[k]$. In some examples, one or more of the precoder 410 or the combiner 450 may be dependent on a subband or a subcarrier (e.g., OFDM subcarrier) or a multi-tap for single carrier implementations. In some examples, k may be a subband value from 1 to $N_{SB}$, for example a subband or a subcarrier index (e.g., OFDM subcarrier index) or a tap index in single carrier implementations.

In some examples, a baseband received signal vector at a subband k may be defined by the following equation:

$$y[k]=W^*_{BB}[k]W^*_{RF}H[k]F_{RF}F_{BB}[k]s[k]+W^*_{BB}[k]W^*_{RF}n[k] \quad (1)$$

for k=1, . . . , $N_{SB}$, where H[k] is the multi-path channel 430 at subband k, s[k] is a transmit signal at subband index k (e.g., a signal transmitted by the base station 105-c), $F_{RF}F_{BB}[k]$ is the precoder 410 at a transmitting-side (e.g., at the base station 105-c), and $W^*_{BB}[k]W^*_{RF}$ is the combiner 450 at a receiving-side (e.g., at the UE 115-c). In some examples, the $W^*_{RF}$ and the $F_{RF}$ are wideband, radio frequency BF (i.e., common for all k) while the $W^*_{BB}[k]$ and the $F_{BB}[k]$ are subband baseband BF (i.e., dependent on subband index k). In some examples, n[k] may be noise at a subband index k. The noise n[k] at a subband index k may be Gaussian noise. In some other examples, the noise n[k] at a subband index k may be thermal noise, intermodulation noise, electronic noise, quantum noise, among other examples.

One or more of the base station 105-c or the UE 115-c may support improvements in determining mutual information (MI) (e.g., maximizing an achievable rate) for a (radio frequency) codebook. In some examples, one or more of the base station 105-c or the UE 115-c may determine the mutual information in accordance with the following equation:

$$MI = \max_{F_{RF},W_{RF}} \sum_{k=1}^{N_{SB}} \log_2 \left| I_{N_S} + \frac{SNR}{N_S} \hat{H}[k]\hat{H}^*[k] \right| \quad (2)$$

where $\hat{H}[k]=W^*_{BB}[k]W^*_{RF}H[k]F_{RF}F_{BB}[k]$, SNR is the signal-to-noise ratio, and $N_S$ corresponds to one or more streams (e.g., MIMO streams) and |A| stands for the determinant of square matrix A. This equation assumes the analog and baseband combiners are designed such that the noise variance is an identity matrix, and techniques as discussed herein also provides such a property. In some examples, one or more of the base station 105-c or the UE 115-c may determine the mutual information for $F_{BB}[1], \ldots, F_{BB}[N_{SB}]$ and $W_{BB}[1], \ldots, W_{BB}[N_{SB}]$. One or more of the base station 105-c or the UE 115-c may determine the mutual information, in some examples, such that $F_{RF} \in \mathcal{F}_{RF}$ and $W_{RF} \in \mathcal{W}_{RF}$, where $\mathcal{F}_{RF}$ is an analog codebook for $F_{RF}$ and where $\mathcal{W}_{RF}$ is an analog codebook for $W_{RF}$.

Figure 5:
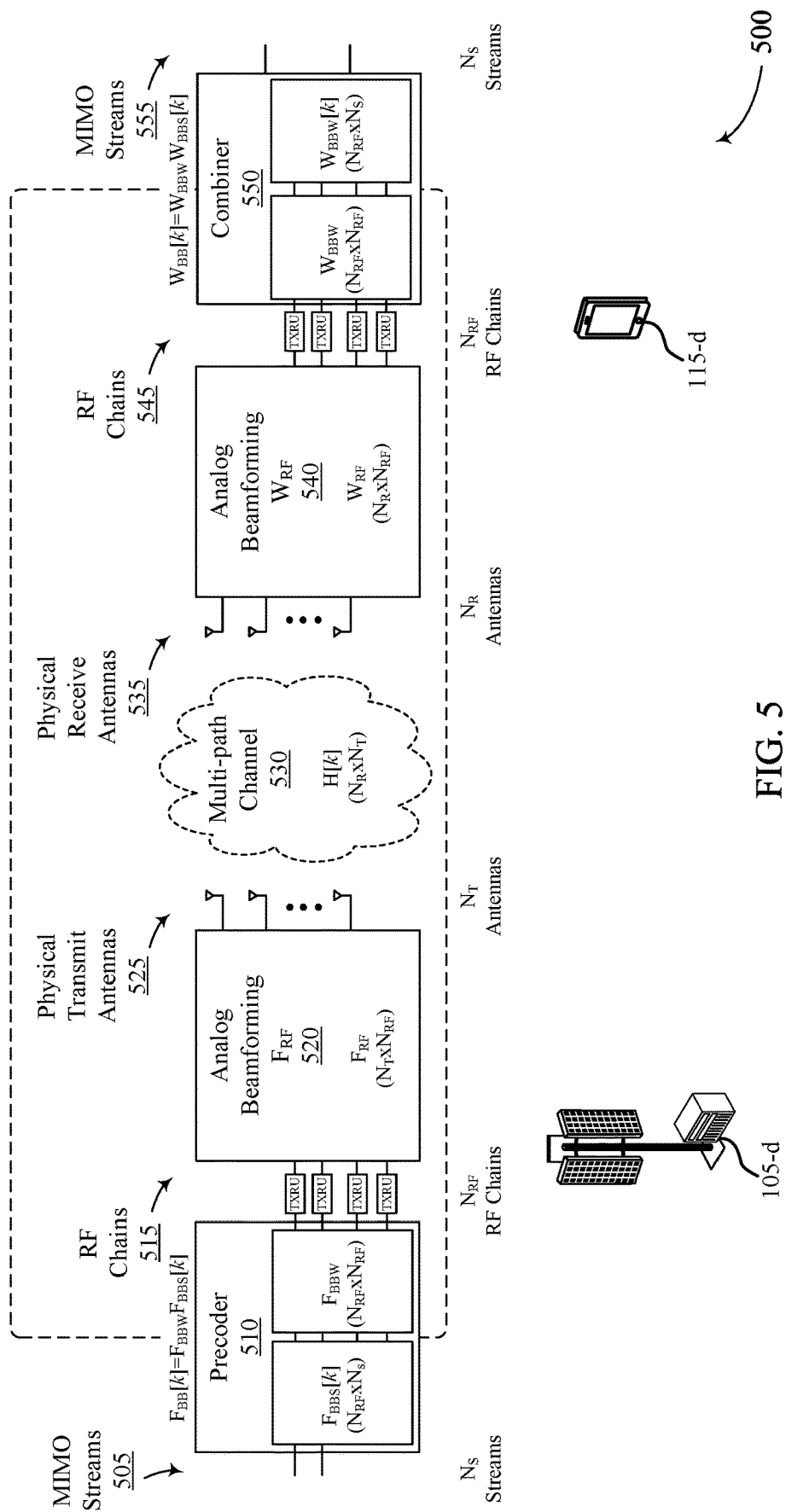

FIG. 5 illustrates an example of a wireless communications system 500 that supports multi-beam selection for beamformed MIMO wireless communications in accordance with aspects of the present disclosure. The wireless communications system 500 may include a base station 105-d and a UE 115-d, which may be examples of the corresponding devices described with reference to FIGS. 1 through 4. In some examples, the wireless communications system 500 may implement aspects of the wireless communications systems 100 through 400. For example, one or more of the base station 105-d or the UE 115-d may support improvements to power consumption, spectral efficiency, higher data rates and, in some examples, may promote high reliability and low latency for beamforming operations, among other benefits.

The base station 105-d may include components for directional communications including components for transmitting and receiving directional communications, including a precoder 510, RF chains 515 ($N_{RF}^T$) (corresponding to number of a transceiver units (TXRUs)), an analog beamforming $F_{RF}$ component 520, and one or more physical transmit antennas 525 ($N_T$). These components may be in electronic communication via one or more buses of the base station 105-d. Additionally, in some examples, these components can be implemented, at least in part, by one or both of a modem and a processor of the base station 105-d. In some examples, the UE 115-d may, additionally or alternatively, be configured with one or more of the components, such as the precoder 510, RF chains 515 ($N_{RF}^T$) (corresponding to number of a transceiver units (TXRUs)), the analog beamforming $F_{RF}$ component 520, and the one or more physical receive antennas 525 ($N_T$), when the UE 115-d acts as the transmitting device.

The UE 115-d may, additionally, include components for directional communications including components for transmitting and receiving directional communications, including one or more physical receive antennas 535, an analog beamforming $W_{RF}$ component 540, an RF chain 545 ($N_{RF}^R$), and a combiner 550. These components may be in electronic communication via one or more buses of the UE 115-d. Additionally, in some examples, these components can be implemented, at least in part, by one or both of a modem and a processor of the UE 115-d. In some examples, the base station 105-d may, additionally or alternatively, be configured with one or more of the components, such as the one or more physical receive antennas 535, the analog beamforming $W_{RF}$ component 540, the RF chain 545 ($N_{RF}^R$), and the combiner 550, when the base station 105-d acts as the receiving device.

In some examples, the base station 105-d may receive, at the precoder 510, one or more MIMO streams 505 ($N_S$). In some examples, one or more of the base station 105-d or the UE 115-d may be capable of supporting a number of MIMO streams ($N_S$) depending on a number of RF chains. In other words, one or more of the base station 105-d or the UE 115-d may be configured to support a number of MIMO streams ($N_S$) according to the following expression: $N_S \le N_{RF}$. The precoder 510 may process the one or more MIMO streams 505 ($N_S$) by performing one or more beamforming related operations, such as a digital beamforming operation, an IFFT operation, or a DAC operation, among other examples. The precoder 510 may then forward, via the RF chain 515, the processed one or more MIMO streams 505 (e.g., in the form of packets) to the analog beamforming $F_{RF}$ component 520. The analog beamforming $F_{RF}$ component 520 may determine and select one or more directional beams (e.g., based on one or more beamforming elements of a beamforming matrix $W_{RF}$ provided by the UE 115-d, or by referencing a codebook) and map them to the one or more physical transmit antennas 525 for transmitting to the UE 115-d over a multi-path channel 530 (e.g., also referred to as H[k]). In some examples, a baseband effective channel at a subband k may be defined by the following expression:

$$H_{eff}[k] = W^*_{BBW} W^*_{RF} H[k] F_{RF} F_{BBW}.$$

The UE 115-d may receive one or more packets (e.g., associated with the processed one or more MIMO streams 505) on the one or more physical receive antennas 535. In some examples, the UE 115-d may receive and perform a de-mapping operation via the analog beamforming $W_{RF}$ component 540 (e.g., based on one or more beamforming elements of a beamforming matrix $F_{RF}$ provided by the base station 105-d, or by referencing a codebook). The analog beamforming $W_{RF}$ component 540 may forward the one or more packets to the RF chain 545, which may then forward the one or more packets to the combiner 550. The combiner 550 may process the one or more packets (e.g., in the form of packets) by performing one or more beamforming related operations, such as a digital processing beamforming operation, a FFT operation, or a ADC operation, among other examples. The combiner 550 may then output the one or more packets in the form of one or more MIMO streams 555.

One or more of the base station 105-d or the UE 115-d may determine one or more beamforming pairs for a transmit baseband precoder (e.g., downlink: $F_{BBS}[k]$, uplink: $W_{BBS}[k]$) or a receive baseband combiner (e.g., downlink: $W_{BBS}[k]$, uplink: $F_{BBS}[k]$). In some examples, one or more of the base station 105-d or the UE 115-d may determine a $F_{RF}$ and an $W_{RF}$, which may be wideband BF (i.e., common for all subband indices k). In some examples, one or more of the base station 105-d or the UE 115-d may determine a $F_{BBW}$ and an $W_{BBW}$, which may be wideband BF (i.e., at a subband index k).

In some examples, one or more of the base station 105-d or the UE 115-d may determine one or more of $F_{RF}$, $F_{BBW}$, $F_{BBS}[k]$, $W_{RF}$, $W_{BBW}$, and $W_{BBS}[k]$ sequentially for all subcarriers k. For example, one or more of the base station 105-d or the UE 115-d may initially determine $F_{RF}$ and $W_{RF}$. In some examples, $F_{BBW}$ and $W_{BBW}$ may depend exclusively on $F_{RF}$ and $W_{RF}$. For example, the base station 105-d may determine $F_{BBW}$ based on the following expressions: $F_{BBW} = (F^*_{RF} F_{RF})^{-1/2}$, and the UE 115-d may determine $W_{BBW}$ based on the following expressions: $W_{BBW} = (W^*_{RF} W_{RF})^{-1/2}$. In some examples, $F_{RF}$ and $W_{RF}$ may be exclusively dependent on H[k]'s (i.e., the multi-path channel 530 at subbands indices k). One or more of the base station 105-d or the UE 115-d may thus determine a beamforming pair $\{F_{RF}, W_{RF}\}$ according to the following equation:

$$\{F_{RF}, W_{RF}\} = \underset{F_{RF} \in F_{RF}, W_{RF} \in W_{RF}}{\operatorname{argmax}} \sum_{k=1}^{N_{SB}} \sum_{j=1}^{N_S} \log_2 \left| 1 + \frac{SNR}{N_S} \lambda_j^2 \left( (W^*_{RF} W_{RF})^{-\frac{1}{2}} W^*_{RF} H[k] F_{RF} (F^*_{RF} F_{RF})^{-1/2} \right) \right| \quad (3)$$

where $\lambda_j(A)$ denotes the j-th singular value of A. In some examples, the equation (3) may be simplified to the following equation:

$$\{F_{RF}, W_{RF}\} = \underset{F_{RF} \in F_{RF}, W_{RF} \in W_{RF}}{\operatorname{argmax}} \sum_{k=1}^{N_{SB}} \sum_{j=1}^{N_S} \log_2 \left| 1 + \frac{SNR}{N_S} \lambda_j^2 (H_{eff}[k]) \right| \quad (4)$$

where $H_{eff}[k]$ is $((W^*_{RF} W_{RF})^{-1/2} W^*_{RF} H[k] F_{RF} (F^*_{RF} F_{RF})^{-1/2})$. Once one or more of the base station 105-d or the UE 115-d determine $F_{RF}$, $W_{RF}$, one or more of the base station 105-d or the UE 115-d may determine $F_{BBS}[k]$ and $W_{BBS}[k]$, which may depend exclusively on $H_{eff}[k]$. As such, $F_{BBS}[k]$ and $W_{BBS}[k]$ may be the matrices composed of the dominant $N_S$ right and left singular vectors of $H_{eff}[k]$'s.

In some examples, the determining $\{F_{RF}, W_{RF}\}$ may involve one or more of the base station 105-d or the UE 115-d performing a search according to a beam training procedure. The following is an example search for determining $F_{RF}$ and $W_{RF}$ at the base station 105-$d$ and the UE 115-$d$ without knowing H[k] explicitly. For example, one or more of the base station 105-$d$ or the UE 115-$d$ may use a beam sweeping operation (i.e., by testing a set of possible codebook candidates) for $F_{RF}$ and $W_{RF}$. In other words, one or more of the base station 105-$d$ or the UE 115-$d$ may use a beam sweeping operation to determine candidates $F_{RF}$ and $W_{RF}$ using the equation (3). As such, one or more of the base station 105-$d$ or the UE 115-$d$ may determine $F_{RF} \in \mathcal{F}_{RF} = \{F_{RF,1}, \ldots, F_{RF,P}\}$ and $W_{RF} \in \mathcal{W}_{RF} = \{W_{RF,1}, \ldots, W_{RF,Q}\}$. In some examples, the elements (i.e., $\{F_{RF,1}, \ldots, F_{RF,P}\}$) in $\mathcal{F}_{RF}$ may be referred to as p-elements, while the elements (i.e., $\{W_{RF,1}, \ldots, W_{RF,Q}\}$) in $\mathcal{W}_{RF}$ may be referred to as q-elements. Accordingly, by determining mutual information for all possible PQ combinations of (p, q), one or more of the base station 105-$d$ or the UE 115-$d$ may determine (or obtain) a best solution $p_{best}$ and $q_{best}$.

In some cases, the determination of $p_{best}$ and $q_{best}$ may be performed as a first stage in a sequential technique for determining MIMO beamforming parameters. The first stage in such techniques may provide for determination of a transmission analog precoder (i.e., DL: $F_{RF}$, UL: $W_{RF}$) and receive analog combiner (i.e., DL: $W_{RF}$, UL: $F_{RF}$). The beam sweeping operation may be performed using downlink reference signals (e.g., CSI-RS, SSB, etc.), uplink reference signals (e.g. SRS, etc.), or combinations thereof. In cases that use a downlink reference signal, the UE 115-$d$ may determine a preferred $F_{RF}$ and $W_{RF}$ and report the determined $F_{RF}$ to the base station 105-$d$. In cases that use an uplink reference signal, the base station 105-$d$ may determine the $F_{RF}$ and $W_{RF}$ and reports the determined $W_{RF}$ to the UE 115-$d$. In some cases, the downlink and uplink may use either the same reference signal or different reference signals.

Following the first stage, a second stage may include determination of a transmission baseband precoder (i.e., DL: $F_{BBS}[k]$, UL: $W_{BBS}[k]$). Such a determination may, in some cases, reuse the results of the first stage without any additional reference signal transmissions. In other cases, one or more additional downlink or uplink reference signals may be used. Following the second stage a third stage may include determination of a receive baseband combiner (i.e., DL: $W_{BBS}[k]$, UL: $F_{BBS}[k]$). In some cases, a demodulation reference signal (DMRS) transmitted with a shared channel transmission (e.g., PDSCH, PUSCH) may be used to determine the baseband combiner.

With reference to the first stage, various techniques provide for determination of $F_{RF}$ and $W_{RF}$ at the base station 105-$d$ and the UE 115-$d$ without knowing H[k]'s explicitly, such as the technique discussed above with reference to Equations (3) and (4) using beam sweeping at both the base station 105-$d$ and UE 115-$d$, i.e., by testing all possible combinations of candidates of codebooks $\mathcal{F}_{RF} = \{F_{RF,1}, \ldots, F_{RF,P}\}$ and $\mathcal{W}_{RF} = \{W_{RF,1}, \ldots, W_{RF,Q}\}$, such that in Equations (3) and (4) $F_{RF} \in \mathcal{F}_{RF} = \{F_{RF,1}, \ldots, F_{RF,P}\}$, $W_{RF} \in \mathcal{W}_{RF} = \{W_{RF,1}, \ldots, W_{RF,Q}\}$. By calculating MI metrics for all possible PQ combinations of (p, q), the solution, $p_{best}$ and $q_{best}$, can be obtained and reported as needed. In some cases, it is possible Q=1 (i.e., only base station 105-$d$ does beam sweeping) or P=1 (i.e., only UE 115-$d$ does beam sweeping). The reference signal used for the beam sweeping may include, for example, CSI-RS for downlink reference signals or SRS for uplink reference signals.

A first option may include using downlink reference signals for beam sweeping. In such cases, the base station 105-$d$ transmits a number of reference signals (e.g., CSI-RS) for each combination of P and Q in the configured codebooks. The UE 115-$d$ may receive and measure the reference signals, calculate the MI metric, and find an acceptable or optimal $F_{RF}(=F_{RF,p_{best}})$ and $W_{RF}(=W_{RF,q_{best}})$. The UE 115-$d$ may then report $p_{best}$ to the base station 105-$d$, noting that if P=1 this is not needed. In some cases, the report of $p_{best}$ may be an indication of a codebook index in $\mathcal{F}_{RF}$ associated with $p_{best}$. A second option may include using uplink reference signals for beam sweeping. In such cases, the UE 115-$d$ transmits a number of uplink reference signals (e.g., SRS) for each combination of P and Q in the configured codebooks. The base station 105-$d$ may then receive and measure the reference signals, calculate the MI metric, and find an acceptable or optimal $F_{RF}(=F_{RF,p_{best}})$ and $W_{RF}(=W_{RF,q_{best}})$. The base station 105-$d$ may then reports $q_{best}$ to the UE 115-$d$, noting that if Q=1, this is not needed. In some cases, the report of $p_{best}$ may be an indication of a codebook index in $\mathcal{W}_{RF}$ associated with $q_{best}$. The downlink and uplink determinations may use either the same reference signal or different reference signals (e.g., DL-RS is used for DL and UL, UL-RS is used for DL and UL, or DL-RS is used for DL and UL-RS is used for UL).

In the second stage, the transmission baseband precoder (DL: $F_{BBS}[k]$, UL: $W_{BBS}[k]$) may be determined. In cases where the baseband precoder is determined for downlink transmissions, and downlink reference signals are used, and measured at the UE 115-$d$, the base station 105-$d$ will not know the effective channel $H_{eff}[k]$ with respect to the determined $F_{RF}$ and $W_{RF}$, as this is only known at the UE 115-$d$ at this point. In some cases, the UE 115-$d$ may transmit an uplink reference signal (e.g., SRS) using the determined $W_{RF}$, and the base station 105-$d$ then estimates the effective baseband channel $H_{eff}[k]$ by based on measurements of the uplink reference signal using the signaled $F_{RF}$ (i.e., $F_{RF,pbest}$) that was signaled in the first stage and $F_{BBW} = (F^*_{RF} F_{RF})^{-1/2}$. The base station 105-$d$ then determines the transmission baseband precoder $F_{BBS}[k]$ based on $H_{eff}[k]$. In cases where uplink reference signals are used at the first stage, and measured at the base station 105-$d$, the base station 105-$d$ will know the effective channel $H_{eff}[k]$ with respect to the determined $F_{RF}$ and $W_{RF}$, and thus no additional reference signal is required, and the base station 105-$d$ determines the transmission baseband precoder $F_{BBS}[k]$ based on $H_{eff}[k]$.

In cases where the baseband precoder is determined for uplink transmissions, and when downlink reference signals are used in the first stage, the UE 115-$d$ will know the effective channel $H_{eff}[k]$ with respect to the best $F_{RF}$ and $W_{RF}$, no additional reference signal is required, and the UE 115-$d$ determines the transmission baseband precoder $W_{BBS}[k]$ based on $H_{eff}[k]$. In cases where an uplink reference signal is used in the first stage, the UE 115-$d$ does not know the effective channel $H_{eff}[k]$ with respect to the determined $F_{RF}$ and $W_{RF}$, and the base station 105-$d$ may transmit a downlink reference signal (e.g., CSI-RS) using the determined $F_{RF}$. The UE 115-$d$ may receive and measure the downlink reference signal and estimate the effective baseband channel $H_{eff}[k]$ by using the signaled $W_{RF}$ (i.e., $W_{RF,qbest}$) that was signaled in the first stage and $W_{BBW} = (W^*_{RF} W_{RF})^{-1/2}$. The UE 115-$d$ then determines the transmission baseband precoder $W_{BBS}[k]$ based on $H_{eff}[k]$.

In the third stage, the determination of the receive baseband combiner (i.e., DL: $W_{BBS}[k]$, UL: $F_{BBS}[k]$) may be performed based on a reference signal (e.g., DMRS) transmitted with a shared channel transmission for both uplink and downlink. In some cases, the transmitter (i.e., DL: base station 105-$d$, UL: UE 115-$d$) may send DMRS by using the determined analog and baseband precoder (i.e., DL: $F_{RF}$ and $F_{BBS}[k]$, UL: $W_{RF}$ and $W_{BBS}[k]$). The receiver (i.e., DL: UE 115-d, UL: base station 105-d) may estimate the effective channel $H_{eff}[k]$ by using the determined analog combiner (i.e., DL: $W_{RF}$, UL: $F_{RF}$) via DMRS. The receiver may then determine the receive baseband combiner (i.e., DL: $W_{BBS}[k]$, UL: $F_{BBS}[k]$) based on $H_{eff}[k]$. The receiver may then decode the shared channel transmission (e.g., PDSCH or PUSCH) by using the determined receive baseband combiner (DL: $W_{BBS}[k]$, UL: $F_{BBS}[k]$). While examples discussed herein refer to DMRS, additionally or alternatively it is possible to use an explicit reference signal. Examples of such sequential techniques are illustrated in FIGS. 6 through 11.

Figure 6:
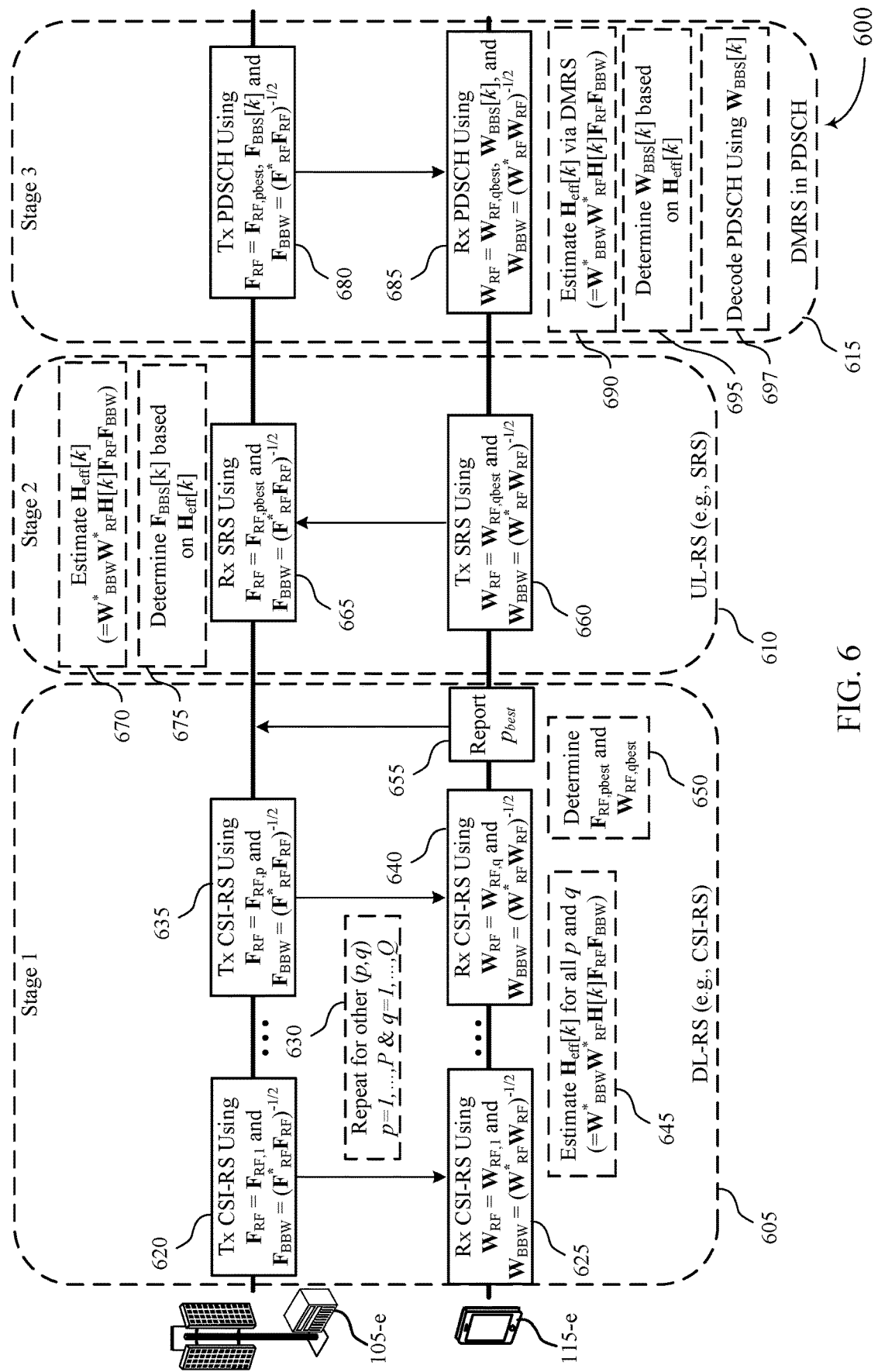
FIGS. 6 through 11 illustrate example of process flows that support multi-beam selection for beamformed MIMO wireless communications in accordance with aspects of the present disclosure.

FIG. 6 illustrates an example of a process flow 600 that supports multi-beam selection for beamformed MIMO wireless communications in accordance with aspects of the present disclosure. The process flow 600 may illustrate a beam training technique and sequential approach for determining MIMO beamforming parameters for two or more beams using a number of downlink reference signals, and an uplink reference signal. In some examples, the process flow 600 may implement aspects of the wireless communications systems 100 through 500, as described with reference to FIGS. 1 through 5. For example, the process flow 600 may be based on a configuration by a base station 105 or a UE 115, and implemented for reduced power consumption, spectral efficiency, higher data rates and, in some examples, may promote high reliability and low latency for beamforming operations, among other benefits.

The process flow 600 may include a base station 105-e and a UE 115-e, which may be examples of base stations 105 and UEs 115 as described with reference to FIGS. 1 through 5. In the following description of the process flow 600, the operations between the base station 105-e and the UE 115-e may be transmitted in a different order than the example order shown, or the operations performed by the base station 105-e and the UE 115-e may be performed in different orders or at different times. Some operations may also be omitted from the process flow 600, and other operations may be added to the process flow 600.

In this example, the process flow 600 includes multiple stages, in accordance with the discussion of FIG. 5, including a first stage 605 for determination of a transmission analog precoder ($F_{RF}$) and a receive analog combiner ($W_{RF}$), a second stage 610 for determination of a transmission baseband precoder ($F_{BBS}[k]$), and a third stage 615 for determination of a receive baseband combiner ($W_{BBS}[k]$).

In this example, the first stage 605, the process flow 600 may commence at 620 with the base station 105-e transmitting a CSI-RS using $F_{RF}=F_{RF,1}$ and $F_{BBW}=(F^*_{RF}F_{RF})^{-1/2}$. At 625, the UE 115-e may receive the CSI-RS using $W_{RF}=W_{RF,1}$ and $W_{BBW}=(W^*_{RF}W_{RF})^{-1/2}$. This may be repeated for other combinations of p and q, at 630, until a last CSI-RS transmission at 635 and a corresponding reception at 640. At 645, the UE 115-e may estimate $H_{eff}[k]$ for all p and q. In some examples, the UE 115-e may estimate $H_{eff}[k]$ to be $W^*_{BBW}W^*_{RF}H[k]F_{RF}F_{BBW}$ for all p and q. Thus, the base station 105-e may select a p-element from a codebook $F_{RF}$, for example, p=1, and transmit the CSI-RS on a directional beam corresponding to p=1. Similarly, the UE 115-e may select a q-element from a codebook $W_{RF}$, for example, q=1, and receive the CSI-RS on a directional beam corresponding to q=1. This is performed for the combinations PQ, and at 650, the UE 115-e may determine a best or preferred $F_{RF,p_{best}}$ and a $W_{RF,q_{best}}$, based on the different estimates (e.g., that maximize MI). At 655, the UE 115-e may report the $p_{best}$ to the base station 105-e.

At the second stage 610, the baseband precoder is determined. In this example, at 660, the UE 115-e may transmit a SRS using $W_{RF}=W_{RF,q_{best}}$ and $W_{BBW}=(W^*_{RF}W_{RF})^{-1/2}$. The base station 105-e, at 665, may receive the SRS and at 670 estimate $H_{eff}[k]$ to be $W^*_{BBW}W^*_{RF}H[k]F_{RF}F_{BBW}$. At 675, the base station 105-e may determine $F_{BBS}[k]$ based on $H_{eff}[k]$.

At the third stage 615, the base station 105-e may transmit, at 680, a PDSCH transmission using $F_{RF,p_{best}}$, $F_{BBS}[k]$, and $F_{BBW}=(F^*_{RF}F_{RF})^{-1/2}$. At 685, the UE 115-e may receive the PDSCH using $W_{RF,q_{best}}$, $W_{BBS}[k]$, and $W_{BBW}=(W^*_{RF}W_{RF})^{-1/2}$. At 690, the UE 115-e may estimate $H_{eff}[k]$ based on the DMRS (i.e., $W^*_{BBW}W^*_{RF}H[k]F_{RF}F_{BBW}$). At 695, the UE 115-e may determine $W_{BBS}[k]$ based on $H_{eff}[k]$. At 697, the UE 115-e may decode the PDSCH using $W_{BBS}[k]$ at the receive combiner.

Figure 7:
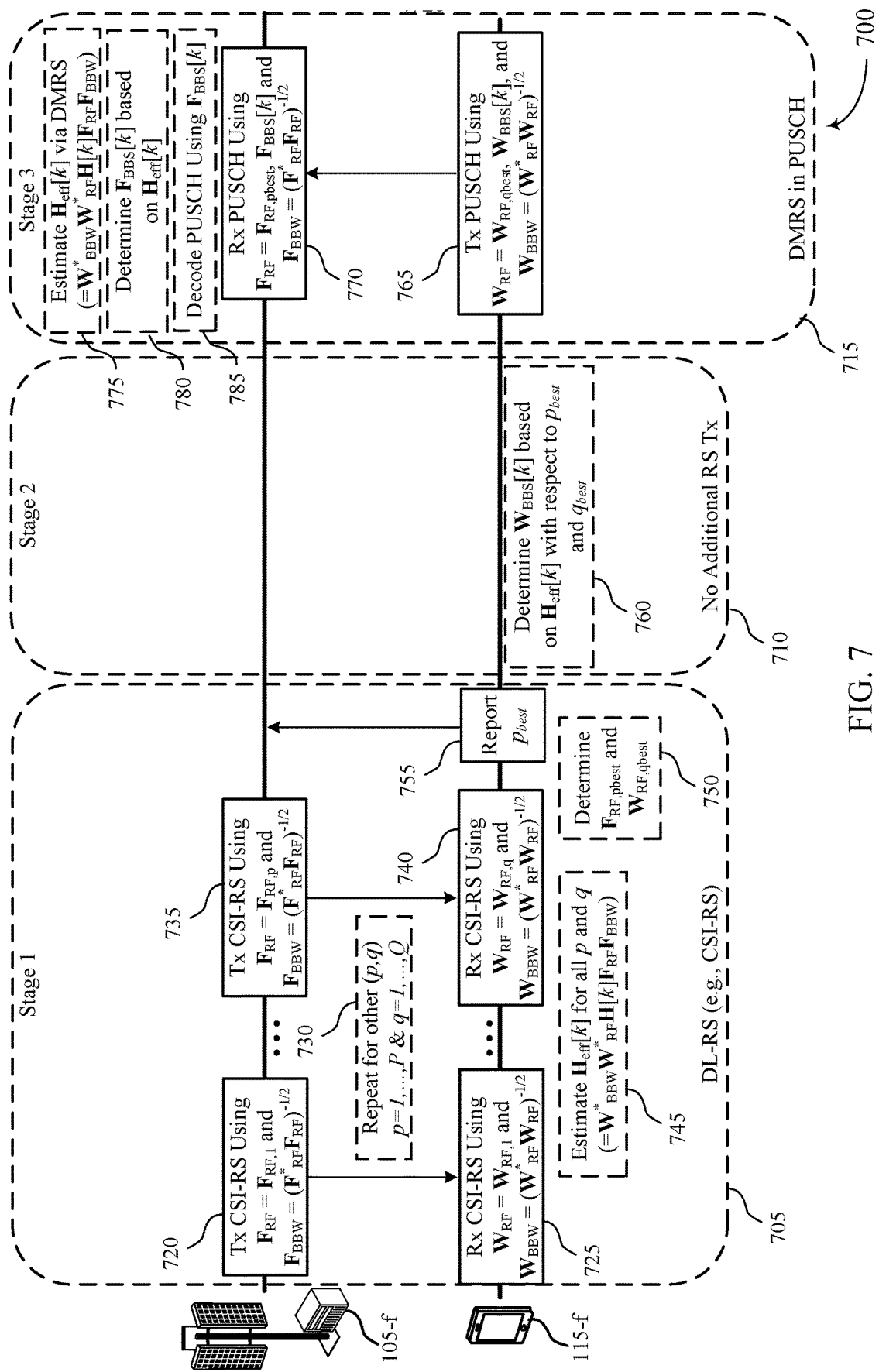

FIG. 7 illustrates an example of a process flow 700 that supports multi-beam selection for beamformed MIMO wireless communications in accordance with aspects of the present disclosure. The process flow 700 may illustrate a beam training technique and sequential approach for determining MIMO beamforming parameters for two or more beams using a number of downlink reference signals, and an uplink reference signal. In some examples, the process flow 700 may implement aspects of the wireless communications systems 100 through 500, as described with reference to FIGS. 1 through 5. For example, the process flow 700 may be based on a configuration by a base station 105 or a UE 115, and implemented for reduced power consumption, spectral efficiency, higher data rates and, in some examples, may promote high reliability and low latency for beamforming operations, among other benefits.

The process flow 700 may include a base station 105-f and a UE 115-f, which may be examples of base stations 105 and UEs 115 as described with reference to FIGS. 1 through 5. In the following description of the process flow 700, the operations between the base station 105-f and the UE 115-f may be transmitted in a different order than the example order shown, or the operations performed by the base station 105-f and the UE 115-f may be performed in different orders or at different times. Some operations may also be omitted from the process flow 700, and other operations may be added to the process flow 700.

In this example, the process flow 700 includes multiple stages for uplink MIMO transmissions, in accordance with the discussion of FIG. 5, including a first stage 705 for determination of a transmission analog precoder ($W_{RF}$) and a receive analog combiner ($F_{RF}$), a second stage 710 for determination of a transmission baseband precoder ($W_{BBS}[k]$), and a third stage 715 for determination of a receive baseband combiner ($F_{BBS}[k]$).

In this example, the first stage 705 may commence at 720 with the base station 105-f transmitting a CSI-RS using $F_{RF}=F_{RF,1}$ and $F_{BBW}=(F^*_{RF}F_{RF})^{-1/2}$. At 725, the UE 115-f may receive the CSI-RS using $W_{RF}=W_{RF,1}$ and $W_{BBW}=(W^*_{RF}W_{RF})^{-1/2}$. This may be repeated for other combinations of p and q, at 730, until a last CSI-RS transmission at 735 and a corresponding reception at 740. At 745, the UE 115-f may estimate $H_{eff}[k]$ for all p and q. In some examples, the UE 115-f may estimate $H_{eff}[k]$ to be $W^*_{BBW}W^*_{RF}H[K]F_{RF}F_{BBW}$ for all p and q. Thus, the base station 105-f may select a p-element from a codebook $F_{RF}$, for example, p=1, and transmit the CSI-RS on a directional beam corresponding to p=1. Similarly, the UE 115-f may select a q-element from a codebook $W_{RF}$, for example, q=1, and receive the CSI-RS on a directional beam corresponding to q=1. This is performed for the combinations PQ, and at 750, the UE 115-$f$ may determine a best or preferred $F_{RF,p_{best}}$ and a $W_{RF,q_{best}}$, based on the different estimates (e.g., that maximize MI). At 755, the UE 115-$f$ may report the $p_{best}$ to the base station 105-$f$.

At the second stage 710, since the UE 115-$f$ has received a downlink reference signal using $W_{RF}=W_{RF,q_{best}}$, no additional reference signal is needed from the base station 105-$f$. At 760, the UE 115-$f$ may determine $F_{BBS}[k]$ based on $H_{eff}[k]$ with respect to the determined $p_{best}$ and $q_{best}$.

At the third stage 715, the UE 115-$f$ may transmit, at 765, a PUSCH transmission using $W_{RF,q_{best}}$, $W_{BBS}[k]$, and $W_{BBW}=(W^*_{RF}W_{RF})^{-1/2}$. At 770, the base station 105-$f$ may receive the PUSCH using $F_{RF,p_{best}}$, $F_{BBS}[k]$, and $F_{BBW}=(F^*_{RF}F_{RF})^{-1/2}$. At 775, the base station 105-$f$ may estimate $H_{eff}[k]$ based on the DMRS (i.e., $W^*_{BBW}W^*_{RF}H[K]F_{RF}F_{BBW}$). At 780, the base station 105-$f$ may determine $F_{BBS}[k]$ based on $H_{eff}[k]$. At 775, the base station 105-$f$ may decode the PUSCH using $F_{BBS}[k]$ at the receive combiner.

Figure 8:
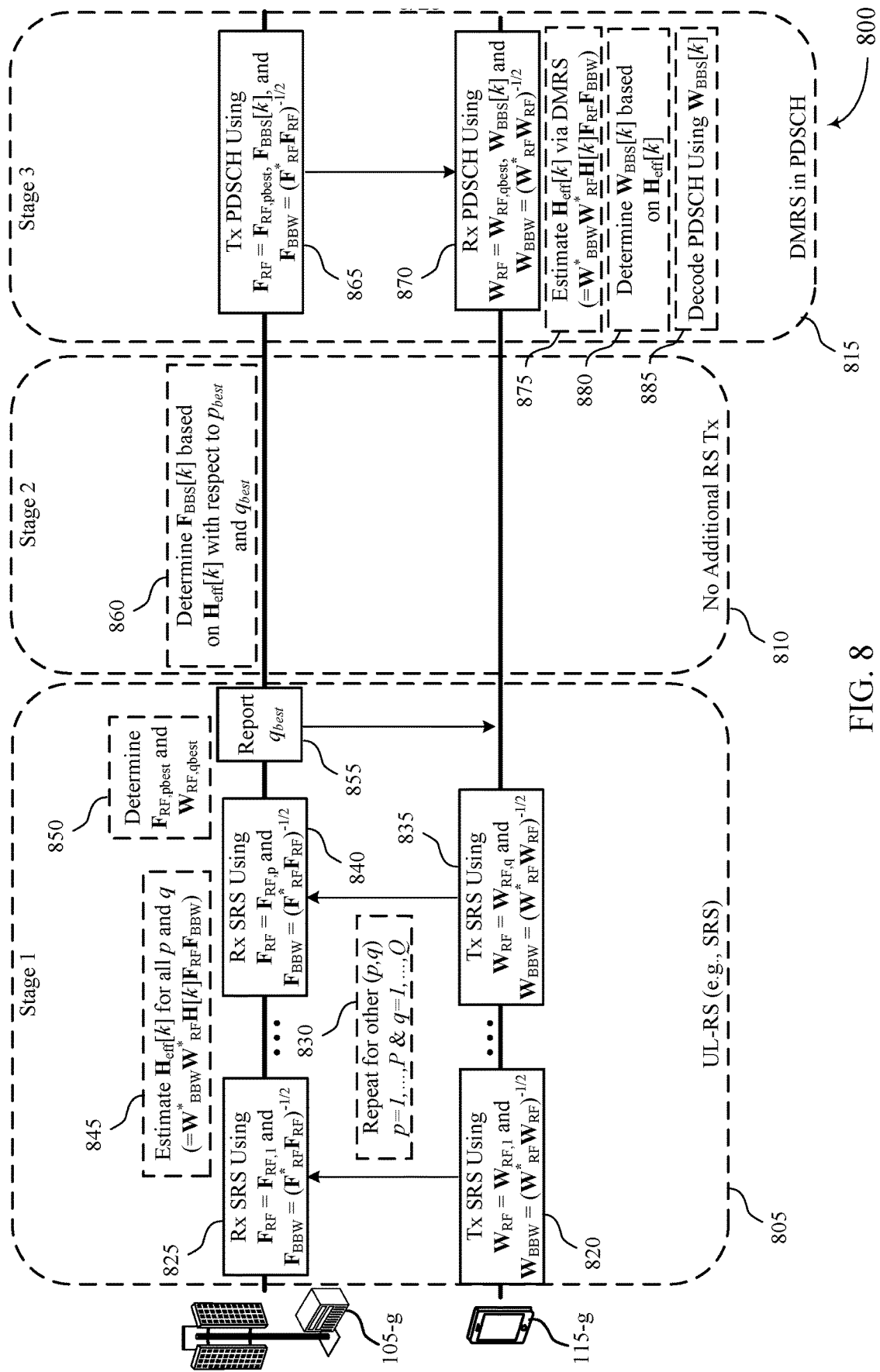

FIG. 8 illustrates an example of a process flow 800 that supports multi-beam selection for beamformed MIMO wireless communications in accordance with aspects of the present disclosure. The process flow 800 may illustrate a beam training technique and sequential approach for determining MIMO beamforming parameters for two or more beams using a number of downlink reference signals, and an uplink reference signal. In some examples, the process flow 800 may implement aspects of the wireless communications systems 100 through 500, as described with reference to FIGS. 1 through 5. For example, the process flow 800 may be based on a configuration by a base station 105 or a UE 115, and implemented for reduced power consumption, spectral efficiency, higher data rates and, in some examples, may promote high reliability and low latency for beamforming operations, among other benefits.

The process flow 800 may include a base station 105-$g$ and a UE 115-$g$, which may be examples of base stations 105 and UEs 115 as described with reference to FIGS. 1 through 5. In the following description of the process flow 800, the operations between the base station 105-$g$ and the UE 115-$g$ may be transmitted in a different order than the example order shown, or the operations performed by the base station 105-$g$ and the UE 115-$g$ may be performed in different orders or at different times. Some operations may also be omitted from the process flow 800, and other operations may be added to the process flow 800.

In this example, the process flow 800 includes multiple stages for downlink MIMO transmissions, in accordance with the discussion of FIG. 5, including a first stage 805 for determination of a transmission analog precoder ($F_{RF}$) and a receive analog combiner ($W_{RF}$), a second stage 810 for determination of a transmission baseband precoder ($F_{BBS}[k]$), and a third stage 815 for determination of a receive baseband combiner ($W_{BBS}[k]$).

In this example, the first stage 805 may commence at 820 with the UE 115-$g$ transmitting a SRS using $W_{RF}=W_{RF,1}$ and $W_{BBW}=(W^*_{RF}W_{RF})^{-1/2}$. At 825, the base station 105-$g$ may receive the SRS using $F_{RF}=F_{RF,1}$ and $F_{BBW}=(F^*_{RF}F_{RF})^{-1/2}$. This may be repeated for other combinations of p and q, at 830, until a last SRS transmission at 835 and a corresponding reception at 840. At 845, the base station 105-$g$ may estimate $H_{eff}[k]$ for all p and q. In some examples, the UE 115-$g$ may estimate $H_{eff}[k]$ to be $W^*_{BBW}W^*_{RF}H[K]F_{RF}F_{BBW}$ for all p and q. Thus, the UE 115-$g$ may select a q-element from a codebook $W_{RF}$, for example, q=1, and transmit the SRS on a directional beam corresponding to q=1. Similarly, the base station 105-$g$ may select a p-element from a codebook $F_{RF}$, for example, p=1, and receive the SRS on a directional beam corresponding to p=1. This is performed for the combinations PQ, and at 850, the base station 105-$g$ may determine a best or preferred $F_{RF,p_{best}}$ and a $W_{RF,q_{best}}$, based on the different estimates (e.g., that maximize MI). At 855, the base station 105-$g$ may report the $q_{best}$ to the UE 115-$g$.

At the second stage 810, since the base station 105-$g$ has received an uplink reference signal using $F_{RF}=F_{RF,p_{best}}$, no additional reference signal is needed from the UE 115-$g$. At 860, the base station 105-$g$ may determine $F_{BBS}[k]$ based on $H_{eff}[k]$ with respect to the determined $p_{best}$ and $q_{best}$.

At the third stage 815, the base station 105-$g$ may transmit, at 865, a PDSCH transmission using $F_{RF,p_{best}}$, $F_{BBS}[k]$, and $F_{BBW}=(F^*_{RF}F_{RF})^{-1/2}$. At 870, the UE 115-$g$ may receive the PDSCH using $W_{RF,q_{best}}$, $W_{BBS}[k]$, and $W_{BBW}=(W^*_{RF}W_{RF})^{-1/2}$. At 875, the UE 115-$g$ may estimate $H_{eff}[k]$ based on the DMRS (i.e., $W^*_{BBW}W^*_{RF}H[K]F_{RF}F_{BBW}$). At 880, the UE 115-$g$ may determine $W_{BBS}[k]$ based on $H_{eff}[k]$. At 875, the UE 115-$g$ may decode the PDSCH using $F_{BBS}[k]$ at the receive combiner.

Figure 9:
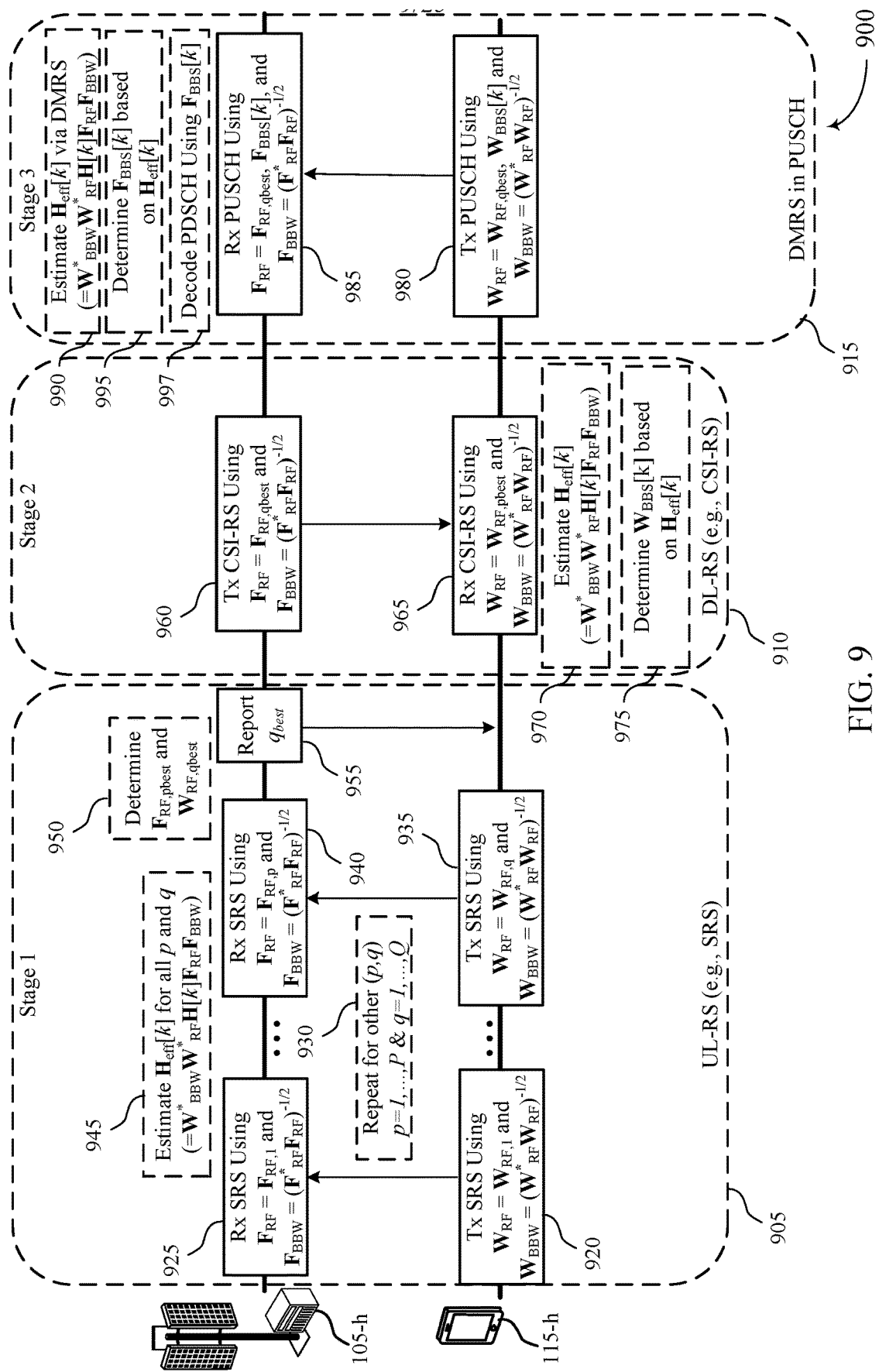

FIG. 9 illustrates an example of a process flow 900 that supports multi-beam selection for beamformed MIMO wireless communications in accordance with aspects of the present disclosure. The process flow 900 may illustrate a beam training technique and sequential approach for determining MIMO beamforming parameters for two or more beams using a number of downlink reference signals, and an uplink reference signal. In some examples, the process flow 900 may implement aspects of the wireless communications systems 100 through 500, as described with reference to FIGS. 1 through 5. For example, the process flow 900 may be based on a configuration by a base station 105 or a UE 115, and implemented for reduced power consumption, spectral efficiency, higher data rates and, in some examples, may promote high reliability and low latency for beamforming operations, among other benefits.

The process flow 900 may include a base station 105-$h$ and a UE 115-$h$, which may be examples of base stations 105 and UEs 115 as described with reference to FIGS. 1 through 5. In the following description of the process flow 900, the operations between the base station 105-$h$ and the UE 115-$h$ may be transmitted in a different order than the example order shown, or the operations performed by the base station 105-$h$ and the UE 115-$h$ may be performed in different orders or at different times. Some operations may also be omitted from the process flow 900, and other operations may be added to the process flow 900.

In this example, the process flow 900 includes multiple stages for uplink MIMO transmissions, in accordance with the discussion of FIG. 5, including a first stage 905 for determination of a transmission analog precoder ($W_{RF}$) and a receive analog combiner ($F_{RF}$), a second stage 910 for determination of a transmission baseband precoder ($W_{BBS}[k]$), and a third stage 915 for determination of a receive baseband combiner ($F_{BBS}[k]$).

In this example, the first stage 905 may commence at 920 with the UE 115-$h$ transmitting a SRS using $W_{RF}=W_{RF,1}$ and $W_{BBW}=(W^*_{RF}W_{RF})^{-1/2}$. At 925, the base station 105-$h$ may receive the SRS using $F_{RF}=F_{RF,1}$ and $F_{BBW}=(F^*_{RF}F_{RF})^{-1/2}$. This may be repeated for other combinations of p and q, at 930, until a last SRS transmission at 935 and a corresponding reception at 940. At 945, the base station 105-$h$ may estimate $H_{eff}[k]$ for all p and q. In some examples, the UE 115-$h$ may estimate $H_{eff}[k]$ to be $W^*_{BBW}W^*_{RF}H[K]F_{RF}F_{BBW}$ for all p and q. Thus, the UE 115-$h$ may select a q-element from a codebook $W_{RF}$, for example, q=1, and transmit the SRS on a directional beam corresponding to q=1. Similarly, the base station 105-*h* may select a p-element from a codebook $F_{RF}$, for example, p=1, and receive the SRS on a directional beam corresponding to p=1. This is performed for the combinations PQ, and at 950, the base station 105-*h* may determine a best or preferred $F_{RF,p_{best}}$ and a $W_{RF,q_{best}}$, based on the different estimates (e.g., that maximize MI). At 955, the base station 105-*h* may report the $q_{best}$ to the UE 115-*h*.

At the second stage 910, the baseband precoder for UE 115-*h* is determined. In this example, at 960, the base station 105-*h* may transmit a CSI-RS using $F_{RF}=F_{RF,q_{best}}$ and $F_{BBW}=(F^*_{RF}F_{RF})^{-1/2}$. The UE 115-*h*, at 965, may receive the CSI-RS and at 970 estimate $H_{\it{eff}}[k]$ to be $W^*_{BBW}W^*_{RF}H[K]F_{RF}F_{BBW}$. At 975, the UE 115-*h* may determine $W_{BBS}[k]$ based on $H_{\it{eff}}[k]$.

At the third stage 915, the UE 115-*h* may transmit, at 980, a PUSCH transmission using $W_{RF,q_{best}}$, $W_{BBS}[k]$, and $W_{BBW}=(W^*_{RF}W_{RF})^{-1/2}$. At 985, the base station 105-*h* may receive the PUSCH using $F_{RF,p_{best}}$, $F_{BBS}[k]$, and $F_{BBW}=(F^*_{RF}F_{RF})^{-1/2}$. At 990, the base station 105-*h* may estimate $H_{\it{eff}}[k]$ based on the DMRS (i.e., $W^*_{BBW}W^*_{RF}H[K]F_{RF}F_{BBW}$). At 995, the base station 105-*h* may determine $F_{BBS}[k]$ based on $H_{\it{eff}}[k]$. At 997, the base station 105-*h* may decode the PUSCH using $F_{BBS}[k]$ at the receive combiner.

While the examples of FIGS. 6 through 9 describe transmitting a reference signal for determination of the baseband precoder at the second stage in cases where the beam sweeping reference signals are transmitted by the device that is determining the baseband precoder (e.g., in the examples of FIGS. 6 and 9). In other cases rather than transmitting a different reference signal, such as the SRS if FIG. 6 and the CSI-RS in FIG. 9, a codebook-based report may be transmitted instead, such as a precoding matrix indicator (PMI), which may indicate the baseband precoder to be used. Examples of such codebook-based reports are illustrated in FIGS. 10 and 11.

Figure 10:
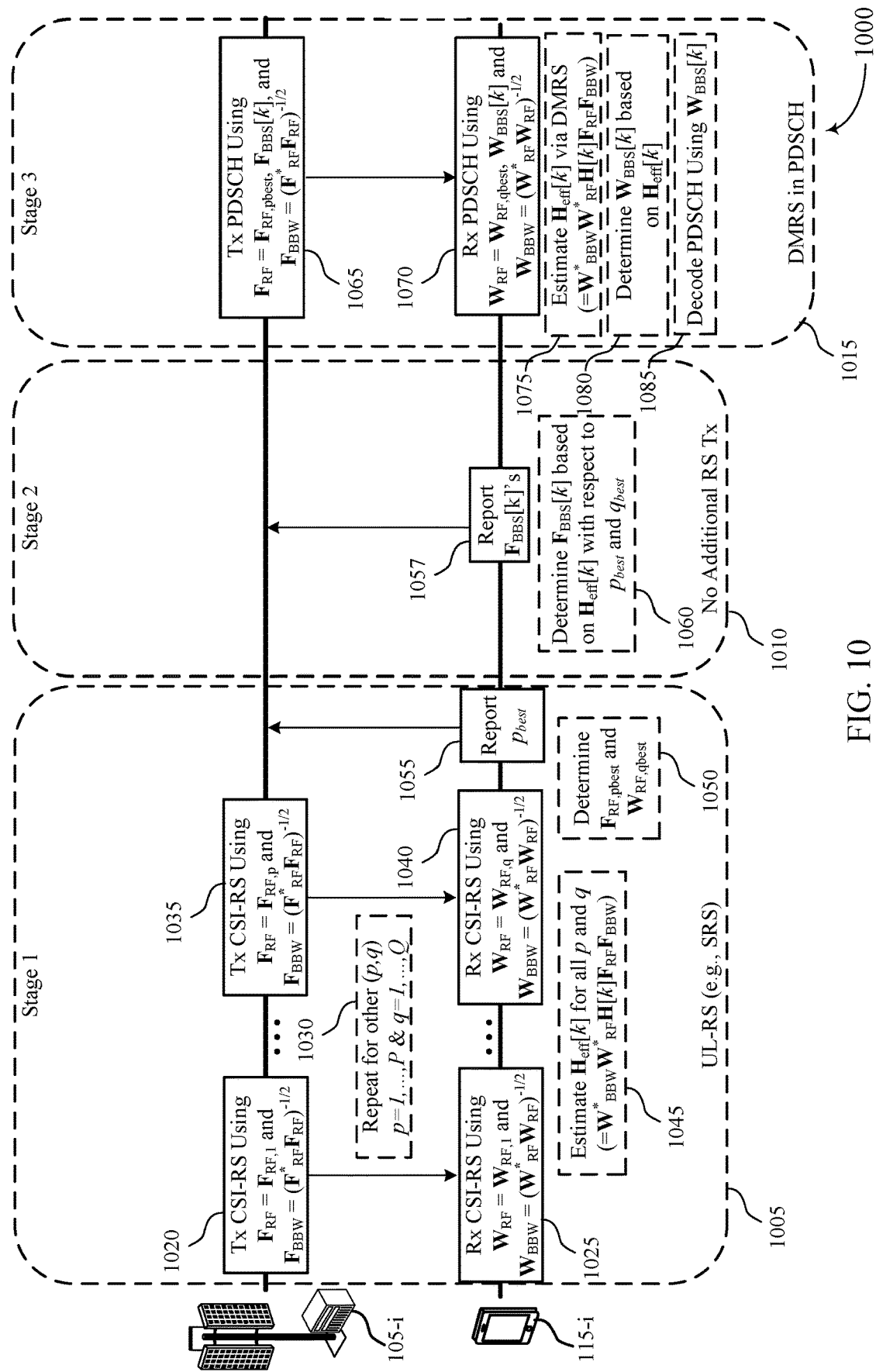
Figure 11:
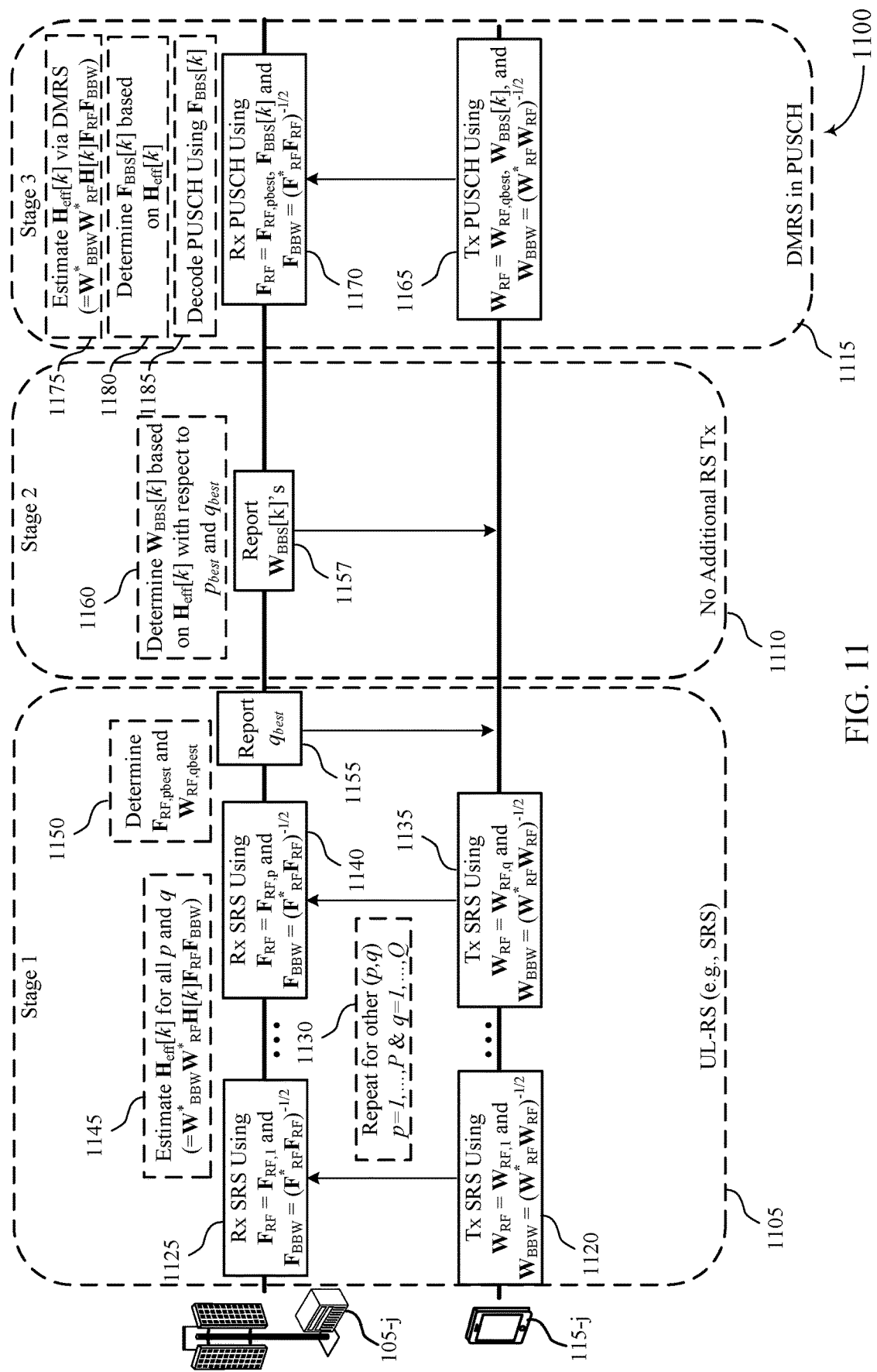

FIG. 10 illustrates an example of a process flow 1000 that supports multi-beam selection for beamformed MIMO wireless communications in accordance with aspects of the present disclosure. The process flow 1000 may illustrate a beam training technique and sequential approach for determining MIMO beamforming parameters for two or more beams using a number of downlink reference signals, and an uplink reference signal. In some examples, the process flow 1000 may implement aspects of the wireless communications systems 100 through 500, as described with reference to FIGS. 1 through 5. For example, the process flow 1000 may be based on a configuration by a base station 105 or a UE 115, and implemented for reduced power consumption, spectral efficiency, higher data rates and, in some examples, may promote high reliability and low latency for beamforming operations, among other benefits.

The process flow 1000 may include a base station 105-*j* and a UE 115-*j*, which may be examples of base stations 105 and UEs 115 as described with reference to FIGS. 1 through 5. In the following description of the process flow 1000, the operations between the base station 105-*i* and the UE 115-*i* may be transmitted in a different order than the example order shown, or the operations performed by the base station 105-*i* and the UE 115-*i* may be performed in different orders or at different times. Some operations may also be omitted from the process flow 1000, and other operations may be added to the process flow 1000.

In this example, the process flow 1000 includes multiple stages, in accordance with the discussion of FIG. 5, including a first stage 1005 for determination of a transmission analog precoder ($F_{RF}$) and a receive analog combiner ($W_{RF}$), a second stage 1010 for determination of a transmission baseband precoder ($F_{BBS}[k]$), and a third stage 1015 for determination of a receive baseband combiner ($W_{BBS}[k]$).

In this example, the first stage 1005, the process flow 1000 may commence at 1020 with the base station 105-*j* transmitting a CSI-RS using $F_{RF}=F_{RF,1}$ and $F_{BBW}=(F^*_{RF}F_{RF})^{-1/2}$. At 1025, the UE 115-*i* may receive the CSI-RS using $W_{RF}=W_{RF,1}$ and $W_{BBW}=(W^*_{RF}W_{RF})^{-1/2}$. This may be repeated for other combinations of p and q, at 1030, until a last CSI-RS transmission at 1035 and a corresponding reception at 1040. At 1045, the UE 115-*i* may estimate $H_{\it{eff}}[k]$ for all p and q. In some examples, the UE 115-*i* may estimate $H_{\it{eff}}[k]$ to be $W^*_{BBW}W^*_{RF}H[K]F_{RF}F_{BBW}$ for all p and q. Thus, the base station 105-*j* may select a p-element from a codebook $F_{RF}$, for example, p=1, and transmit the CSI-RS on a directional beam corresponding to p=1. Similarly, the UE 115-*j* may select a q-element from a codebook $W_{RF}$, for example, q=1, and receive the CSI-RS on a directional beam corresponding to q=1. This is performed for the combinations PQ, and at 1050, the UE 115-*i* may determine a best or preferred $F_{RF,p_{best}}$ and a $W_{RF,q_{best}}$, based on the different estimates (e.g., that maximize MI). At 1055, the UE 115-*i* may report the $p_{best}$ to the base station 105-*i*.

At the second stage 1010, the baseband precoder is determined. In this example, at 1060, the UE 115-*i* may determine $F_{BBS}[k]$ based on $H_{\it{eff}}[k]$ with respect to $p_{best}$ and $q_{best}$. At 1057, the UE 115-*i* may transmit a report with $F_{BBS}[k]$'s, which in some case may include a PMI for each determined $F_{BBS}[k]$ according to a PMI codebook. In some cases, the reports transmitted at 1055 and 1057 may be combined into a single report that is provided to the base station 105-*i*.

At the third stage 1015, the base station 105-*i* may transmit, at 1065, a PDSCH transmission using $F_{RF,p_{best}}$, $F_{BBS}[k]$, and $F_{BBW}=(F^*_{RF}F_{RF})^{-1/2}$ (e.g. based on the codebook for PMI). At 1070, the UE 115-*i* may receive the PDSCH using $W_{RF,q_{best}}$, $W_{BBS}[k]$, and $W_{BBW}=(W^*_{RF}W_{RF})^{-1/2}$. At 1075, the UE 115-*i* may estimate $H_{\it{eff}}[k]$ based on the DMRS (i.e., $W^*_{BBW}W^*_{RF}HH[K]F_{RF}F_{BBW}$). At 1080, the UE 115-*i* may determine $W_{BBS}[k]$ based on $H_{\it{eff}}[k]$. At 1085, the UE 115-*i* may decode the PDSCH using $W_{BBS}[k]$ at the receive combiner.

FIG. 11 illustrates an example of a process flow 1100 that supports multi-beam selection for beamformed MIMO wireless communications in accordance with aspects of the present disclosure. The process flow 1100 may illustrate a beam training technique and sequential approach for determining MIMO beamforming parameters for two or more beams using a number of downlink reference signals, and an uplink reference signal. In some examples, the process flow 1100 may implement aspects of the wireless communications systems 100 through 500, as described with reference to FIGS. 1 through 5. For example, the process flow 1100 may be based on a configuration by a base station 105 or a UE 115, and implemented for reduced power consumption, spectral efficiency, higher data rates and, in some examples, may promote high reliability and low latency for beamforming operations, among other benefits.

The process flow 1100 may include a base station 105-*j* and a UE 115-*j*, which may be examples of base stations 105 and UEs 115 as described with reference to FIGS. 1 through 5. In the following description of the process flow 1100, the operations between the base station 105-*j* and the UE 115-*j* may be transmitted in a different order than the example order shown, or the operations performed by the base station 105-$j$ and the UE 115-$j$ may be performed in different orders or at different times. Some operations may also be omitted from the process flow 1100, and other operations may be added to the process flow 1100.

In this example, the process flow 1100 includes multiple stages for uplink MIMO transmissions, in accordance with the discussion of FIG. 5, including a first stage 1105 for determination of a transmission analog precoder ($W_{RF}$) and a receive analog combiner ($F_{RF}$), a second stage 1110 for determination of a transmission baseband precoder ($W_{BBS}[k]$), and a third stage 1115 for determination of a receive baseband combiner ($F_{BBS}[k]$).

In this example, the first stage 1105 may commence at 1120 with the UE 115-$j$ transmitting a SRS using $W_{RF}=W_{RF,1}$ and $W_{BBW}=(W^*_{RF}W_{RF})^{-1/2}$. At 1125, the base station 105-$j$ may receive the SRS using $F_{RF}=F_{RF,1}$ and $F_{BBW}=(F^*_{RF}F_{RF})^{-1/2}$. This may be repeated for other combinations of p and q, at 1130, until a last SRS transmission at 1135 and a corresponding reception at 1140. At 1145, the base station 105-$j$ may estimate $H_{eff}[k]$ for all p and q. In some examples, the UE 115-$j$ may estimate $H_{eff}[k]$ to be $W^*_{BBW}W^*_{RF}H[K]F_{RF}F_{BBW}$ for all p and q. Thus, the UE 115-$j$ may select a q-element from a codebook $W_{RF}$, for example, q=1, and transmit the SRS on a directional beam corresponding to q=1. Similarly, the base station 105-$j$ may select a p-element from a codebook $F_{RF}$, for example, p=1, and receive the SRS on a directional beam corresponding to p=1. This is performed for the combinations PQ, and at 1150, the base station 105-$j$ may determine a best or preferred $F_{RF,p_{best}}$ and a $W_{RF,q_{best}}$, based on the different estimates (e.g., that maximize MI). At 1155, the base station 105-$j$ may report the $q_{best}$ to the UE 115-$j$.

At the second stage 1110, the baseband precoder for UE 115-$j$ is determined. In this example, at 1160, the base station 105-$j$ may determine $W_{BBS}[k]$ based on $H_{eff}[k]$ with respect to $p_{best}$ and $q_{best}$. At 1157, the base station 105-$j$ may transmit a report with $W_{BBS}[k]$'s, which in some case may include a PMI for each determined $W_{BBS}[k]$ according to a PMI codebook. In some cases, the reports transmitted at 1155 and 1157 may be combined into a single report that is provided to the UE 115-$j$.

At the third stage 1115, the UE 115-$j$ may transmit, at 1165, a PUSCH transmission using $W_{RF,q_{best}}$, $W_{BBS}[k]$, and $W_{BBW}=(W^*_{RF}W_{RF})^{-1/2}$. At 1170, the base station 105-$j$ may receive the PUSCH using $F_{RF,p_{best}}$, $F_{BBS}[k]$, and $F_{BBW}=(F^*_{RF}F_{RF})^{-1/2}$. At 1175, the base station 105-$j$ may estimate $H_{eff}[k]$ based on the DMRS (i.e., $W^*_{BBW}W^*_{RF}H[K]F_{RF}F_{BBW}$). At 1180, the base station 105-$j$ may determine $F_{BBS}[k]$ based on $H_{eff}[k]$. At 1185, the base station 105-$j$ may decode the PUSCH using $F_{BBS}[k]$ at the receive combiner.

In some cases, the options for which reference signals, or PMI indications, are provided for determination of baseband precoding parameters may depend on one or more factors, such as if beam correspondence is present or not, whether channel reciprocity is present or not, or combinations thereof. In cases where there exists beam correspondence with respect to $F_{RF}$ and $W_{RF}$, then downlink transmission analog RF beams can be used for uplink reception analog RF beams, and vice versa (at both the base station and UE). In such cases, the base station may use the uplink receive analog RF beam for the downlink transmission analog RF beam, and vice versa. Further, the UE can use the downlink receive analog RF beam for the uplink transmission analog RF beam, and vice versa. If there exists channel reciprocity with respect to H[k] (and thus $F_{BB}[k]$ and $W_{BB}[k]$ as well), then the downlink channel parameters can be used for the uplink channel, and vice versa (at both the base station and UE). In such cases, the base station may can determine downlink baseband transmission beams ($F_{BB}[k]$) by using estimated uplink channel (e.g., via SRS). Further the UE can determine uplink baseband transmission beams ($W_{BB}[k]$) by using estimated downlink channel (e.g., via CSI-RS). Different options for determining second stage baseband precoding parameters may thus depend upon whether there is beam correspondence, channel reciprocity, or both.

Figure 12:
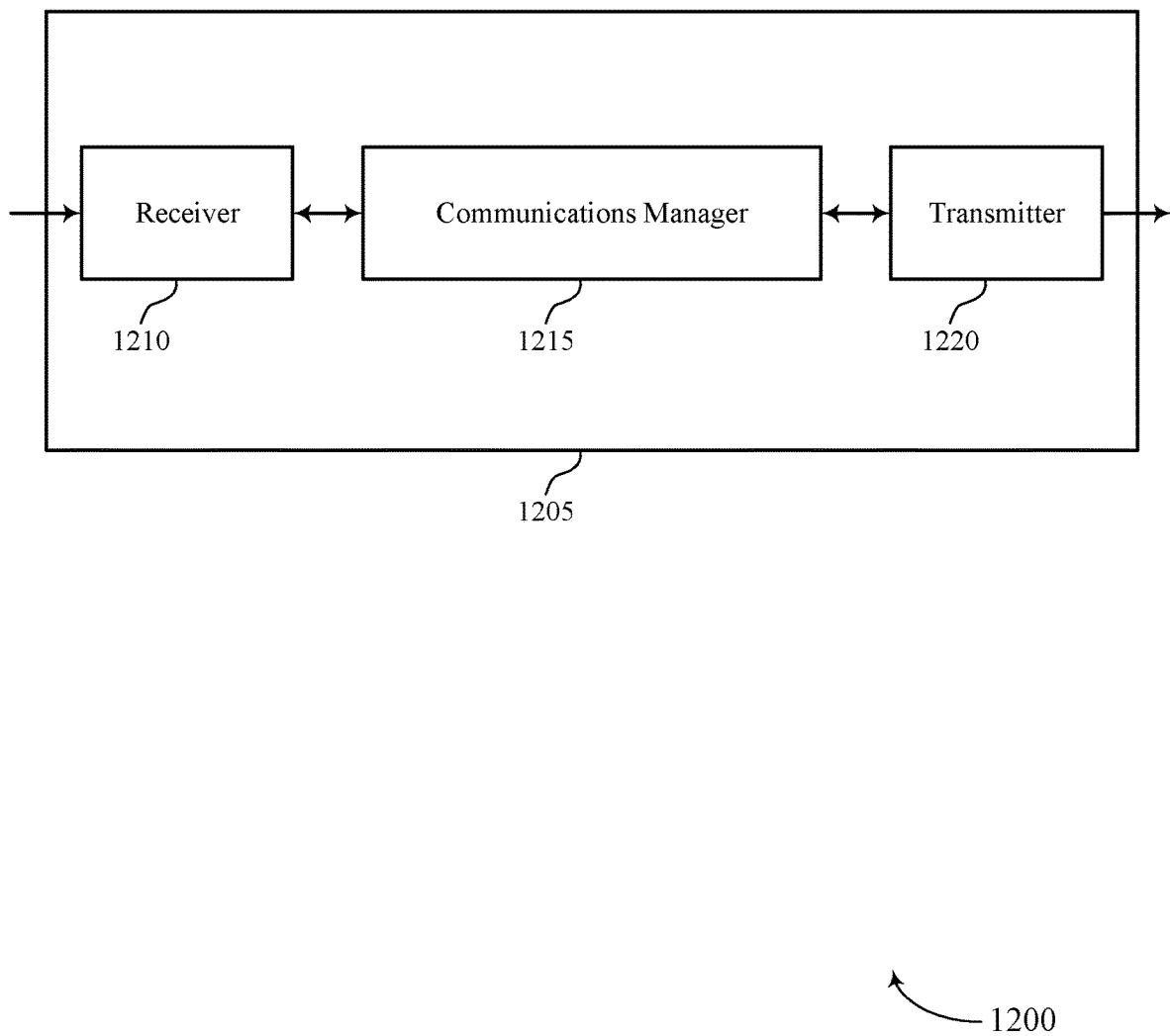
FIGS. 12 and 13 show block diagrams of devices that support multi-beam selection for beamformed MIMO wireless communications in accordance with aspects of the present disclosure.

FIG. 12 shows a block diagram 1200 of a device 1205 that supports multi-beam selection for beamformed MIMO wireless communications in accordance with aspects of the present disclosure. The device 1205 may be an example of aspects of a UE 115 or base station 105 as described herein. The device 1205 may include a receiver 1210, a communications manager 1215, and a transmitter 1220. The device 1205 may also include a processor. Each of these components may be in communication with one another (e.g., via one or more buses).

Receiver 1210 may receive information such as packets, user data, or control information associated with various information channels (e.g., control channels, data channels, and information related to multi-beam selection for beamformed MIMO wireless communications, etc.). Information may be passed on to other components of the device 1205. The receiver 1210 may be an example of aspects of the transceiver 1520 or 1620 as described with reference to FIGS. 15 and 16. The receiver 1210 may utilize a single antenna or a set of antennas.

The communications manager 1215, when present in a wireless device that transmits reference signals in a beam training sequence, may transmit, from a first wireless device, a set of reference signals to a second wireless device using a set of combinations of analog beamforming parameters associated with two or more beams that are configured to carry two or more MIMO streams, where the set of reference signals are transmitted for different combinations of one or more sets of transmit beamforming parameters and one or more sets of receive beamforming parameters, receive, from the second wireless device, a report that indicates a first combination of analog beamforming parameters is selected for the analog beamforming parameters at the second wireless device, and communicate with the second wireless device via the two or more beams based on the first combination of analog beamforming parameters.

The communications manager 1215 when present in a wireless device that receives reference signals in a beam training sequence, may measure, at a second wireless device, a channel quality of a set of reference signals that are transmitted by a first wireless device using a set of combinations of analog beamforming parameters for two or more beams that carry two or more MIMO streams, where the set of reference signals are transmitted for different combinations of one or more sets of transmit beamforming parameters and one or more sets of receive beamforming parameters, select a first combination of analog beamforming parameters based on the measured channel quality of the set of reference signals, and communicate with the first wireless device via the two or more beams based on the first combination of analog beamforming parameters.

The communications manager 1215 may also receive, at a first wireless device, a set of reference signals that are transmitted by a second wireless device using a set of combinations of analog beamforming parameters for two or more beams that carry two or more MIMO streams, determine a set of analog beamforming parameters for the two or more beams based on measurements of the set of reference signals, determine a set of transmission baseband precoder parameters to be applied to baseband signals of the two or more beams based on a channel estimation of a channel between the first wireless device and the second wireless device, determine a set of receive baseband combiner parameters to be applied to baseband signals of the two or more beams based on the channel estimation, and communicate with the second wireless device using the two or more beams based on the set of analog beamforming parameters, the set of transmission baseband precoder parameters, and the set of receive baseband combiner parameters. The communications manager 1215 may be an example of aspects of the communications manager 1510 or 1610 as described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 or 1620 as described with reference to FIGS. 15 and 16. The transmitter 1220 may utilize a single antenna or a set of antennas.

Figure 13:
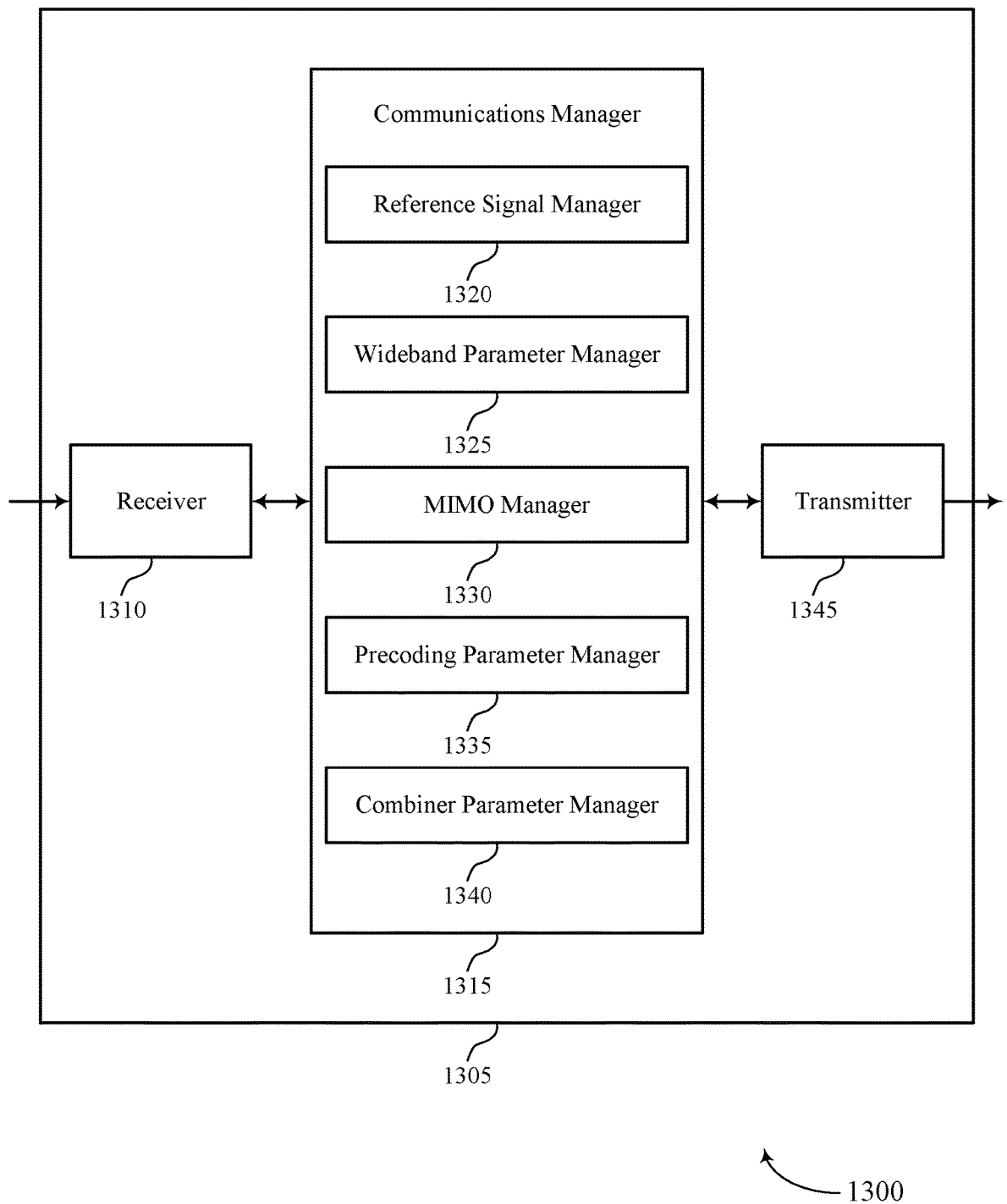

FIG. 13 shows a block diagram 1300 of a device 1305 that supports multi-beam selection for beamformed MIMO wireless communications in accordance with aspects of the present disclosure. The device 1305 may be an example of aspects of a device 1205, a UE 115, or a base station 105 as described herein. The device 1305 may include a receiver 1310, a communications manager 1315, and a transmitter 1345. The device 1305 may also include a processor. Each of these components may be in communication with one another (e.g., via one or more buses).

Receiver 1310 may receive information such as packets, user data, or control information associated with various information channels (e.g., control channels, data channels, and information related to multi-beam selection for beamformed MIMO wireless communications, etc.). Information may be passed on to other components of the device 1305. The receiver 1310 may be an example of aspects of the transceiver 1520 or 1620 as described with reference to FIGS. 15 and 16. The receiver 1310 may utilize a single antenna or a set of antennas.

The communications manager 1315 may be an example of aspects of the communications manager 1215 as described herein. The communications manager 1315 may include a reference signal manager 1320, a wideband parameter manager 1325, a MIMO manager 1330, a precoding parameter manager 1335, and a combiner parameter manager 1340. The communications manager 1315 may be an example of aspects of the communications manager 1510 or 1610 as described herein.

In some cases, the reference signal manager 1320 may transmit, from a first wireless device, a set of reference signals to a second wireless device using a set of combinations of analog beamforming parameters associated with two or more beams that are configured to carry two or more MIMO streams, where the set of reference signals are transmitted for different combinations of one or more sets of transmit beamforming parameters and one or more sets of receive beamforming parameters. The wideband parameter manager 1325 may receive, from the second wireless device, a report that indicates a first combination of analog beamforming parameters is selected for the analog beamforming parameters at the second wireless device. The MIMO manager 1330 may communicate with the second wireless device via the two or more beams based on the first combination of analog beamforming parameters.

In some cases, the reference signal manager 1320 may measure, at a second wireless device, a channel quality of a set of reference signals that are transmitted by a first wireless device using a set of combinations of analog beamforming parameters for two or more beams that carry two or more MIMO streams, where the set of reference signals are transmitted for different combinations of one or more sets of transmit beamforming parameters and one or more sets of receive beamforming parameters. The wideband parameter manager 1325 may select a first combination of analog beamforming parameters based on the measured channel quality of the set of reference signals. The MIMO manager 1330 may communicate with the first wireless device via the two or more beams based on the first combination of analog beamforming parameters.

In some cases, the reference signal manager 1320 may receive, at a first wireless device, a set of reference signals that are transmitted by a second wireless device using a set of combinations of analog beamforming parameters for two or more beams that carry two or more MIMO streams. The wideband parameter manager 1325 may determine a set of analog beamforming parameters for the two or more beams based on measurements of the set of reference signals. The precoding parameter manager 1335 may determine a set of transmission baseband precoder parameters to be applied to baseband signals of the two or more beams based on a channel estimation of a channel between the first wireless device and the second wireless device. The combiner parameter manager 1340 may determine a set of receive baseband combiner parameters to be applied to baseband signals of the two or more beams based on the channel estimation. The MIMO manager 1330 may communicate with the second wireless device using the two or more beams based on the set of analog beamforming parameters, the set of transmission baseband precoder parameters, and the set of receive baseband combiner parameters.

Transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1520 or 1620 as described with reference to FIGS. 15 and 16. The transmitter 1345 may utilize a single antenna or a set of antennas.

Figure 14:
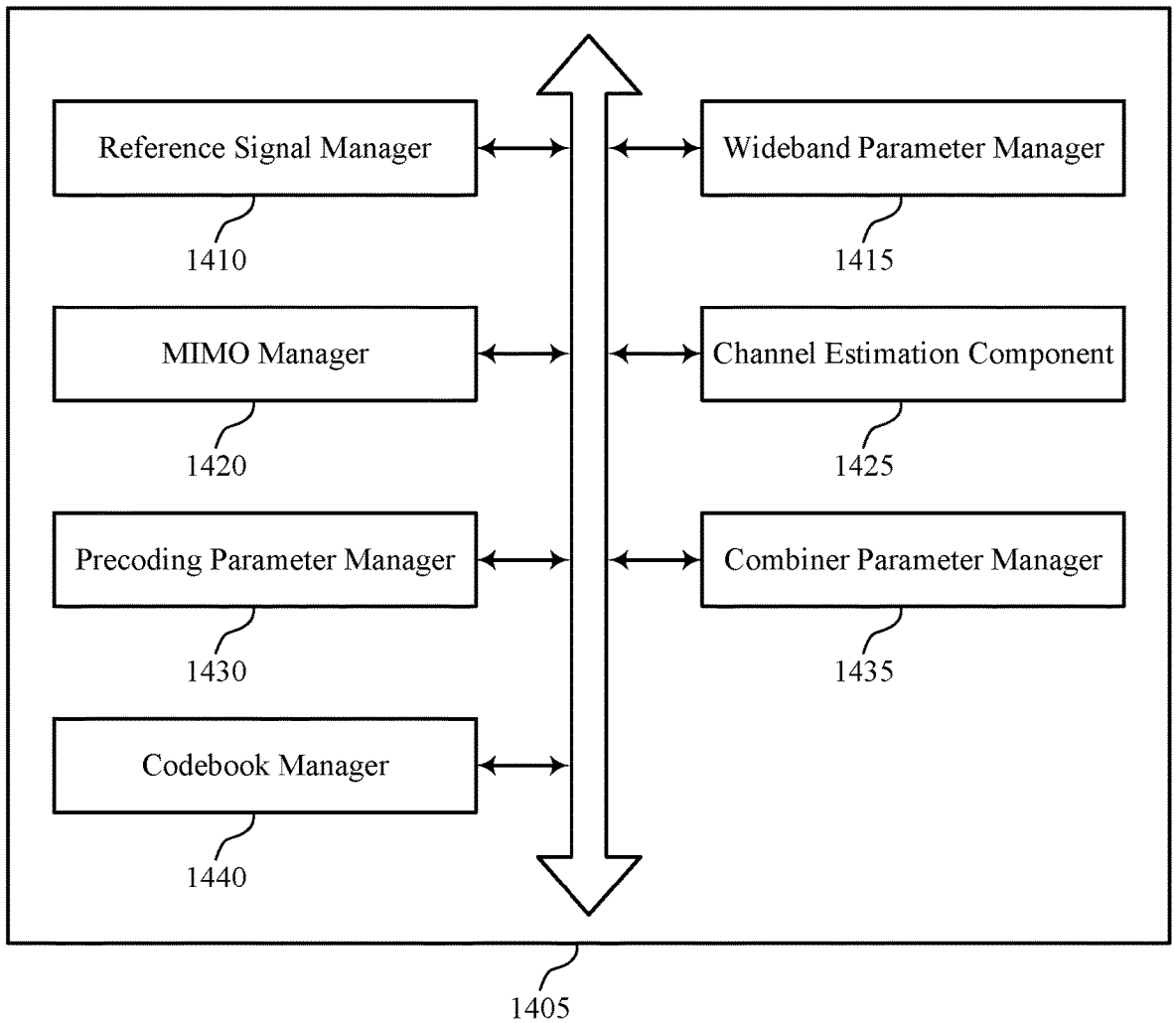
FIG. 14 shows a block diagram of a communications manager that supports multi-beam selection for beamformed MIMO wireless communications in accordance with aspects of the present disclosure.

FIG. 14 shows a block diagram 1400 of a communications manager 1405 that supports multi-beam selection for beamformed MIMO wireless communications in accordance with aspects of the present disclosure. The communications manager 1405 may be an example of aspects of a communications manager 1215, a communications manager 1315, or a communications manager 1510 described herein. The communications manager 1405 may include a reference signal manager 1410, a wideband parameter manager 1415, a MIMO manager 1420, a channel estimation component 1425, a precoding parameter manager 1430, a combiner parameter manager 1435, and a codebook manager 1440. Each of these modules may communicate, directly or indirectly, with one another (e.g., via one or more buses).

The reference signal manager 1410 may transmit, from a first wireless device, a set of reference signals to a second wireless device using a set of combinations of analog beamforming parameters associated with two or more beams that are configured to carry two or more MIMO streams, where the set of reference signals are transmitted for different combinations of one or more sets of transmit beamforming parameters and one or more sets of receive beamforming parameters.

In some examples, the reference signal manager 1410 may measure, at a second wireless device, a channel quality of a set of reference signals that are transmitted by a first wireless device using a set of combinations of analog beamforming parameters for two or more beams that carry two or more MIMO streams, where the set of reference signals are transmitted for different combinations of one or more sets of transmit beamforming parameters and one or more sets of receive beamforming parameters.

In some examples, the reference signal manager 1410 may receive, at a first wireless device, a set of reference signals that are transmitted by a second wireless device using a set of combinations of analog beamforming parameters for two or more beams that carry two or more MIMO streams. In some examples, the reference signal manager 1410 may receive, from the second wireless device, a second reference signal that is transmitted using the first combination of analog beamforming parameters.

In some examples, the reference signal manager 1410 may transmit a second reference signal to the first wireless device using the first combination of analog beamforming parameters for determination of a set of transmission baseband precoder parameters at the first wireless device.

In some cases, the first wireless device is a UE and the second wireless device is a base station, and where the set of reference signals are downlink reference signals transmitted to the UE in a beam sweeping procedure. In some cases, the downlink reference signals include one or more of a channel state information reference signal (CSI-RS), one or more reference signals transmitted in a synchronization signal block (SSB), or any combinations thereof.

In some cases, the first wireless device is a base station and the second wireless device is a UE, and where the set of reference signals are uplink reference signals transmitted to the base station in a beam sweeping procedure. In some cases, the uplink reference signals include sounding reference signals (SRS).

In some cases, the set of reference signals include reference signals that are specific to transmissions from the first wireless device to the second wireless device, and where the first wireless device determines a second combination of analog beamforming parameters for use at the first wireless device based on one or more different reference signals that are specific to transmissions from the second wireless device to the first wireless device.

In some cases, the data communications include a third reference signal for determination of a set of receive baseband combiner parameters to be applied to baseband signals of the two or more beams at the second wireless device. In some cases, the third reference signal is a demodulation reference signal (DMRS).

In some cases, the set of reference signals include reference signals that are specific to transmissions from the second wireless device to the first wireless device, and where the second wireless device determines a second combination of analog beamforming parameters for use at the second wireless device based on one or more different reference signals that are specific to transmissions from the second wireless device to the first wireless device.

The wideband parameter manager 1415 may receive, from the second wireless device, a report that indicates a first combination of analog beamforming parameters is selected for the analog beamforming parameters at the second wireless device.

In some examples, the wideband parameter manager 1415 may select a first combination of analog beamforming parameters based on the measured channel quality of the set of reference signals.

In some examples, the wideband parameter manager 1415 may determine a set of analog beamforming parameters for the two or more beams based on measurements of the set of reference signals.

In some cases, the analog beamforming parameters are used to transform signals received at a set of antennas to baseband signals that are provided to a set of radio frequency receive chains. In some cases, the analog beamforming parameters are used to transform the baseband signals received at the radio frequency transmit chains into radio frequency signals for transmission from a set of antennas.

The MIMO manager 1420 may communicate with the second wireless device via the two or more beams based on the first combination of analog beamforming parameters.

In some examples, the MIMO manager 1420 may communicate with the first wireless device via the two or more beams based on the first combination of analog beamforming parameters.

In some examples, the MIMO manager 1420 may communicate with the second wireless device using the two or more beams based on the set of analog beamforming parameters, the set of transmission baseband precoder parameters, and the set of receive baseband combiner parameters.

In some examples, the MIMO manager 1420 may transmit a data transmission and a third reference signal to the second wireless device via the two or more MIMO streams on the two or more beams, and where the second wireless device determines a set of receive baseband combiner parameters to be applied to baseband signals of received transmissions using the two or more beams based on the third reference signal.

In some examples, the MIMO manager 1420 may receive a data transmission and a third reference signal from the first wireless device via the two or more MIMO streams on the two or more beams. In some examples, the MIMO manager 1420 may decode the data transmission using the receive baseband combiner parameters.

In some cases, the communicating with the second wireless device includes data communications via the two or more MIMO streams on the two or more beams, where the two or more beams use the first combination of analog beamforming parameters and the set of transmission baseband precoder parameters.

In some cases, the first wireless device determines a set of transmission baseband precoder parameters to be applied to baseband signals for transmissions using the two or more beams based on a second reference signal received from the second wireless device, where the baseband precoder parameters are used to transform input from the two or more MIMO streams into baseband streams of a set of radio frequency transmit chains, and where the first combination of analog beamforming parameters are used to transform the baseband streams of the set of radio frequency transmit chains into wideband waveforms that are provided to a set of antennas.

The precoding parameter manager 1430 may determine a set of transmission baseband precoder parameters to be applied to baseband signals of the two or more beams based on a channel estimation of a channel between the first wireless device and the second wireless device.

In some examples, the precoding parameter manager 1430 may determine a set of transmission baseband precoder parameters to be applied to baseband signals of the two or more beams based on the estimating the effective channel.

In some examples, the precoding parameter manager 1430 may receive an indication from the second wireless device of a set of transmission baseband precoder parameters to be applied to baseband signals for transmissions from the first wireless device using the two or more beams.

In some examples, the precoding parameter manager 1430 may determine a set of transmission baseband precoder parameters to be applied to baseband signals for transmissions from the second wireless device using the two or more beams based on the set of reference signals transmitted by the first wireless device.

In some examples, the precoding parameter manager 1430 may transmit a second reference signal to the first wireless device using the first combination of analog beamforming parameters for determination of a set of transmission baseband precoder parameters to be applied to baseband signals for transmissions from the first wireless device using the two or more beams.

In some examples, the precoding parameter manager 1430 may transmit an indication to the first wireless device of a set of transmission baseband precoder parameters to be applied to baseband signals for transmissions from the first wireless device using the two or more beams.

In some cases, the second wireless device determines a set of transmission baseband precoder parameters to be applied to baseband signals for transmissions from the second wireless device using the two or more beams based on the set of reference signals transmitted by the first wireless device. In some cases, the indication from the second wireless device is a precoding matrix indicator (PMI) that is mapped to a codebook of sets of transmission baseband precoder parameters. In some cases, the baseband precoder parameters are used to transform the two or more MIMO streams into baseband signals that are provided to a set of radio frequency transmit chains.

The combiner parameter manager 1435 may determine a set of receive baseband combiner parameters to be applied to baseband signals of the two or more beams based on the channel estimation.

In some examples, the combiner parameter manager 1435 may determine, based on measurements of the third reference signal, a set of receive baseband combiner parameters to be applied to baseband signals of received transmissions using the two or more beams.

In some cases, the data communications include a third reference signal for measurement at the second wireless device and determination of a set of receive baseband combiner parameters to be applied to baseband signals of the two or more beams at the second wireless device. In some cases, the baseband combiner parameters are used to transform an output of the set of radio frequency receive chains into the two or more MIMO streams.

The channel estimation component 1425 may estimate an effective channel between the first wireless device and the second wireless device based on one or more measurements of the second reference signal.

In some examples, the channel estimation component 1425 may estimate an effective channel between the second wireless device and the first wireless device for each of the different combinations of the one or more sets of transmit beamforming parameters and the one or more sets of receive beamforming parameters, and where the first combination of analog beamforming parameters is selected based on a magnitude of the effective channel estimates.

In some examples, the channel estimation component 1425 may estimate an effective channel between the second wireless device and the first wireless device based on measurements of the third reference signal. In some examples, the channel estimation component 1425 may determine the set of receive baseband combiner parameters based on the estimating.

The codebook manager 1440 may transmit a report that indicates the first combination of analog beamforming parameters is selected for the analog beamforming parameters, and where the report indicates a codebook index value for a codebook of beamforming parameters, and where the codebook of beamforming parameters maps codebook index values to the different combinations of the one or more sets of transmit beamforming parameters and the one or more sets of receive beamforming parameters.

In some cases, the first combination of analog beamforming parameters is associated with a first reference signal transmission that has a highest mutual information (MI) value of the set of reference signals.

Figure 15:
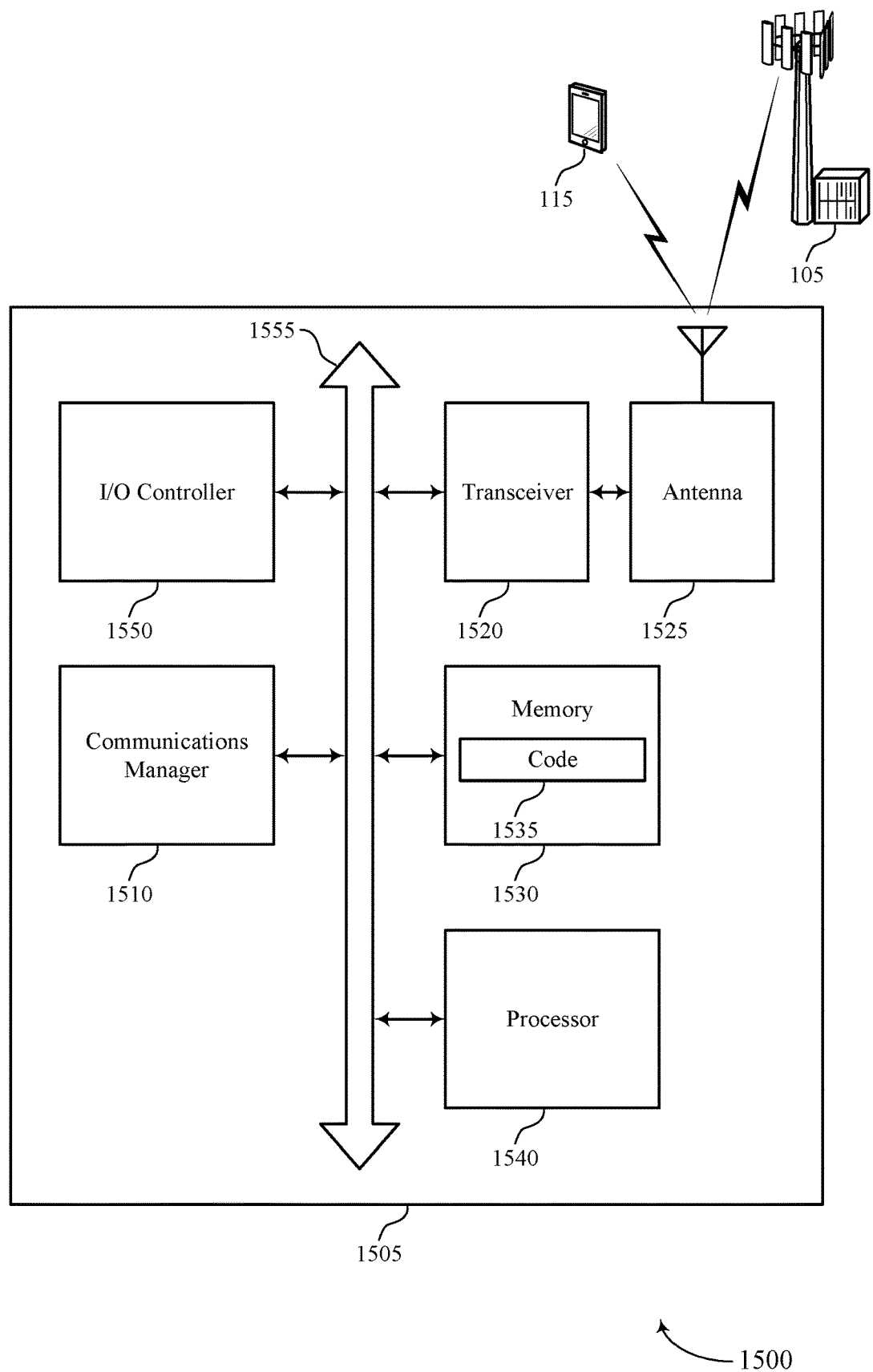
FIG. 15 shows a diagram of a system including a user equipment (UE) that supports multi-beam selection for beamformed MIMO wireless communications in accordance with aspects of the present disclosure.

FIG. 15 shows a diagram of a system 1500 including a device 1505 that supports multi-beam selection for beamformed MIMO wireless communications in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a communications manager 1510, a transceiver 1520, an antenna 1525, memory 1530, a processor 1540, and an I/O controller 1550. These components may be in electronic communication via one or more buses (e.g., bus 1555).

The communications manager 1510 may transmit, from a first wireless device, a set of reference signals to a second wireless device using a set of combinations of analog beamforming parameters associated with two or more beams that are configured to carry two or more MIMO streams, where the set of reference signals are transmitted for different combinations of one or more sets of transmit beamforming parameters and one or more sets of receive beamforming parameters, receive, from the second wireless device, a report that indicates a first combination of analog beamforming parameters is selected for the analog beamforming parameters at the second wireless device, and communicate with the second wireless device via the two or more beams based on the first combination of analog beamforming parameters.

The communications manager 1510 may also measure, at a second wireless device, a channel quality of a set of reference signals that are transmitted by a first wireless device using a set of combinations of analog beamforming parameters for two or more beams that carry two or more MIMO streams, where the set of reference signals are transmitted for different combinations of one or more sets of transmit beamforming parameters and one or more sets of receive beamforming parameters, select a first combination of analog beamforming parameters based on the measured channel quality of the set of reference signals, and communicate with the first wireless device via the two or more beams based on the first combination of analog beamforming parameters.

The communications manager 1510 may also receive, at a first wireless device, a set of reference signals that are transmitted by a second wireless device using a set of combinations of analog beamforming parameters for two or more beams that carry two or more MIMO streams, determine a set of analog beamforming parameters for the two or more beams based on measurements of the set of reference signals, determine a set of transmission baseband precoder parameters to be applied to baseband signals of the two or more beams based on a channel estimation of a channel between the first wireless device and the second wireless device, determine a set of receive baseband combiner parameters to be applied to baseband signals of the two or more beams based on the channel estimation, and communicate with the second wireless device using the two or more beams based on the set of analog beamforming parameters, the set of transmission baseband precoder parameters, and the set of receive baseband combiner parameters.

Transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting multi-beam selection for beamformed MIMO wireless communications).

The I/O controller 1550 may manage input and output signals for the device 1505. The I/O controller 1550 may also manage peripherals not integrated into the device 1505. In some cases, the I/O controller 1550 may represent a physical connection or port to an external peripheral. In some cases, the I/O controller 1550 may utilize an operating system such as iOS®, ANDROID®, MS-DOS®, MS-WINDOWS®, OS/2®, UNIX®, LINUX®, or another known operating system. In other cases, the I/O controller 1550 may represent or interact with a modem, a keyboard, a mouse, a touchscreen, or a similar device. In some cases, the I/O controller 1550 may be implemented as part of a processor. In some cases, a user may interact with the device 1505 via the I/O controller 1550 or via hardware components controlled by the I/O controller 1550.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
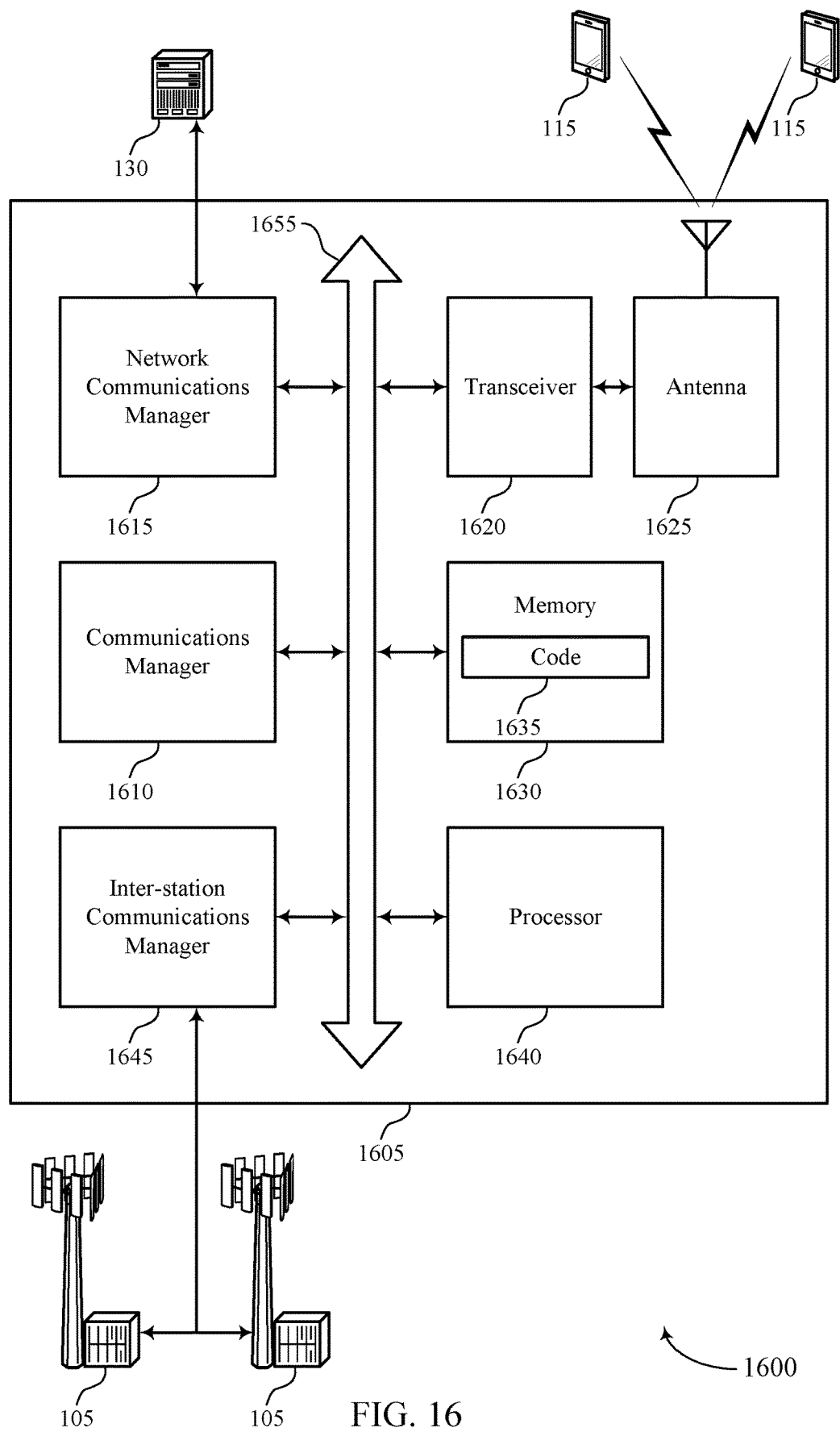
FIG. 16 shows a diagram of a system including a base station that supports multi-beam selection for beamformed MIMO wireless communications in accordance with aspects of the present disclosure.

FIG. 16 shows a diagram of a system 1600 including a device 1605 that supports multi-beam selection for beamformed MIMO wireless communications in accordance with aspects of the present disclosure. The device 1605 may be an example of or include the components of device 1205, device 1305, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1655).

The communications manager 1610 may transmit, from a first wireless device, a set of reference signals to a second wireless device using a set of combinations of analog beamforming parameters associated with two or more beams that are configured to carry two or more MIMO streams, where the set of reference signals are transmitted for different combinations of one or more sets of transmit beamforming parameters and one or more sets of receive beamforming parameters, receive, from the second wireless device, a report that indicates a first combination of analog beamforming parameters is selected for the analog beamforming parameters at the second wireless device, and communicate with the second wireless device via the two or more beams based on the first combination of analog beamforming parameters.

The communications manager 1610 may also measure, at a second wireless device, a channel quality of a set of reference signals that are transmitted by a first wireless device using a set of combinations of analog beamforming parameters for two or more beams that carry two or more MIMO streams, where the set of reference signals are transmitted for different combinations of one or more sets of transmit beamforming parameters and one or more sets of receive beamforming parameters, select a first combination of analog beamforming parameters based on the measured channel quality of the set of reference signals, and communicate with the first wireless device via the two or more beams based on the first combination of analog beamforming parameters.

The communications manager 1610 may also receive, at a first wireless device, a set of reference signals that are transmitted by a second wireless device using a set of combinations of analog beamforming parameters for two or more beams that carry two or more MIMO streams, determine a set of analog beamforming parameters for the two or more beams based on measurements of the set of reference signals, determine a set of transmission baseband precoder parameters to be applied to baseband signals of the two or more beams based on a channel estimation of a channel between the first wireless device and the second wireless device, determine a set of receive baseband combiner parameters to be applied to baseband signals of the two or more beams based on the channel estimation, and communicate with the second wireless device using the two or more beams based on the set of analog beamforming parameters, the set of transmission baseband precoder parameters, and the set of receive baseband combiner parameters.

Network communications manager 1615 may manage communications with the core network (e.g., via one or more wired backhaul links). For example, the network communications manager 1615 may manage the transfer of data communications for client devices, such as one or more UEs 115.

Transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting multi-beam selection for beamformed MIMO wireless communications).

Inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
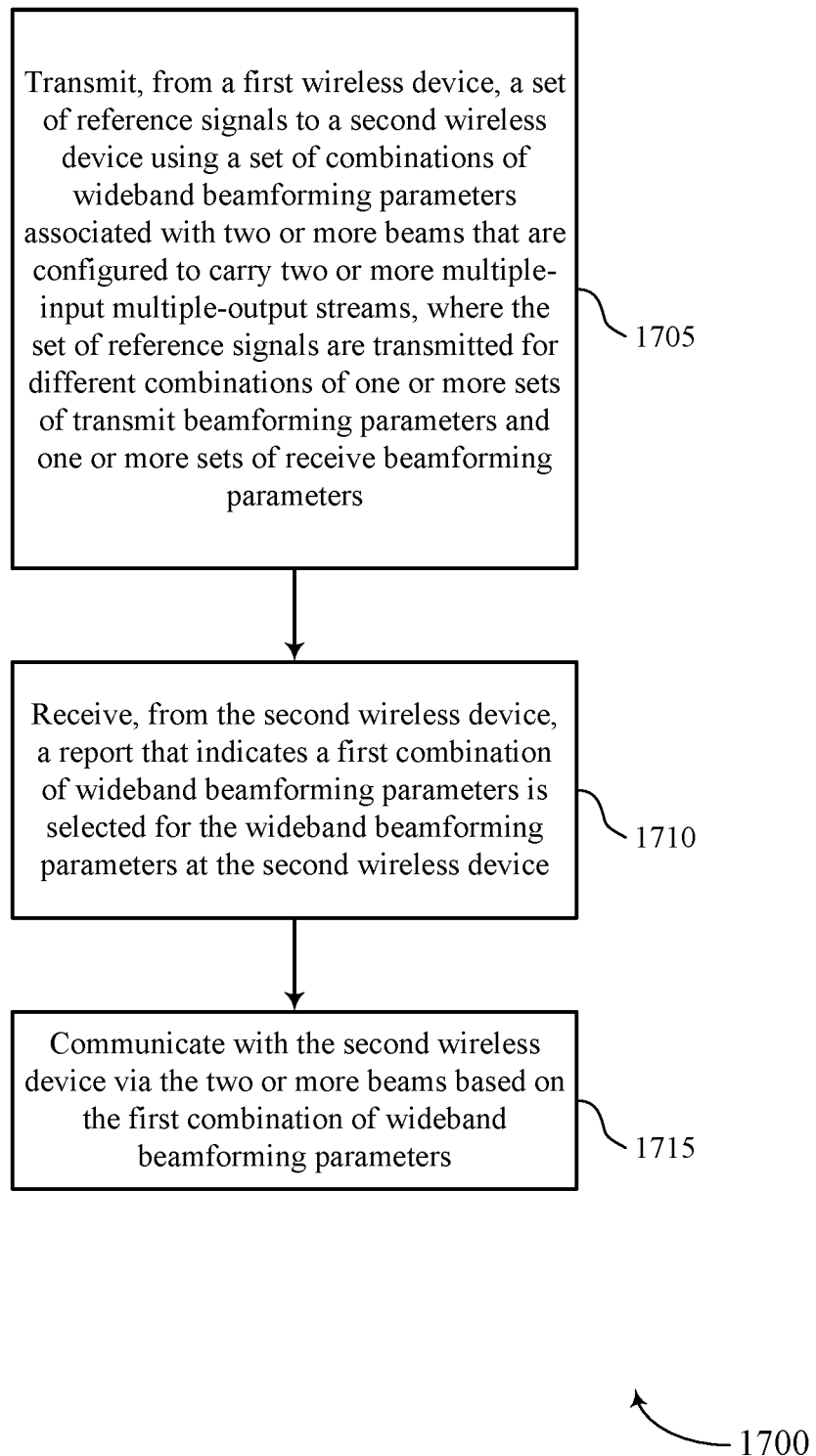
FIGS. 17 through 25 show flowcharts illustrating methods that support multi-beam selection for beamformed MIMO wireless communications in accordance with aspects of the present disclosure.

FIG. 17 shows a flowchart illustrating a method 1700 that supports multi-beam selection for beamformed MIMO wireless communications in accordance with aspects of the present disclosure. The operations of method 1700 may be implemented by a UE 115 or base station 105 or its components as described herein. For example, the operations of method 1700 may be performed by a communications manager as described with reference to FIGS. 12 through 16. In some examples, a UE or base station may execute a set of instructions to control the functional elements of the UE or base station to perform the functions described below. Additionally or alternatively, a UE or base station may perform aspects of the functions described below using special-purpose hardware.

At 1705, the UE or base station may transmit, from a first wireless device, a set of reference signals to a second wireless device using a set of combinations of analog beamforming parameters associated with two or more beams that are configured to carry two or more MIMO streams, where the set of reference signals are transmitted for different combinations of one or more sets of transmit beamforming parameters and one or more sets of receive beamforming parameters. The operations of 1705 may be performed according to the methods described herein. In some examples, aspects of the operations of 1705 may be performed by a reference signal manager as described with reference to FIGS. 12 through 16.

At 1710, the UE or base station may receive, from the second wireless device, a report that indicates a first combination of analog beamforming parameters is selected for the analog beamforming parameters at the second wireless device. The operations of 1710 may be performed according to the methods described herein. In some examples, aspects of the operations of 1710 may be performed by a wideband parameter manager as described with reference to FIGS. 12 through 16.

At 1715, the UE or base station may communicate with the second wireless device via the two or more beams based on the first combination of analog beamforming parameters. The operations of 1715 may be performed according to the methods described herein. In some examples, aspects of the operations of 1715 may be performed by a MIMO manager as described with reference to FIGS. 12 through 16.

Figure 18:
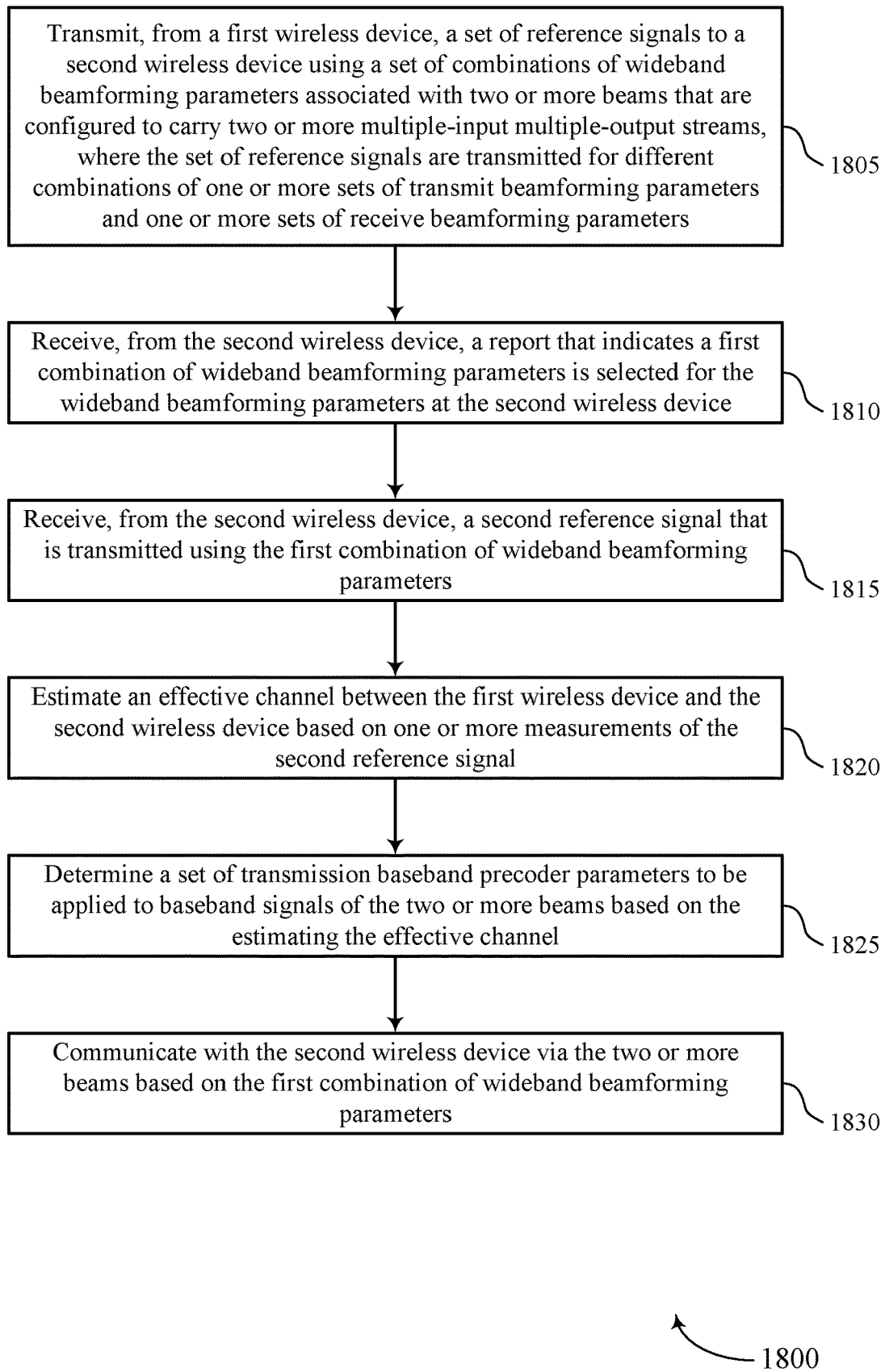

FIG. 18 shows a flowchart illustrating a method 1800 that supports multi-beam selection for beamformed MIMO wireless communications in accordance with aspects of the present disclosure. The operations of method 1800 may be implemented by a UE 115 or base station 105 or its components as described herein. For example, the operations of method 1800 may be performed by a communications manager as described with reference to FIGS. 12 through 16. In some examples, a UE or base station may execute a set of instructions to control the functional elements of the UE or base station to perform the functions described below. Additionally or alternatively, a UE or base station may perform aspects of the functions described below using special-purpose hardware.

At 1805, the UE or base station may transmit, from a first wireless device, a set of reference signals to a second wireless device using a set of combinations of analog beamforming parameters associated with two or more beams that are configured to carry two or more MIMO streams, where the set of reference signals are transmitted for different combinations of one or more sets of transmit beamforming parameters and one or more sets of receive beamforming parameters. The operations of 1805 may be performed according to the methods described herein. In some examples, aspects of the operations of 1805 may be performed by a reference signal manager as described with reference to FIGS. 12 through 16.

At 1810, the UE or base station may receive, from the second wireless device, a report that indicates a first combination of analog beamforming parameters is selected for the analog beamforming parameters at the second wireless device. The operations of 1810 may be performed according to the methods described herein. In some examples, aspects of the operations of 1810 may be performed by a wideband parameter manager as described with reference to FIGS. 12 through 16.

At 1815, the UE or base station may receive, from the second wireless device, a second reference signal that is transmitted using the first combination of analog beamforming parameters. The operations of 1815 may be performed according to the methods described herein. In some examples, aspects of the operations of 1815 may be performed by a reference signal manager as described with reference to FIGS. 12 through 16.

At 1820, the UE or base station may estimate an effective channel between the first wireless device and the second wireless device based on one or more measurements of the second reference signal. The operations of 1820 may be performed according to the methods described herein. In some examples, aspects of the operations of 1820 may be performed by a channel estimation component as described with reference to FIGS. 12 through 16.

At 1825, the UE or base station may determine a set of transmission baseband precoder parameters to be applied to baseband signals of the two or more beams based on the estimating the effective channel. The operations of 1825 may be performed according to the methods described herein. In some examples, aspects of the operations of 1825 may be performed by a precoding parameter manager as described with reference to FIGS. 12 through 16.

At 1830, the UE or base station may communicate with the second wireless device via the two or more beams based on the first combination of analog beamforming parameters. The operations of 1830 may be performed according to the methods described herein. In some examples, aspects of the operations of 1830 may be performed by a MIMO manager as described with reference to FIGS. 12 through 16. In some cases, the communicating with the second wireless device includes data communications via the two or more MIMO streams on the two or more beams, where the two or more beams use the first combination of analog beamforming parameters and the set of transmission baseband precoder parameters. In some cases, the data communications include a third reference signal for measurement at the second wireless device and determination of a set of receive baseband combiner parameters to be applied to baseband signals of the two or more beams at the second wireless device.

Figure 19:
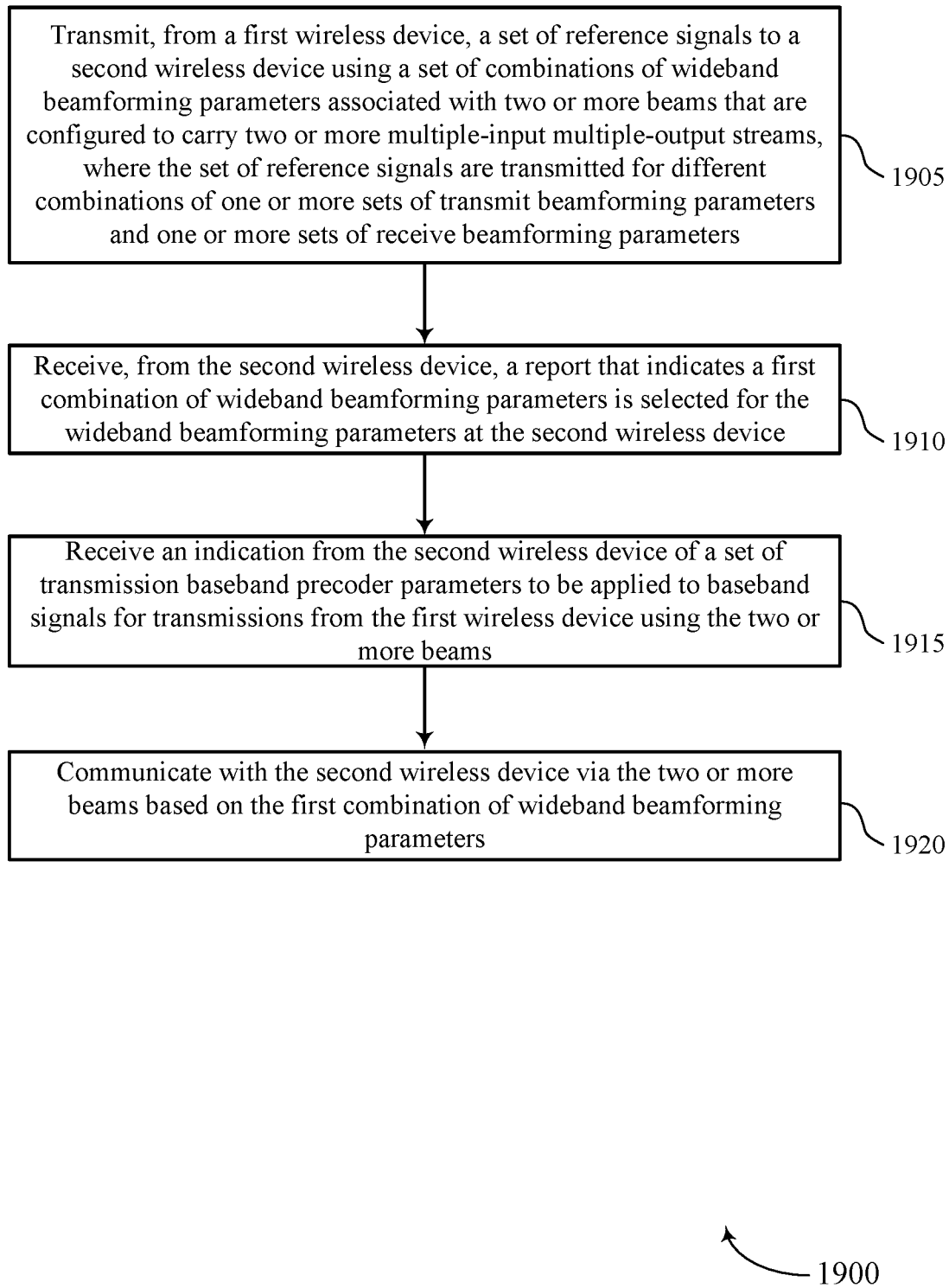

FIG. 19 shows a flowchart illustrating a method 1900 that supports multi-beam selection for beamformed MIMO wireless communications in accordance with aspects of the present disclosure. The operations of method 1900 may be implemented by a UE 115 or base station 105 or its components as described herein. For example, the operations of method 1900 may be performed by a communications manager as described with reference to FIGS. 12 through 16. In some examples, a UE or base station may execute a set of instructions to control the functional elements of the UE or base station to perform the functions described below. Additionally or alternatively, a UE or base station may perform aspects of the functions described below using special-purpose hardware.

At 1905, the UE or base station may transmit, from a first wireless device, a set of reference signals to a second wireless device using a set of combinations of analog beamforming parameters associated with two or more beams that are configured to carry two or more MIMO streams, where the set of reference signals are transmitted for different combinations of one or more sets of transmit beamforming parameters and one or more sets of receive beamforming parameters. The operations of 1905 may be performed according to the methods described herein. In some examples, aspects of the operations of 1905 may be performed by a reference signal manager as described with reference to FIGS. 12 through 16.

At 1910, the UE or base station may receive, from the second wireless device, a report that indicates a first combination of analog beamforming parameters is selected for the analog beamforming parameters at the second wireless device. The operations of 1910 may be performed according to the methods described herein. In some examples, aspects of the operations of 1910 may be performed by a wideband parameter manager as described with reference to FIGS. 12 through 16.

At 1915, the UE or base station may receive an indication from the second wireless device of a set of transmission baseband precoder parameters to be applied to baseband signals for transmissions from the first wireless device using the two or more beams. The operations of 1915 may be performed according to the methods described herein. In some examples, aspects of the operations of 1915 may be performed by a precoding parameter manager as described with reference to FIGS. 12 through 16. In some cases, the indication from the second wireless device is a precoding matrix indicator (PMI) that is mapped to a codebook of sets of transmission baseband precoder parameters.

At 1920, the UE or base station may communicate with the second wireless device via the two or more beams based on the first combination of analog beamforming parameters. The operations of 1920 may be performed according to the methods described herein. In some examples, aspects of the operations of 1920 may be performed by a MIMO manager as described with reference to FIGS. 12 through 16.

Figure 20:
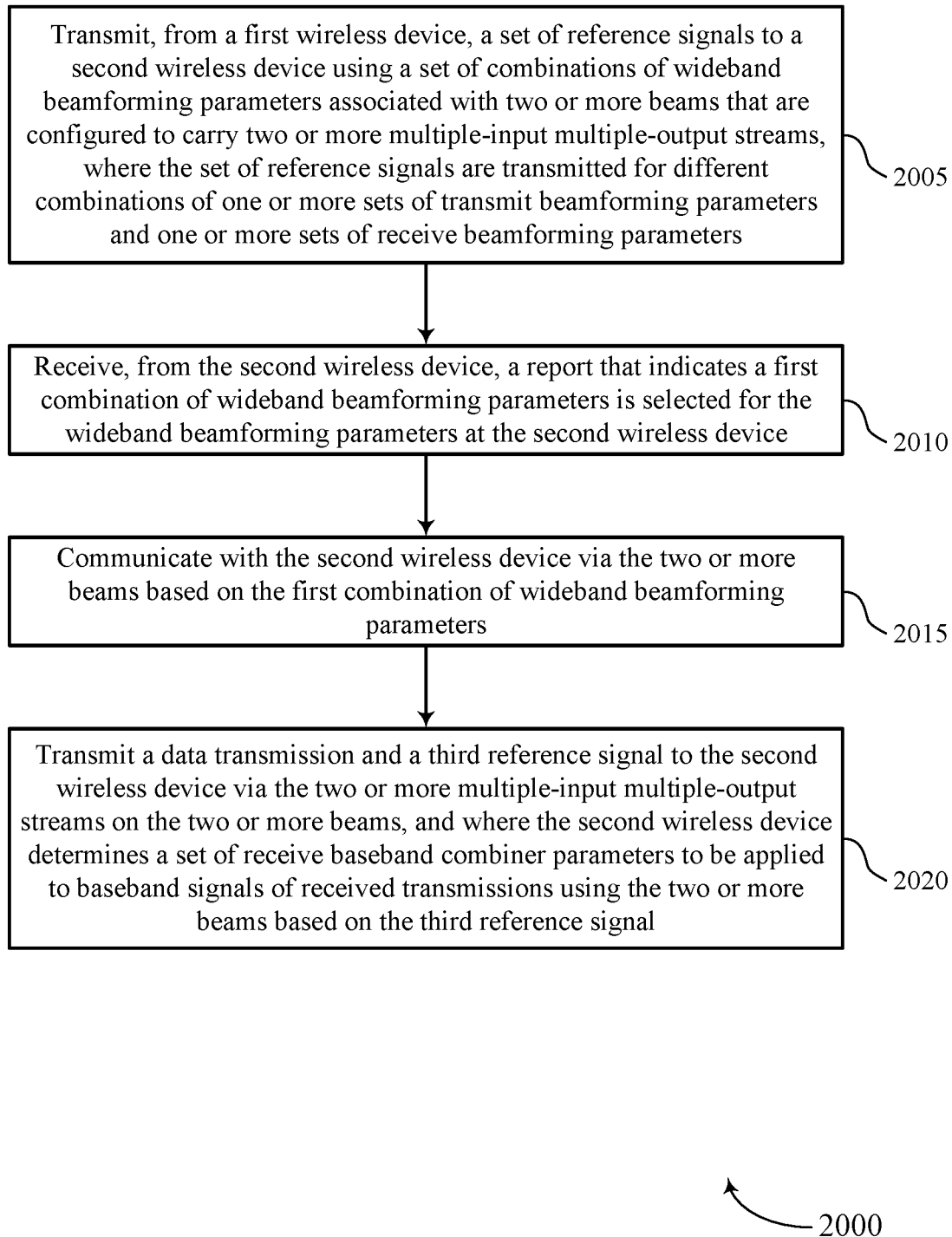

FIG. 20 shows a flowchart illustrating a method 2000 that supports multi-beam selection for beamformed MIMO wireless communications in accordance with aspects of the present disclosure. The operations of method 2000 may be implemented by a UE 115 or base station 105 or its components as described herein. For example, the operations of method 2000 may be performed by a communications manager as described with reference to FIGS. 12 through 16. In some examples, a UE or base station may execute a set of instructions to control the functional elements of the UE or base station to perform the functions described below. Additionally or alternatively, a UE or base station may perform aspects of the functions described below using special-purpose hardware.

At 2005, the UE or base station may transmit, from a first wireless device, a set of reference signals to a second wireless device using a set of combinations of analog beamforming parameters associated with two or more beams that are configured to carry two or more MIMO streams, where the set of reference signals are transmitted for different combinations of one or more sets of transmit beamforming parameters and one or more sets of receive beamforming parameters. The operations of 2005 may be performed according to the methods described herein. In some examples, aspects of the operations of 2005 may be performed by a reference signal manager as described with reference to FIGS. 12 through 16.

At 2010, the UE or base station may receive, from the second wireless device, a report that indicates a first combination of analog beamforming parameters is selected for the analog beamforming parameters at the second wireless device. The operations of 2010 may be performed according to the methods described herein. In some examples, aspects of the operations of 2010 may be performed by a wideband parameter manager as described with reference to FIGS. 12 through 16.

At 2015, the UE or base station may communicate with the second wireless device via the two or more beams based on the first combination of analog beamforming parameters. The operations of 2015 may be performed according to the methods described herein. In some examples, aspects of the operations of 2015 may be performed by a MIMO manager as described with reference to FIGS. 12 through 16.

At 2020, the UE or base station may transmit a data transmission and a third reference signal to the second wireless device via the two or more MIMO streams on the two or more beams, and where the second wireless device determines a set of receive baseband combiner parameters to be applied to baseband signals of received transmissions using the two or more beams based on the third reference signal. The operations of 2020 may be performed according to the methods described herein. In some examples, aspects of the operations of 2020 may be performed by a MIMO manager as described with reference to FIGS. 12 through 16.

Figure 21:
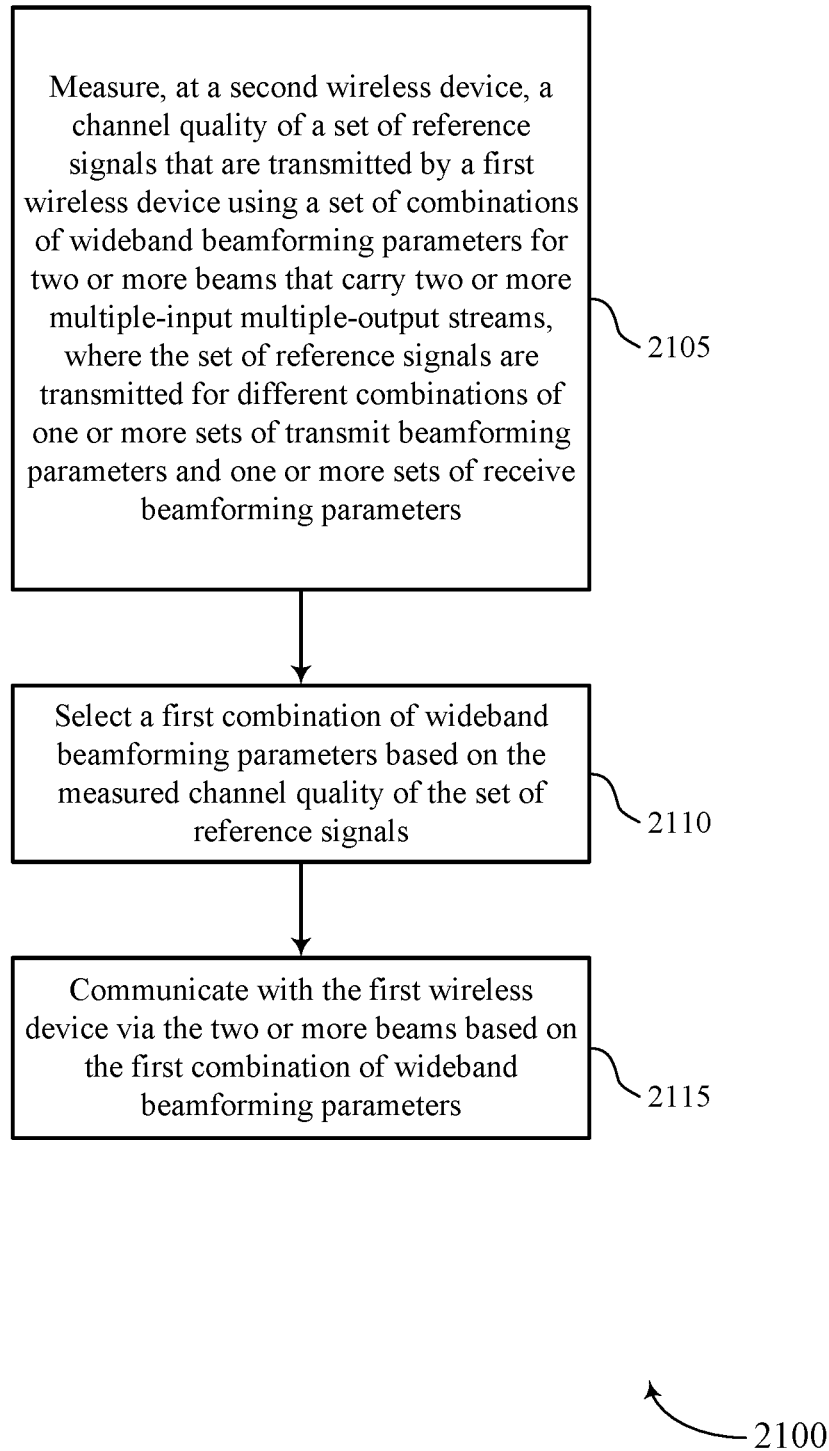

FIG. 21 shows a flowchart illustrating a method 2100 that supports multi-beam selection for beamformed MIMO wireless communications in accordance with aspects of the present disclosure. The operations of method 2100 may be implemented by a UE 115 or base station 105 or its components as described herein. For example, the operations of method 2100 may be performed by a communications manager as described with reference to FIGS. 12 through 16. In some examples, a UE or base station may execute a set of instructions to control the functional elements of the UE or base station to perform the functions described below. Additionally or alternatively, a UE or base station may perform aspects of the functions described below using special-purpose hardware.

At 2105, the UE or base station may measure, at a second wireless device, a channel quality of a set of reference signals that are transmitted by a first wireless device using a set of combinations of analog beamforming parameters for two or more beams that carry two or more MIMO streams, where the set of reference signals are transmitted for different combinations of one or more sets of transmit beamforming parameters and one or more sets of receive beamforming parameters. The operations of 2105 may be performed according to the methods described herein. In some examples, aspects of the operations of 2105 may be performed by a reference signal manager as described with reference to FIGS. 12 through 16.

At 2110, the UE or base station may select a first combination of analog beamforming parameters based on the measured channel quality of the set of reference signals. The operations of 2110 may be performed according to the methods described herein. In some examples, aspects of the operations of 2110 may be performed by a wideband parameter manager as described with reference to FIGS. 12 through 16.

At 2115, the UE or base station may communicate with the first wireless device via the two or more beams based on the first combination of analog beamforming parameters. The operations of 2115 may be performed according to the methods described herein. In some examples, aspects of the operations of 2115 may be performed by a MIMO manager as described with reference to FIGS. 12 through 16.

Figure 22:
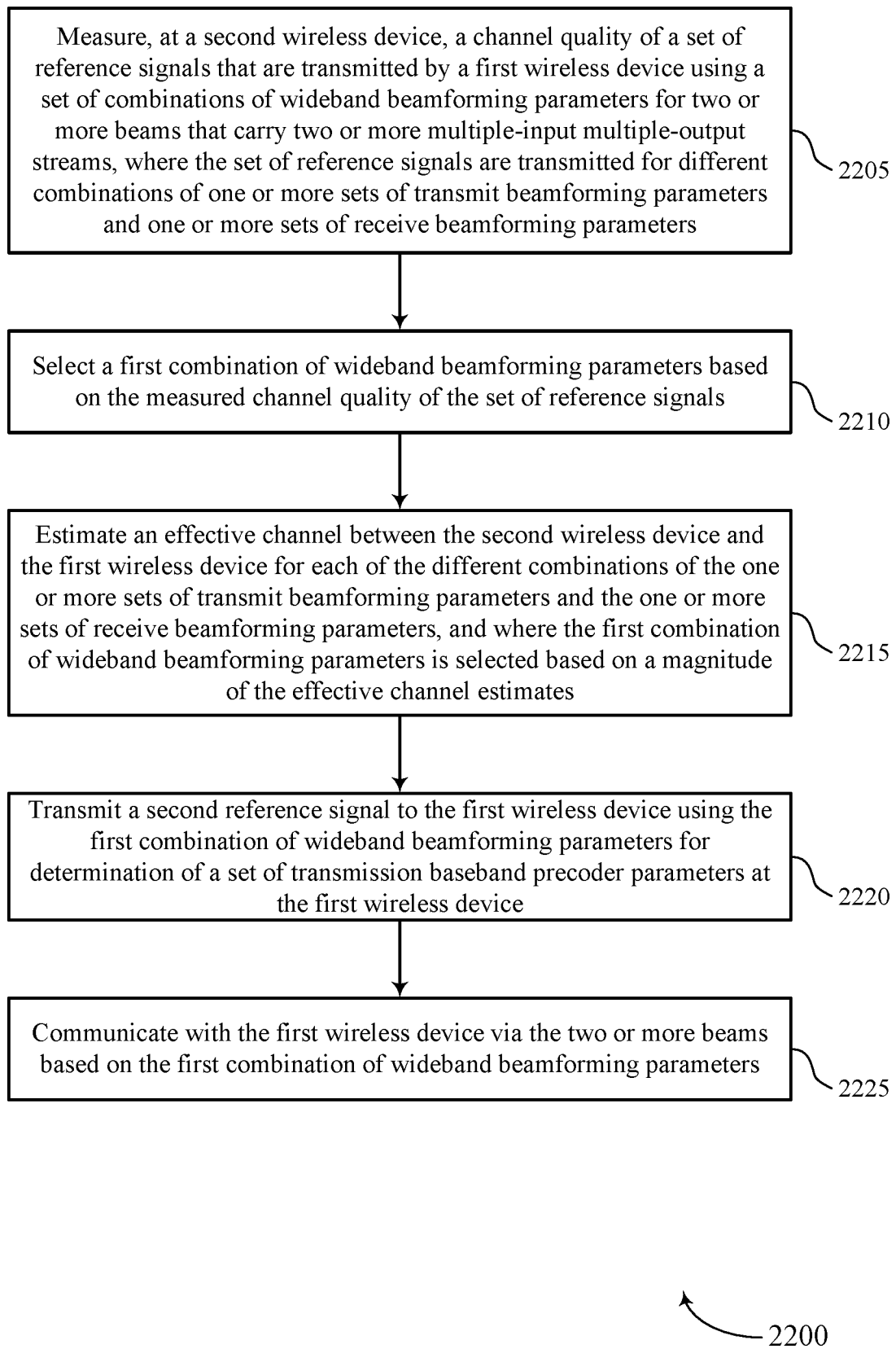

FIG. 22 shows a flowchart illustrating a method 2200 that supports multi-beam selection for beamformed MIMO wireless communications in accordance with aspects of the present disclosure. The operations of method 2200 may be implemented by a UE 115 or base station 105 or its components as described herein. For example, the operations of method 2200 may be performed by a communications manager as described with reference to FIGS. 12 through 16. In some examples, a UE or base station may execute a set of instructions to control the functional elements of the UE or base station to perform the functions described below. Additionally or alternatively, a UE or base station may perform aspects of the functions described below using special-purpose hardware.

At 2205, the UE or base station may measure, at a second wireless device, a channel quality of a set of reference signals that are transmitted by a first wireless device using a set of combinations of analog beamforming parameters for two or more beams that carry two or more MIMO streams, where the set of reference signals are transmitted for different combinations of one or more sets of transmit beamforming parameters and one or more sets of receive beamforming parameters. The operations of 2205 may be performed according to the methods described herein. In some examples, aspects of the operations of 2205 may be performed by a reference signal manager as described with reference to FIGS. 12 through 16.

At 2210, the UE or base station may select a first combination of analog beamforming parameters based on the measured channel quality of the set of reference signals. The operations of 2210 may be performed according to the methods described herein. In some examples, aspects of the operations of 2210 may be performed by a wideband parameter manager as described with reference to FIGS. 12 through 16.

At 2215, the UE or base station may estimate an effective channel between the second wireless device and the first wireless device for each of the different combinations of the one or more sets of transmit beamforming parameters and the one or more sets of receive beamforming parameters, and where the first combination of analog beamforming parameters is selected based on a magnitude of the effective channel estimates. The operations of 2215 may be performed according to the methods described herein. In some examples, aspects of the operations of 2215 may be performed by a channel estimation component as described with reference to FIGS. 12 through 16.

At 2220, the UE or base station may transmit a second reference signal to the first wireless device using the first combination of analog beamforming parameters for determination of a set of transmission baseband precoder parameters at the first wireless device. The operations of 2220 may be performed according to the methods described herein. In some examples, aspects of the operations of 2220 may be performed by a reference signal manager as described with reference to FIGS. 12 through 16.

At 2225, the UE or base station may communicate with the first wireless device via the two or more beams based on the first combination of analog beamforming parameters. The operations of 2225 may be performed according to the methods described herein. In some examples, aspects of the operations of 2225 may be performed by a MIMO manager as described with reference to FIGS. 12 through 16. In some cases, the communicating with the first wireless device includes data communications via the two or more MIMO streams on the two or more beams, where the two or more beams use the first combination of analog beamforming parameters and the set of transmission baseband precoder parameters. In some cases, the data communications include a third reference signal for determination of a set of receive baseband combiner parameters to be applied to baseband signals of the two or more beams at the second wireless device.

Figure 23:
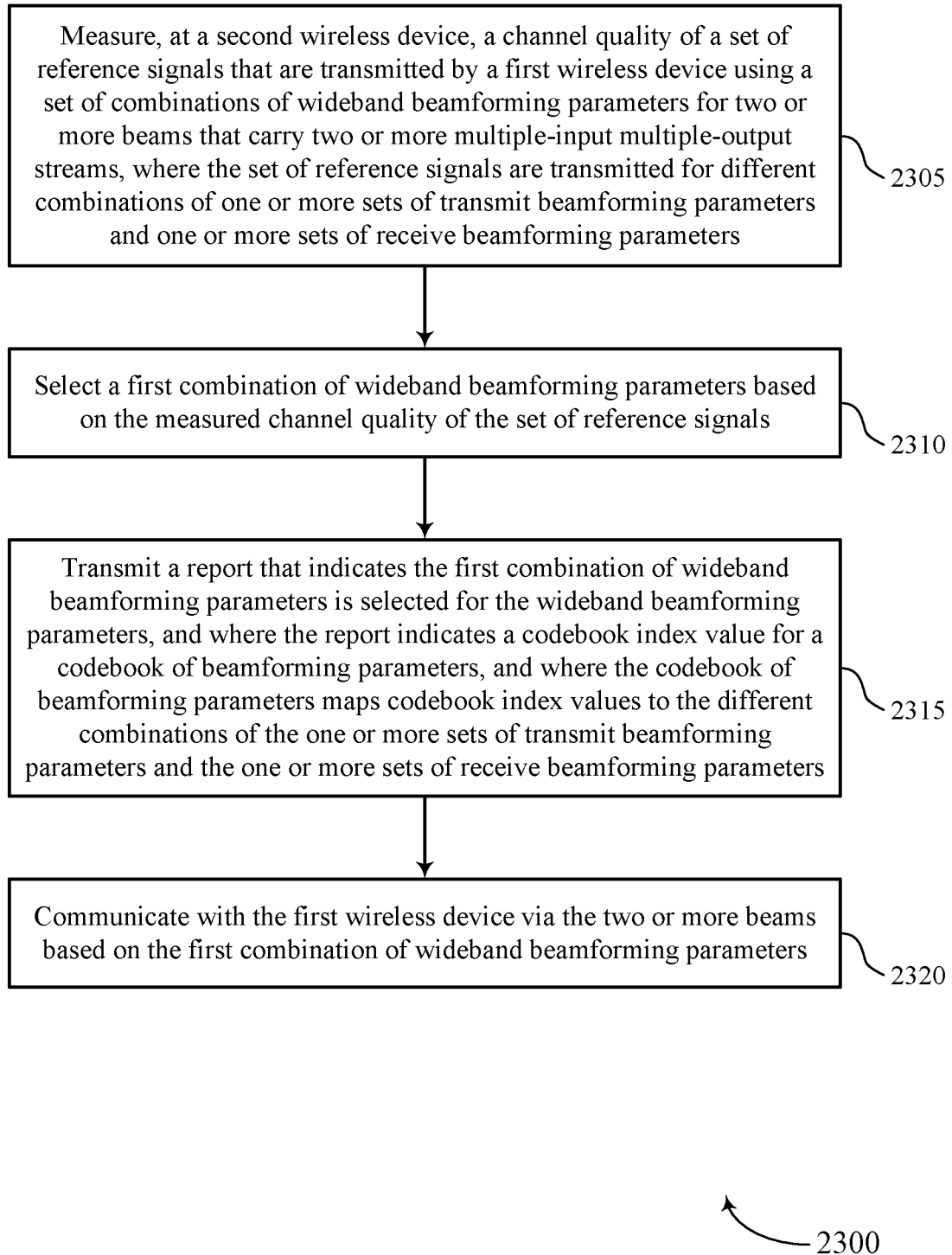

FIG. 23 shows a flowchart illustrating a method 2300 that supports multi-beam selection for beamformed MIMO wireless communications in accordance with aspects of the present disclosure. The operations of method 2300 may be implemented by a UE 115 or base station 105 or its components as described herein. For example, the operations of method 2300 may be performed by a communications manager as described with reference to FIGS. 12 through 16. In some examples, a UE or base station may execute a set of instructions to control the functional elements of the UE or base station to perform the functions described below. Additionally or alternatively, a UE or base station may perform aspects of the functions described below using special-purpose hardware.

At 2305, the UE or base station may measure, at a second wireless device, a channel quality of a set of reference signals that are transmitted by a first wireless device using a set of combinations of analog beamforming parameters for two or more beams that carry two or more MIMO streams, where the set of reference signals are transmitted for different combinations of one or more sets of transmit beamforming parameters and one or more sets of receive beamforming parameters. The operations of 2305 may be performed according to the methods described herein. In some examples, aspects of the operations of 2305 may be performed by a reference signal manager as described with reference to FIGS. 12 through 16.

At 2310, the UE or base station may select a first combination of analog beamforming parameters based on the measured channel quality of the set of reference signals. The operations of 2310 may be performed according to the methods described herein. In some examples, aspects of the operations of 2310 may be performed by a wideband parameter manager as described with reference to FIGS. 12 through 16.

At 2315, the UE or base station may transmit a report that indicates the first combination of analog beamforming parameters is selected for the analog beamforming parameters, and where the report indicates a codebook index value for a codebook of beamforming parameters, and where the codebook of beamforming parameters maps codebook index values to the different combinations of the one or more sets of transmit beamforming parameters and the one or more sets of receive beamforming parameters. The operations of 2315 may be performed according to the methods described herein. In some examples, aspects of the operations of 2315 may be performed by a codebook manager as described with reference to FIGS. 12 through 16.

At 2320, the UE or base station may communicate with the first wireless device via the two or more beams based on the first combination of analog beamforming parameters. The operations of 2320 may be performed according to the methods described herein. In some examples, aspects of the operations of 2320 may be performed by a MIMO manager as described with reference to FIGS. 12 through 16.

Figure 24:
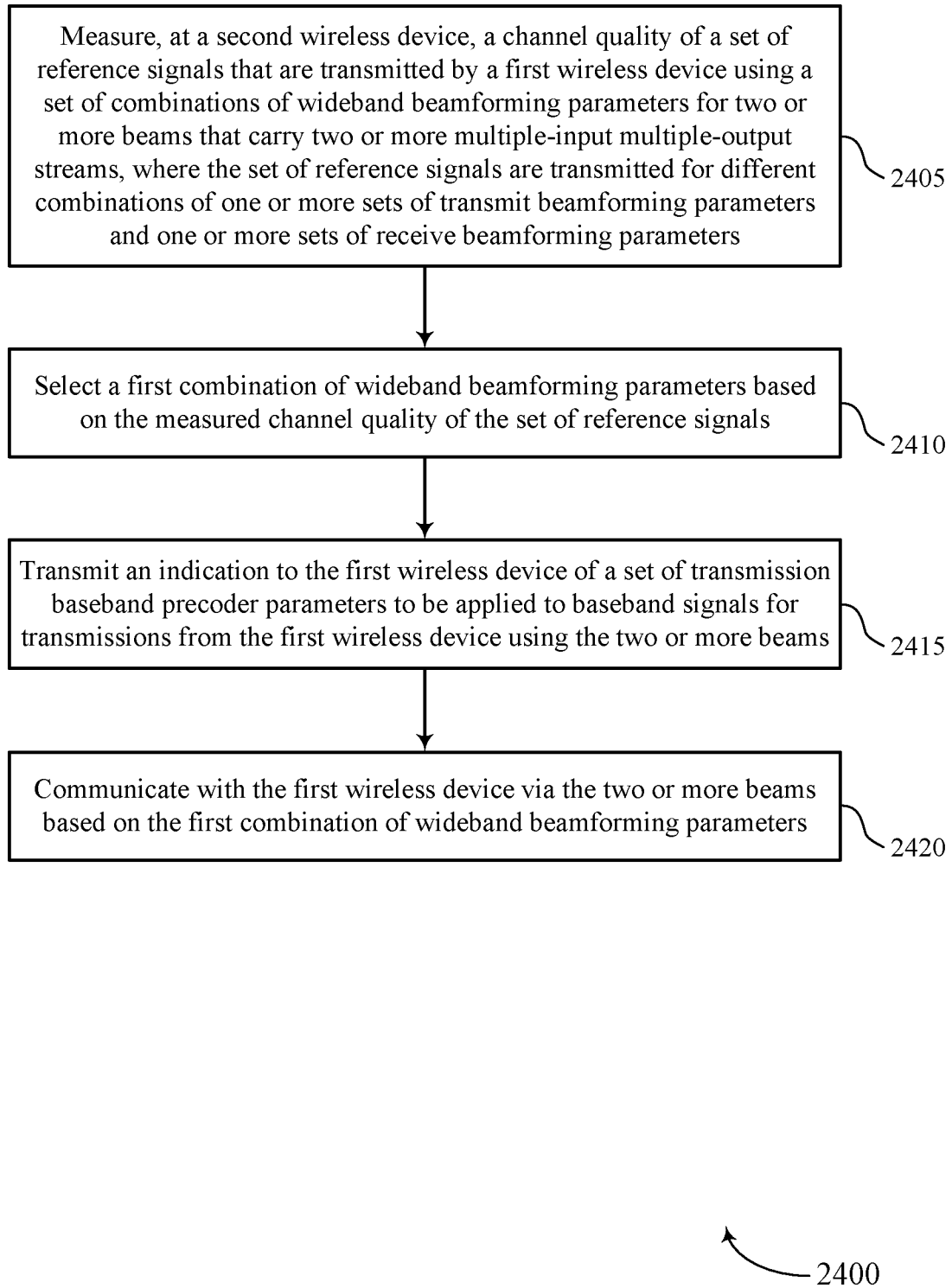

FIG. 24 shows a flowchart illustrating a method 2400 that supports multi-beam selection for beamformed MIMO wireless communications in accordance with aspects of the present disclosure. The operations of method 2400 may be implemented by a UE 115 or base station 105 or its components as described herein. For example, the operations of method 2400 may be performed by a communications manager as described with reference to FIGS. 12 through 16. In some examples, a UE or base station may execute a set of instructions to control the functional elements of the UE or base station to perform the functions described below. Additionally or alternatively, a UE or base station may perform aspects of the functions described below using special-purpose hardware.

At 2405, the UE or base station may measure, at a second wireless device, a channel quality of a set of reference signals that are transmitted by a first wireless device using a set of combinations of analog beamforming parameters for two or more beams that carry two or more MIMO streams, where the set of reference signals are transmitted for different combinations of one or more sets of transmit beamforming parameters and one or more sets of receive beamforming parameters. The operations of 2405 may be performed according to the methods described herein. In some examples, aspects of the operations of 2405 may be performed by a reference signal manager as described with reference to FIGS. 12 through 16.

At 2410, the UE or base station may select a first combination of analog beamforming parameters based on the measured channel quality of the set of reference signals. The operations of 2410 may be performed according to the methods described herein. In some examples, aspects of the operations of 2410 may be performed by a wideband parameter manager as described with reference to FIGS. 12 through 16.

At 2415, the UE or base station may transmit an indication to the first wireless device of a set of transmission baseband precoder parameters to be applied to baseband signals for transmissions from the first wireless device using the two or more beams. The operations of 2415 may be performed according to the methods described herein. In some examples, aspects of the operations of 2415 may be performed by a precoding parameter manager as described with reference to FIGS. 12 through 16. In some cases, the indication to the first wireless device is a precoding matrix indicator (PMI) that is mapped to a codebook of sets of transmission baseband precoder parameters.

At 2420, the UE or base station may communicate with the first wireless device via the two or more beams based on the first combination of analog beamforming parameters. The operations of 2420 may be performed according to the methods described herein. In some examples, aspects of the operations of 2420 may be performed by a MIMO manager as described with reference to FIGS. 12 through 16.

Figure 25:
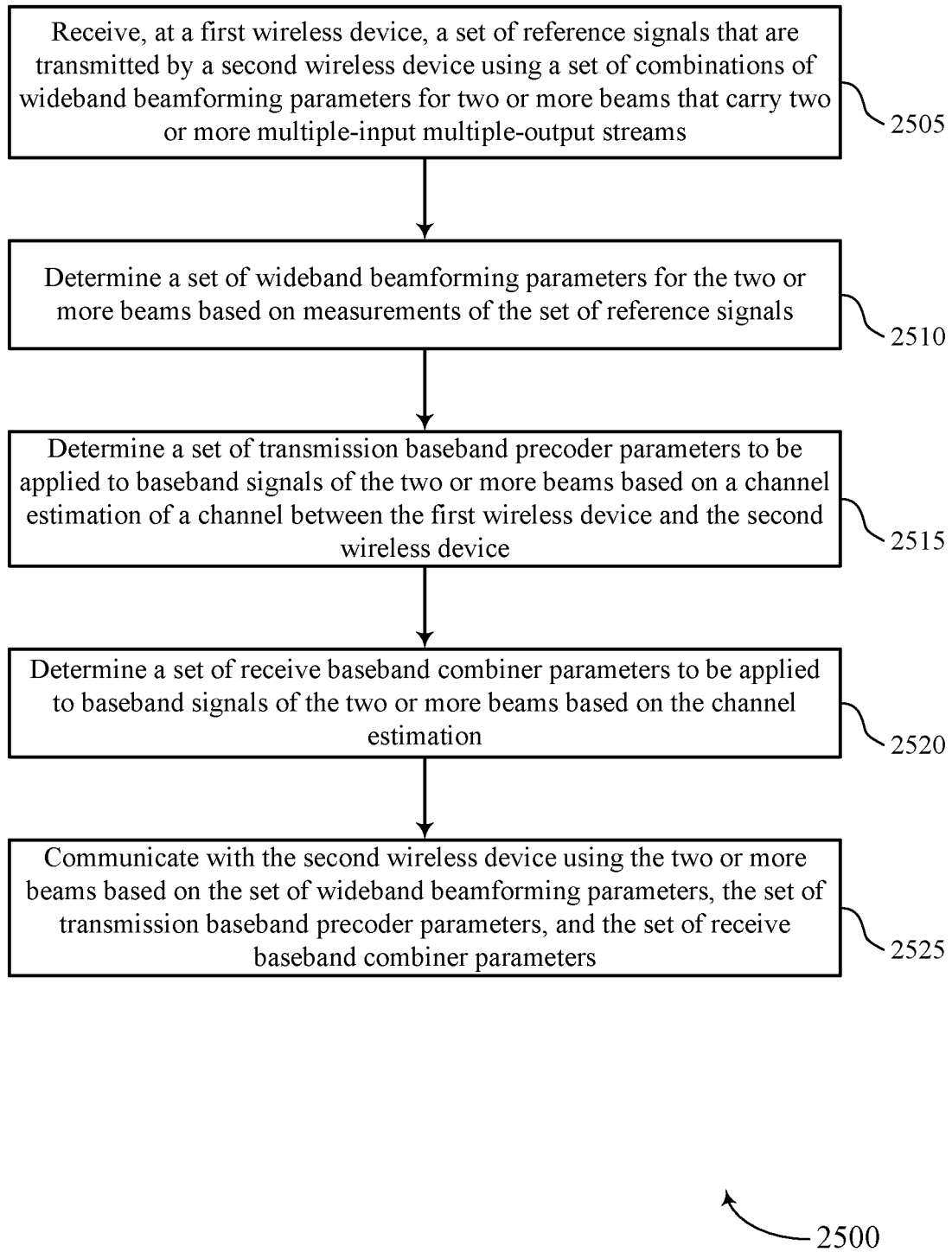

FIG. 25 shows a flowchart illustrating a method 2500 that supports multi-beam selection for beamformed MIMO wireless communications in accordance with aspects of the present disclosure. The operations of method 2500 may be implemented by a UE 115 or base station 105 or its components as described herein. For example, the operations of method 2500 may be performed by a communications manager as described with reference to FIGS. 12 through 16. In some examples, a UE or base station may execute a set of instructions to control the functional elements of the UE or base station to perform the functions described below. Additionally or alternatively, a UE or base station may perform aspects of the functions described below using special-purpose hardware.

At 2505, the UE or base station may receive, at a first wireless device, a set of reference signals that are transmitted by a second wireless device using a set of combinations of analog beamforming parameters for two or more beams that carry two or more MIMO streams. The operations of 2505 may be performed according to the methods described herein. In some examples, aspects of the operations of 2505 may be performed by a reference signal manager as described with reference to FIGS. 12 through 16.

At 2510, the UE or base station may determine a set of analog beamforming parameters for the two or more beams based on measurements of the set of reference signals. The operations of 2510 may be performed according to the methods described herein. In some examples, aspects of the operations of 2510 may be performed by a wideband parameter manager as described with reference to FIGS. 12 through 16.

At 2515, the UE or base station may determine a set of transmission baseband precoder parameters to be applied to baseband signals of the two or more beams based on a channel estimation of a channel between the first wireless device and the second wireless device. The operations of 2515 may be performed according to the methods described herein. In some examples, aspects of the operations of 2515 may be performed by a precoding parameter manager as described with reference to FIGS. 12 through 16.

At 2520, the UE or base station may determine a set of receive baseband combiner parameters to be applied to baseband signals of the two or more beams based on the channel estimation. The operations of 2520 may be performed according to the methods described herein. In some examples, aspects of the operations of 2520 may be performed by a combiner parameter manager as described with reference to FIGS. 12 through 16.

At 2525, the UE or base station may communicate with the second wireless device using the two or more beams based on the set of analog beamforming parameters, the set of transmission baseband precoder parameters, and the set of receive baseband combiner parameters. The operations of 2525 may be performed according to the methods described herein. In some examples, aspects of the operations of 2525 may be performed by a MIMO manager as described with reference to FIGS. 12 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
  a processor,
  memory coupled with the processor; and
  instructions stored in the memory and executable by the processor to cause the apparatus to:
    transmit, from a first wireless device, a plurality of reference signals to a second wireless device using a plurality of combinations of analog beamforming parameters associated with two or more beams that are configured to carry two or more multiple-input multiple-output streams, wherein the plurality of reference signals are transmitted for different combinations of one or more sets of transmit beamforming parameters and one or more sets of receive beamforming parameters;
    receive, from the second wireless device, a report that indicates a first combination of analog beamforming parameters is selected for the analog beamforming parameters at the second wireless device; and
    communicate with the second wireless device via the two or more beams based at least in part on the first combination of analog beamforming parameters.

2. The apparatus of claim 1, wherein the instructions are further executable to cause the apparatus to:

receive, from the second wireless device, a second reference signal that is transmitted using the first combination of analog beamforming parameters;
estimate an effective channel between the first wireless device and the second wireless device based on one or more measurements of the second reference signal; and
determine a set of transmission baseband precoder parameters to be applied to baseband signals of the two or more beams based at least in part on the estimating the effective channel.

3. The apparatus of claim 2, wherein communications with the second wireless device include data communications via the two or more multiple-input multiple-output streams on the two or more beams, wherein the two or more beams use the first combination of analog beamforming parameters and the set of transmission baseband precoder parameters, and
wherein the data communications include a third reference signal for measurement at the second wireless device and determination of a set of receive baseband combiner parameters to be applied to baseband signals of the two or more beams at the second wireless device.

4. The apparatus of claim 1, wherein the report that indicates the first combination of analog beamforming parameters provides a codebook index value for a codebook of beamforming parameters, and wherein the codebook of beamforming parameters maps codebook index values to the different combinations of the one or more sets of transmit beamforming parameters and the one or more sets of receive beamforming parameters.

5. The apparatus of claim 1, wherein the first combination of analog beamforming parameters is associated with a first reference signal transmission that has a highest mutual information (MI) value of the plurality of reference signals.

6. The apparatus of claim 1, wherein the first wireless device is a base station and the second wireless device is a user equipment (UE), wherein the plurality of reference signals are downlink reference signals transmitted to the UE in a beam sweeping procedure, and wherein the downlink reference signals include one or more of a channel state information reference signal (CSI-RS), one or more reference signals transmitted in a synchronization signal block (SSB), or any combinations thereof.

7. The apparatus of claim 1, wherein the first wireless device is a user equipment (UE) and the second wireless device is a base station, and wherein the plurality of reference signals are uplink reference signals transmitted to the base station in a beam sweeping procedure, and wherein the uplink reference signals include sounding reference signals (SRS).

8. The apparatus of claim 1, wherein the plurality of reference signals include reference signals that are specific to transmissions from the first wireless device to the second wireless device, and wherein the first wireless device determines a second combination of analog beamforming parameters for use at the first wireless device based on one or more different reference signals that are specific to transmissions from the second wireless device to the first wireless device.

9. The apparatus of claim 1, wherein the first wireless device determines a set of transmission baseband precoder parameters to be applied to baseband signals for transmissions using the two or more beams based at least in part on a second reference signal received from the second wireless device, wherein the baseband precoder parameters are used to transform input from the two or more multiple-input multiple-output streams into baseband streams of a plurality of radio frequency transmit chains, and wherein the first combination of analog beamforming parameters are used to transform the baseband streams of the plurality of radio frequency transmit chains into wideband waveforms that are provided to a plurality of antennas.

10. The apparatus of claim 1, wherein the instructions are further executable to cause the apparatus to:
receive an indication from the second wireless device of a set of transmission baseband precoder parameters to be applied to baseband signals for transmissions from the first wireless device using the two or more beams, and wherein the indication from the second wireless device is a precoding matrix indicator (PMI) that is mapped to a codebook of sets of transmission baseband precoder parameters.

11. The apparatus of claim 1, wherein the instructions are further executable to cause the apparatus to:
transmit a data transmission and a third reference signal to the second wireless device via the two or more multiple-input multiple-output streams on the two or more beams, wherein the second wireless device determines a set of receive baseband combiner parameters to be applied to baseband signals of received transmissions using the two or more beams based at least in part on the third reference signal, and wherein the third reference signal is a demodulation reference signal (DMRS).

12. An apparatus for wireless communication, comprising:
a processor,
memory coupled with the processor; and
instructions stored in the memory and executable by the processor to cause the apparatus to:
measure, at a second wireless device, a channel quality of a plurality of reference signals that are transmitted by a first wireless device using a plurality of combinations of analog beamforming parameters for two or more beams that carry two or more multiple-input multiple-output streams, wherein the plurality of reference signals are transmitted for different combinations of one or more sets of transmit beamforming parameters and one or more sets of receive beamforming parameters;
select a first combination of analog beamforming parameters based at least in part on the measured channel quality of the plurality of reference signals; and
communicate with the first wireless device via the two or more beams based at least in part on the first combination of analog beamforming parameters.

13. The apparatus of claim 12, wherein the instructions are further executable to cause the apparatus to:
estimate an effective channel between the second wireless device and the first wireless device for each of the different combinations of the one or more sets of transmit beamforming parameters and the one or more sets of receive beamforming parameters, and wherein the first combination of analog beamforming parameters is selected based on a magnitude of the effective channel estimates.

14. The apparatus of claim 12, wherein the instructions are further executable to cause the apparatus to:
transmit a second reference signal to the first wireless device using the first combination of analog beamforming parameters for determination of a set of transmission baseband precoder parameters at the first wireless device, wherein communications with the first wireless device include data communications via the two or more multiple-input multiple-output streams on the two or more beams, and wherein the two or more beams use the first combination of analog beamforming parameters and the set of transmission baseband precoder parameters.

15. The apparatus of claim 12, wherein the instructions are further executable to cause the apparatus to:
transmit a report that indicates the first combination of analog beamforming parameters is selected for the analog beamforming parameters, and wherein the report indicates a codebook index value for a codebook of beamforming parameters, and wherein the codebook of beamforming parameters maps codebook index values to the different combinations of the one or more sets of transmit beamforming parameters and the one or more sets of receive beamforming parameters.

16. The apparatus of claim 12, wherein the first wireless device is a base station and the second wireless device is a user equipment (UE), wherein the plurality of reference signals are downlink reference signals transmitted to the UE in a beam sweeping procedure, and wherein the downlink reference signals include one or more of a channel state information reference signal (CSI-RS), one or more reference signals transmitted in a synchronization signal block (SSB), or any combinations thereof.

17. The apparatus of claim 12, wherein the first wireless device is a user equipment (UE) and the second wireless device is a base station, wherein the plurality of reference signals are uplink reference signals transmitted to the base station in a beam sweeping procedure, and wherein the uplink reference signals include sounding reference signals (SRS).

18. The apparatus of claim 12, wherein the instructions are further executable to cause the apparatus to:
determine a set of transmission baseband precoder parameters to be applied to baseband signals for transmissions from the second wireless device using the two or more beams based at least in part on the plurality of reference signals transmitted by the first wireless device.

19. The apparatus of claim 12, wherein the instructions are further executable to cause the apparatus to:
transmit a second reference signal to the first wireless device using the first combination of analog beamforming parameters for determination of a set of transmission baseband precoder parameters to be applied to baseband signals for transmissions from the first wireless device using the two or more beams.

20. The apparatus of claim 12, wherein the instructions are further executable to cause the apparatus to:
transmit an indication to the first wireless device of a set of transmission baseband precoder parameters to be applied to baseband signals for transmissions from the first wireless device using the two or more beams, wherein the indication to the first wireless device is a precoding matrix indicator (PMI) that is mapped to a codebook of sets of transmission baseband precoder parameters.

21. The apparatus of claim 12, wherein the instructions are further executable to cause the apparatus to:
receive a data transmission and a third reference signal from the first wireless device via the two or more multiple-input multiple-output streams on the two or more beams, wherein the third reference signal is a demodulation reference signal (DMRS);
determine, based at least in part on measurements of the third reference signal, a set of receive baseband combiner parameters to be applied to baseband signals of received transmissions using the two or more beams;
estimate an effective channel between the second wireless device and the first wireless device based on measurements of the third reference signal;
determine the set of receive baseband combiner parameters based on the estimating; and
decode the data transmission using the receive baseband combiner parameters.

22. An apparatus for wireless communication, comprising:
a processor,
memory coupled with the processor; and
instructions stored in the memory and executable by the processor to cause the apparatus to:
receive, at a first wireless device, a plurality of reference signals that are transmitted by a second wireless device using a plurality of combinations of analog beamforming parameters for two or more beams that carry two or more multiple-input multiple-output streams;
determine a set of analog beamforming parameters for the two or more beams based at least in part on measurements of the plurality of reference signals;
determine a set of transmission baseband precoder parameters to be applied to baseband signals of the two or more beams based at least in part on a channel estimation of a channel between the first wireless device and the second wireless device;
determine a set of receive baseband combiner parameters to be applied to baseband signals of the two or more beams based at least in part on the channel estimation; and
communicate with the second wireless device using the two or more beams based at least in part on the set of analog beamforming parameters, the set of transmission baseband precoder parameters, and the set of receive baseband combiner parameters.

23. The apparatus of claim 22, wherein:
the analog beamforming parameters are used to transform signals received at a plurality of antennas to baseband signals that are provided to a plurality of radio frequency receive chains; and
the baseband combiner parameters are used to transform an output of the plurality of radio frequency receive chains into the two or more multiple-input multiple-output streams.

24. The apparatus of claim 22, wherein:
the baseband precoder parameters are used to transform the two or more multiple-input multiple-output streams into baseband signals that are provided to a plurality of radio frequency transmit chains; and
the analog beamforming parameters are used to transform the baseband signals received at the radio frequency transmit chains into radio frequency signals for transmission from a plurality of antennas.

25. A method for wireless communication, comprising:
transmitting, from a first wireless device, a plurality of reference signals to a second wireless device using a plurality of combinations of analog beamforming parameters associated with two or more beams that are configured to carry two or more multiple-input multiple-output streams, wherein the plurality of reference signals are transmitted for different combinations of one or more sets of transmit beamforming parameters and one or more sets of receive beamforming parameters;

receiving, from the second wireless device, a report that indicates a first combination of analog beamforming parameters is selected for the analog beamforming parameters at the second wireless device; and communicating with the second wireless device via the two or more beams based at least in part on the first combination of analog beamforming parameters.

26. The method of claim 25, further comprising:

receiving, from the second wireless device, a second reference signal that is transmitted using the first combination of analog beamforming parameters;

estimating an effective channel between the first wireless device and the second wireless device based on one or more measurements of the second reference signal; and determining a set of transmission baseband precoder parameters to be applied to baseband signals of the two or more beams based at least in part on the estimating the effective channel.

27. The method of claim 25, wherein the report that indicates the first combination of analog beamforming parameters provides a codebook index value for a codebook of beamforming parameters, and wherein the codebook of beamforming parameters maps codebook index values to the different combinations of the one or more sets of transmit beamforming parameters and the one or more sets of receive beamforming parameters.

28. The method of claim 25, wherein the first wireless device is a base station and the second wireless device is a user equipment (UE), wherein the plurality of reference signals are downlink reference signals transmitted to the UE in a beam sweeping procedure, and wherein the downlink reference signals include one or more of a channel state information reference signal (CSI-RS), one or more reference signals transmitted in a synchronization signal block (SSB), or any combinations thereof.

29. The method of claim 25, wherein the first wireless device is a user equipment (UE) and the second wireless device is a base station, wherein the plurality of reference signals are uplink reference signals transmitted to the base station in a beam sweeping procedure, and wherein the uplink reference signals include sounding reference signals (SRS).

30. The method of claim 25, further comprising:

receiving an indication from the second wireless device of a set of transmission baseband precoder parameters to be applied to baseband signals for transmissions from the first wireless device using the two or more beams, wherein the indication from the second wireless device is a precoding matrix indicator (PMI) that is mapped to a codebook of sets of transmission baseband precoder parameters.

* * * * *